(12) United States Patent
Mulcrone

(10) Patent No.: US 11,940,960 B2
(45) Date of Patent: Mar. 26, 2024

(54) INTELLIGENT FOLDER-BASED DATA ORGANIZATION SYSTEM

(71) Applicant: Filter Folder, LLC, Dover, DE (US)

(72) Inventor: Bryan Robert Mulcrone, Woodridge, IL (US)

(73) Assignee: FOLDER FRONT, LLC, Dover, DE (US)

( * ) Notice: Subject to any disclaimer, the term of this patent is extended or adjusted under 35 U.S.C. 154(b) by 0 days.

(21) Appl. No.: 18/134,652

(22) Filed: Apr. 14, 2023

(65) Prior Publication Data

US 2023/0342337 A1    Oct. 26, 2023

Related U.S. Application Data

(60) Provisional application No. 63/333,179, filed on Apr. 21, 2022.

(51) Int. Cl.
*G06F 17/00* (2019.01)
*G06F 7/00* (2006.01)
(Continued)

(52) U.S. Cl.
CPC ............ *G06F 16/185* (2019.01); *G06F 16/13* (2019.01); *G06F 16/313* (2019.01)

(58) Field of Classification Search
CPC ....... G06F 16/185; G06F 16/313; G06F 16/13
(Continued)

(56) References Cited

U.S. PATENT DOCUMENTS

| 8,473,532 B1 | 6/2013 | Ben |
| 8,676,806 B2 | 3/2014 | Simard et al. |

(Continued)

FOREIGN PATENT DOCUMENTS

| CN | 110852079 | 2/2020 |
| JP | 2001-188697 | 7/2001 |

(Continued)

OTHER PUBLICATIONS

J. Eder, A. Krumpholz, A. Biliris and E. Panagos, "Self-maintained folder hierarchies as document repositories," Proceedings 2000 Kyoto International Conference on Digital Libraries: Research and Practice, Kyoto, Japan, 2001, pp. 400-407, doi: 10.1109/DLRP.2000.942201.

(Continued)

*Primary Examiner* — Pavan Mamillapalli
(74) *Attorney, Agent, or Firm* — Crowell & Moring LLP

(57) ABSTRACT

The present disclosure relates to folder-based data organization method and system. The method may include obtaining a keyword hierarchy for a plurality of documents. The keyword hierarchy may be configured for organizing the plurality of documents and include a plurality of levels for the keyword hierarchy. The method may further include generating a folder directory in a data storage system based on the keyword hierarchy. A folder hierarchy of the folder directory reflects at least a portion of the keyword hierarchy and folders in the folder hierarchy are named based on corresponding keywords in the at least a portion of the keyword hierarchy. The method may further include determining a target folder for storing one of the documents in the folder directory based on the keyword hierarchy path associated with the document and storing the document to the target folder in the folder directory.

30 Claims, 52 Drawing Sheets

(51) Int. Cl.
*G06F 16/13* (2019.01)
*G06F 16/185* (2019.01)
*G06F 16/31* (2019.01)

(58) Field of Classification Search
USPC .......................................................... 707/829
See application file for complete search history.

(56) References Cited

U.S. PATENT DOCUMENTS

| | | | |
|---|---|---|---|
| 8,812,439 | B2 | 8/2014 | King et al. |
| 10,691,639 | B1 | 6/2020 | Cronan |
| 10,884,979 | B2 | 1/2021 | Paterson et al. |
| 10,956,448 | B2 | 3/2021 | Bernhardy et al. |
| 2003/0149727 | A1* | 8/2003 | Jaschek .............. H04N 21/4668 348/E5.006 |
| 2004/0199539 | A1* | 10/2004 | Richardson .............. G06F 16/13 707/999.102 |
| 2007/0294231 | A1* | 12/2007 | Kaihotsu ................. G06F 16/70 707/999.003 |
| 2008/0118151 | A1* | 5/2008 | Bouguet ............. G06F 16/5854 382/181 |
| 2008/0281788 | A1* | 11/2008 | Frieder ................... G06F 16/14 707/999.003 |
| 2010/0094822 | A1* | 4/2010 | Kelapure ................ G06F 16/13 707/E17.015 |
| 2014/0122529 | A1* | 5/2014 | Frieder ................... G06F 16/22 707/778 |
| 2017/0242906 | A1 | 8/2017 | Lipka et al. |
| 2018/0067957 | A1 | 3/2018 | Paterson et al. |
| 2020/0387483 | A1* | 12/2020 | Kumar ................. G06F 16/243 |
| 2021/0149839 | A1 | 5/2021 | Paterson et al. |
| 2021/0303529 | A1 | 9/2021 | Kapoor et al. |
| 2021/0357367 | A1 | 11/2021 | Yazganarikan |
| 2022/0043772 | A1 | 2/2022 | Yamamoto |
| 2023/0214361 | A1* | 7/2023 | Hsu ....................... G06F 16/185 707/829 |

FOREIGN PATENT DOCUMENTS

| | | |
|---|---|---|
| JP | 2007-515695 | 6/2007 |
| JP | 2007-521532 | 8/2007 |
| JP | 2007-521533 | 8/2007 |
| JP | 2007-521537 | 8/2007 |
| JP | 2009-187136 | 8/2009 |
| JP | 2010-003309 | 1/2010 |
| JP | 4394644 | 1/2010 |
| JP | 4468530 | 5/2010 |
| JP | 4583377 | 11/2010 |
| JP | 4620165 | 1/2011 |
| TW | 498282 | 8/2002 |

OTHER PUBLICATIONS

F.X. Wisnu Yudo Untoro, "Automatic Lecture Meeting Folder Based on Hierarchical Directories", Journal of Telematics and Informatics (JTI), Vol. 7, No. 1, Mar. 2019, pp. 17-27.
Doscvolt, Electronic Filing System, https://docsvault.com/, 2012.
M-Files, https://www.m-files.com/, 2022.
International Search Report and Written Opinion of the International Searching Authority dated Jul. 6, 2023 in International (PCT) Application No. PCT/U823/18580.

* cited by examiner

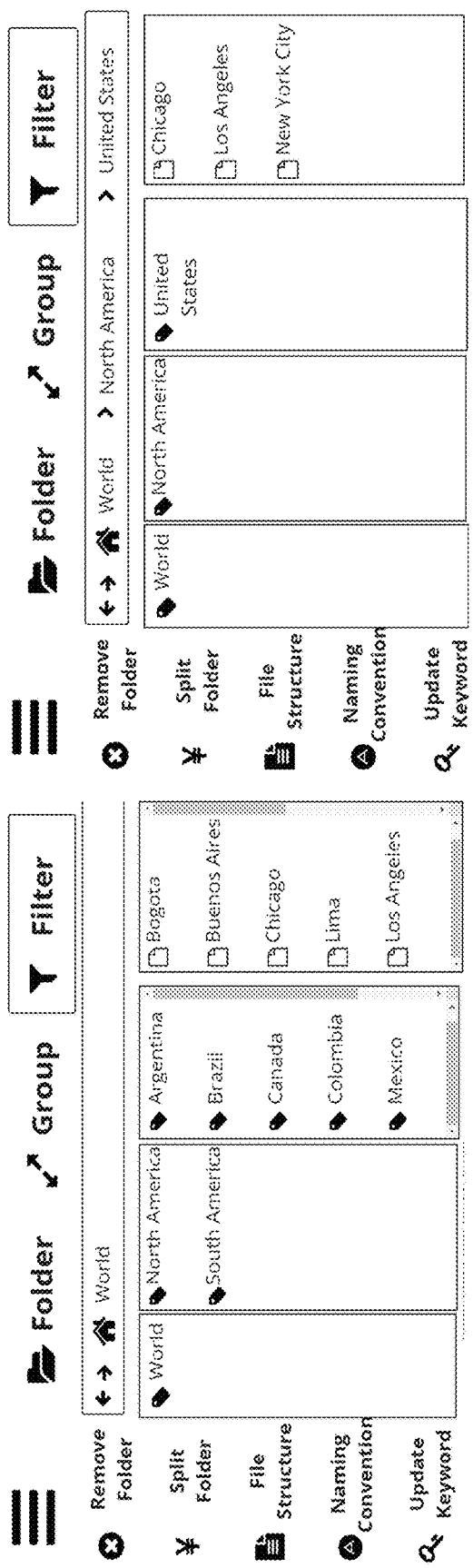
FIG. 13-2A
FIG. 13-2C
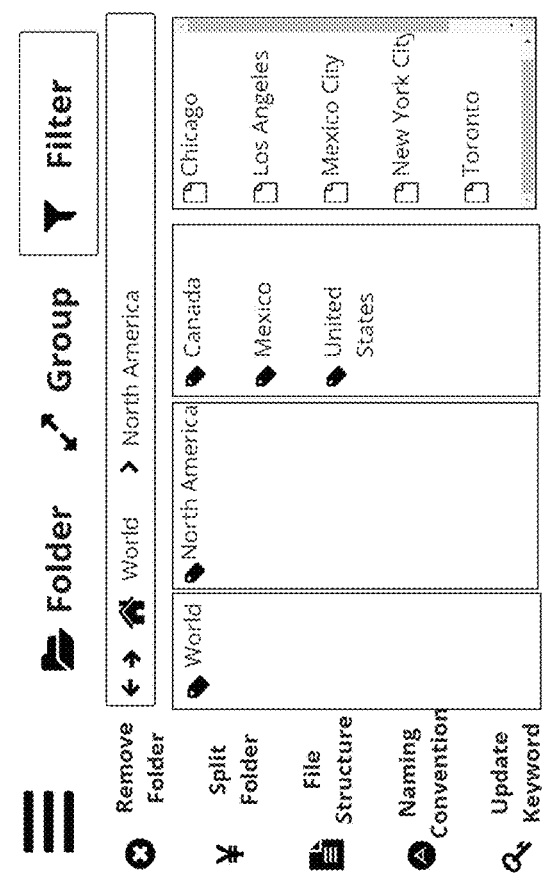
FIG. 13-2B

INTELLIGENT FOLDER-BASED DATA ORGANIZATION SYSTEM

RELATED APPLICATION

This application claims priority to U.S. Provisional Patent Application No. 63/333,179, entitled "FOLDER-FILE BASED COMPUTER STORAGE SYSTEM" filed on Apr. 21, 2022, wherein the entirety of the above-referenced application is incorporated herein by reference.

TECHNICAL FIELD

This disclosure relates to data organization, in particular, to organizing data based on folders.

BACKGROUND

It is known to organize computer files in a directory structure composed of folders. The folders may be graphically represented on a computer display as icons, and the folder directory structure is viewed as a metaphor for physical filing cabinets and folders. In the era of data expansion, the large scale of data is rapidly generated and stored in data storage such as hard disk drive or solid state drive. The task of manually organizing data with directories and folders has become burdensome for computer users.

SUMMARY

This disclosure relates to systems and methods for organizing data based on folders.

In one embodiment, a folder-based data organization method is disclosed. The method may be performed by a processor circuitry. The method may include obtaining a keyword hierarchy for a plurality of documents. The keyword hierarchy may be configured for organizing the plurality of documents and include a plurality of levels for the keyword hierarchy. Each of the plurality of levels includes at least one keyword, with each of the plurality of documents associated with a keyword hierarchy path that routes to the document in the keyword hierarchy. The method may further include generating a folder directory in a data storage system based on the keyword hierarchy. The folder directory may be displayed for navigating the plurality of documents. A folder hierarchy of the folder directory reflects at least a portion of the keyword hierarchy and folders in the folder hierarchy are named based on corresponding keywords in the at least a portion of the keyword hierarchy. The method may further include determining a target folder for storing one of the documents in the folder directory based on the keyword hierarchy path associated with the document and storing the document to the target folder in the folder directory.

In some implementations, the method may generate a plurality of folder directories separately in a data storage system based on the keyword hierarchy. The plurality of folder directories may respectively reflect different folder view options for navigating the plurality of documents. In each of the plurality of folder directories, a folder hierarchy of the folder directory reflects at least a portion of the keyword hierarchy and folders in the folder hierarchy are named based on corresponding keywords in the at least a portion of the keyword hierarchy. The method may further include duplicating the plurality of documents for each of the plurality of folder directories; for each of the duplicated documents, determining a target folder for storing the duplicated document in the folder directory base on a keyword hierarchy path associated with the duplicated document; and storing the duplicated document to the target folder in the folder directory.

In another embodiment, a folder-based data organization system is disclosed. The system may include a memory having stored thereon executable instructions and a processor circuitry in communication with the memory. When executing the instructions, the processor circuitry may be configured to obtain a keyword hierarchy for a plurality of documents. The keyword hierarchy may be configured for organizing the plurality of documents and include a plurality of levels for the keyword hierarchy. Each of the plurality of levels includes at least one keyword, with each of the plurality of documents associated with a keyword hierarchy path that routes to the document in the keyword hierarchy. The processor circuitry may be further configured to generate a folder directory in a data storage system based on the keyword hierarchy. The folder directory may be displayed for navigating the plurality of documents. A folder hierarchy of the folder directory reflects at least a portion of the keyword hierarchy and folders in the folder hierarchy are named based on corresponding keywords in the at least a portion of the keyword hierarchy. The processor circuitry may be further configured to determine a target folder for storing one of the documents in the folder directory based on the keyword hierarchy path associated with the document and store the document to the target folder in the folder directory.

In another embodiment, a folder-based data organization product is disclosed. The product may include machine-readable media other than a transitory signal and instructions stored on the machine-readable media. When being executed, the instructions may be configured to cause a processor circuitry to obtain a keyword hierarchy for a plurality of documents. The keyword hierarchy may be configured for organizing the plurality of documents and include a plurality of levels for the keyword hierarchy. Each of the plurality of levels includes at least one keyword, with each of the plurality of documents associated with a keyword hierarchy path that routes to the document in the keyword hierarchy. The instructions may be further configured to cause the processor circuitry to generate a folder directory in a data storage system based on the keyword hierarchy. The folder directory may be displayed for navigating the plurality of documents. A folder hierarchy of the folder directory reflects at least a portion of the keyword hierarchy and folders in the folder hierarchy are named based on corresponding keywords in the at least a portion of the keyword hierarchy. The instructions may be further configured to cause the processor circuitry to determine a target folder for storing one of the documents in the folder directory based on the keyword hierarchy path associated with the document and store the document to the target folder in the folder directory.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

FIG. 7A-1 shows an exemplary removing operation for the folder hierarchy.

FIGS. 7A-2A-7A-2C show an exemplary removing operation in the folder view.

FIG. 7B-1 shows another exemplary removing operation for the folder hierarchy.

FIGS. 7B-2A-7B-2C show another exemplary removing operation in the folder view.

FIG. 7C-1 shows another exemplary removing operation for the folder hierarchy.

FIGS. 7C-2A-7C-2C show another exemplary removing operation in the folder view.

FIG. 7D-1 shows another exemplary removing operation for the folder hierarchy.

FIGS. 7D-2A-7D-2C show another exemplary removing operation in the folder view.

FIG. 8-1 shows an exemplary splitting operation for the folder hierarchy.

FIGS. 8-2A-8-2D show an exemplary splitting operation in the folder view.

FIG. 9-1 shows an exemplary navigation hierarchy for the folder directory.

FIGS. 9-2A-9-2D show an exemplary group view for the folder directory.

FIG. 11-1 shows an exemplary splitting operation for the navigation hierarchy.

FIGS. 11-2A-11-2D show an exemplary splitting operation in the group view.

FIG. 12A-1 shows an exemplary removing operation for the navigation hierarchy.

FIGS. 12A-2A-12A-2C show an exemplary removing operation in the group view.

FIG. 12B-1 shows another exemplary removing operation for the navigation hierarchy.

FIGS. 12B-2A-12B-2C show another exemplary removing operation in the group view.

FIG. 12C-1 shows another exemplary removing operation for the navigation hierarchy.

FIGS. 12C-2A-12C-2C show another exemplary removing operation in the group view.

FIG. 13-1 shows an exemplary filtering hierarchy for the folder directory.

FIGS. 13-2A-13-2C show an exemplary filtering view for the folder directory.

FIG. 15-1 shows an exemplary splitting operation for the filtering hierarchy.

FIGS. 15-2A-15-2D show an exemplary splitting operation in the filtering view.

FIG. 16A-1 shows an exemplary removing operation for the filtering hierarchy.

FIGS. 16A-2A-16A-2B show an exemplary removing operation in the filtering view.

FIG. 16B-1 shows another exemplary removing operation for the filtering hierarchy.

FIGS. 16B-2A-16B-2B show another exemplary removing operation in the filtering view.

FIG. 16C-1 shows another exemplary removing operation for the filtering hierarchy.

FIGS. 16C-2A-16C-2B show another exemplary removing operation in the filtering view.

FIGS. 17A-2A-17A-2B show an exemplary keyword addition operation in the folder view.

FIGS. 17B-1A-17B-1B show an exemplary keyword removing operation for the keyword hierarchy.

FIGS. 17B-2A-17B-2B show an exemplary keyword removing operation in the folder view.

FIGS. 17C-1A-17C-1B show another exemplary keyword addition operation for the keyword hierarchy.

FIGS. 17C-2A-17C-2B show another exemplary keyword addition operation in the folder view.

FIG. 18-1 shows an exemplary naming convention for the folders and documents for the folder directory.

FIGS. 18-2A-18-2C show an exemplary naming convention for the folders and documents in the folder view.

FIG. 19-1 shows an exemplary imperfect folder hierarchy for the folder directory.

FIGS. 19-2A-19-2D show an exemplary imperfect folder view for the folder directory.

DETAILED DESCRIPTION

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in an embodiment" or "in an implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

Herein, data to be organized may represent different types of information formatted in a particular manner and the information may be stored in storage devices and processed by a processing device. Data may be represented as a plurality of documents which take a variety of forms, including text, images, audio, video, or a combination thereof. The documents may include structured documents, semi-structured documents, and unstructured documents.

One of the objectives of the present disclosure is to automatically organize the data based on folders in an effective and efficient way such that the user may readily navigate through the data.

Figure 1:
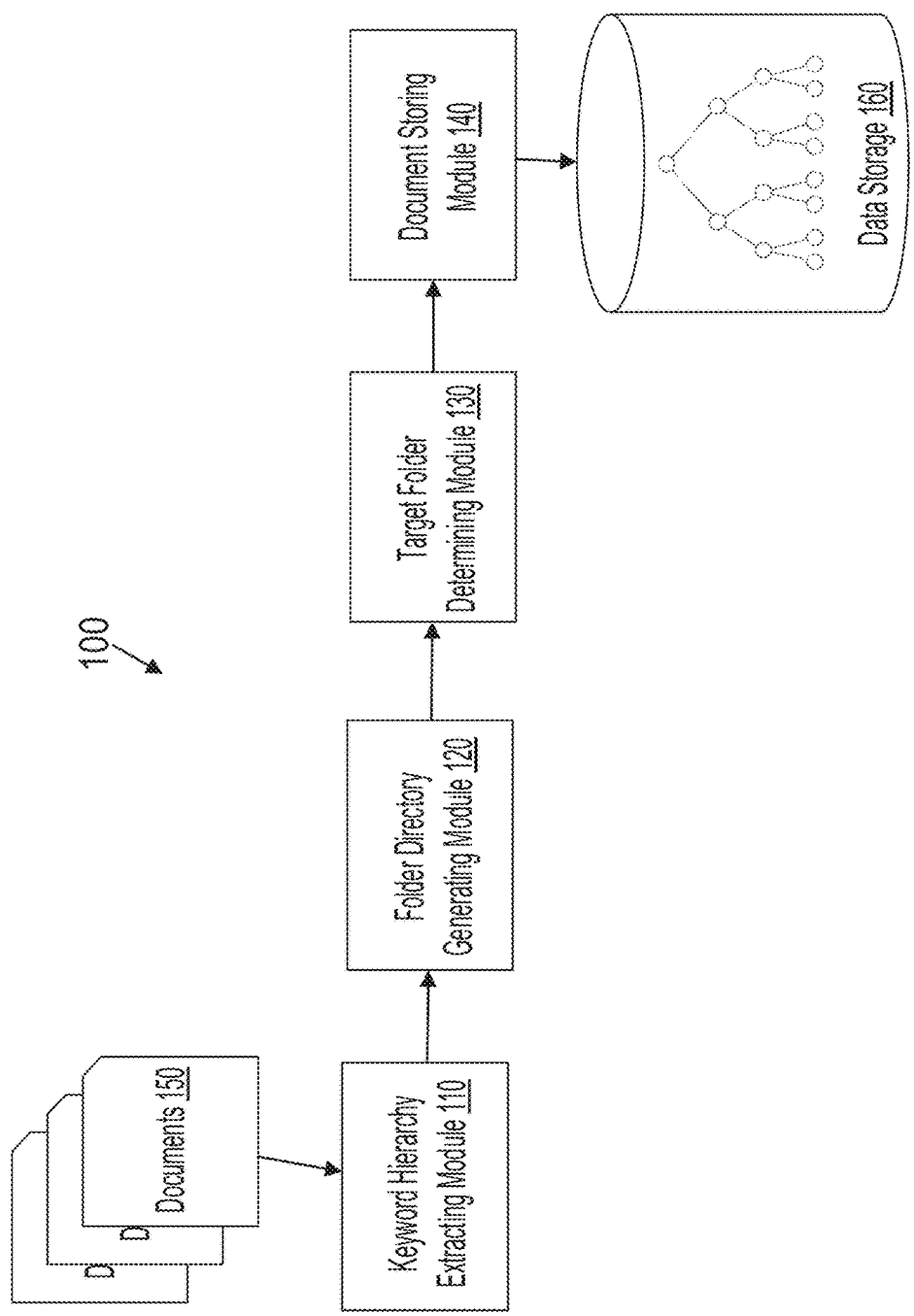
FIG. 1 shows an exemplary system for organizing data based on folders.

FIG. 1 shows exemplary architecture 100 for organizing data based on folders. The architecture 100 may include keyword hierarchy extracting module 110, folder directory generating module 120, target folder determining module 130, and document storing module 140. The modules may operate collaboratively to implement data organization as discussed in the present disclosure.

Herein, the term module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the unit. A module is configured to perform functions and achieve goals such as those described in this disclosure, and may work together with other related modules, programs, and components to achieve those functions and goals.

Figure 2:
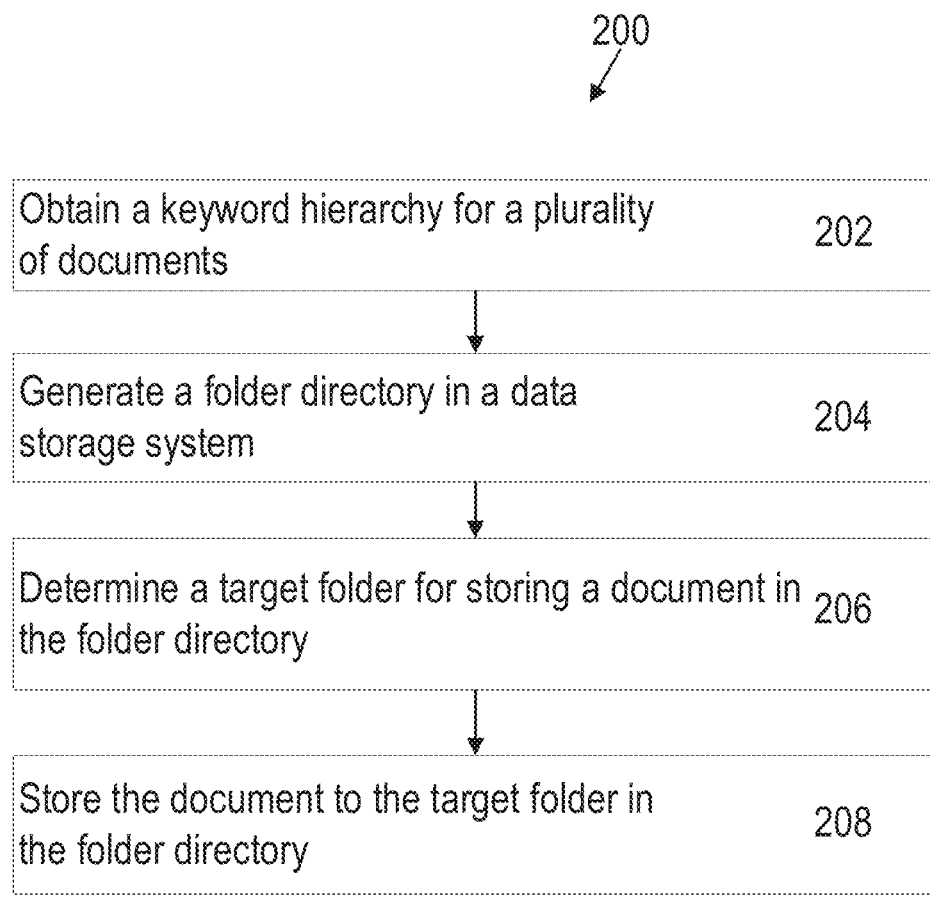
FIG. 2 shows an exemplary folder-based data organization logic.

FIG. 2 shows an exemplary folder-based data organization logic (FBDOL) 200. The logical features of the FBDOL 200 may be implemented in various orders and combinations. For example, in a first implementation, one or more features may be omitted or reordered with respect to a second implementation. The logical features will be discussed with reference to the modules in FIG. 1.

At the keyword hierarchy extracting module 110, the FBDOL 200 may obtain a keyword hierarchy for a plurality of documents (202). The keyword hierarchy may be configured for organizing the plurality of documents and comprising a plurality of levels of keywords. Each of the plurality of levels may include one or more keywords. The keywords associated with each of the plurality of documents may provide a compact representation of the document, for example, including the properties of the document, the content of the document, or the context information of the document.

In an implementation, the FBDOL 200 may generate the keyword hierarchy based on file properties of the documents, content of the documents, contextual information of the documents, or the combination thereof. The file properties of a document may include, for example, the name, author, size, creation and modification dates, tags, comments, and the like. The content of a document may include, for example, text, graph, chart, image, and the like in the document. The contextual information of a document may include, for example, the structure of the document, the relationship of the document with other documents, classification of the document, the place where the document is generated, and the like.

Figure 3:
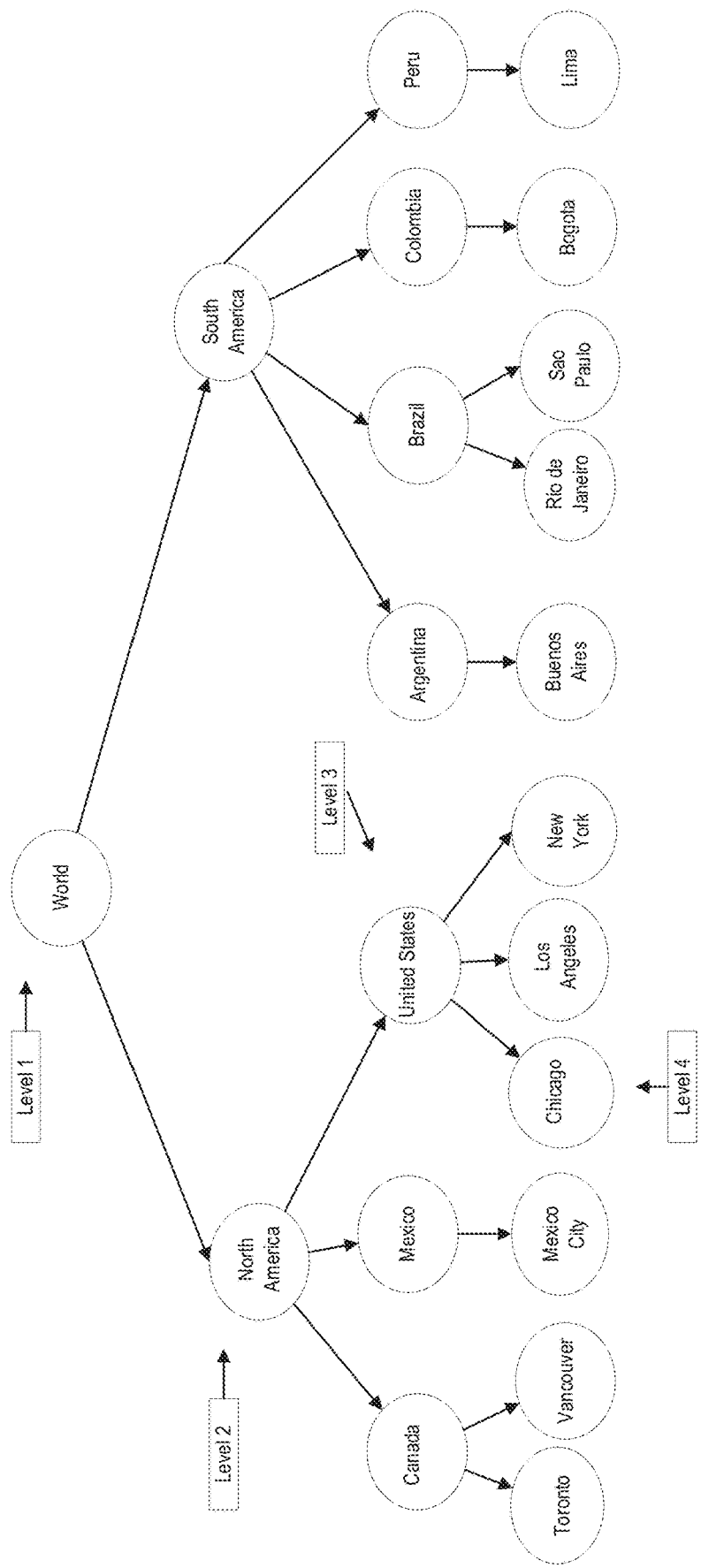
FIG. 3 shows an exemplary keyword hierarchy for documents to be organized.

FIG. 3 shows an exemplary keyword hierarchy for the documents. The exemplary keyword hierarchy is in the form of a tree structure and includes four levels. The first or top level of the keyword hierarchy includes one keyword "World;" the second level of the keyword hierarchy includes two keywords "North America" and "South America;" the third level of the keyword hierarchy includes keywords "Canada," "Mexico," "United States," "Argentina," "Brazil," "Colombia," and "Peru," and the fourth or bottom level of the keyword hierarchy includes keywords "Toronto," "Vancouver," "Mexico City," "Chicago," "Los Angeles," "New York," "Buenos Aires," "Rio de Janeiro," "Sao Paulo," "Bogota," and "Lima."

Herein, embodiments of the present disclosure would be discussed in the context of the exemplary keyword hierarchy as shown in FIG. 3. However, it should be appreciated that other keyword hierarchy with different structures and different number of levels are applicable to the data organization systems and methods in the present disclosure.

In an implementation, the FBDOL 200 may generate some keywords for each of the documents based on predetermined rules and identify the common keywords among the documents to form the keyword hierarchy for the documents. The keyword hierarchy may be in the form a tree structure or a forest structure.

In another implementation, the FBDOL 200 may make use of an applicable artificial intelligence model to generate the keywords and form the keyword hierarchy. For example, the FBDOL 200 may obtain a keyword learning model trained to extract keywords describing a document from content of the document. The keyword learning model may, for example, include a natural language processing model such as Bidirectional Encoder Representations from Transformers (BERT), Generative Pre-trained Transformer (GPT), and XLNet. Then, the FBDOL 200 may input content of the documents to the keyword learning model to generate the keyword hierarchy for the documents based on the content.

At the folder directory generating module 120, the FBDOL 200 may generate a folder directory in a data storage system such as the data storage 160 based on the keyword hierarchy (204). The data storage system may include, for example, cloud storage, relational database, file system, and other data operations. The folder directory may be displayed, for example via graphical user interface (GUI), for navigating the folders and documents associated with the folder of the folder directory.

Figure 4:
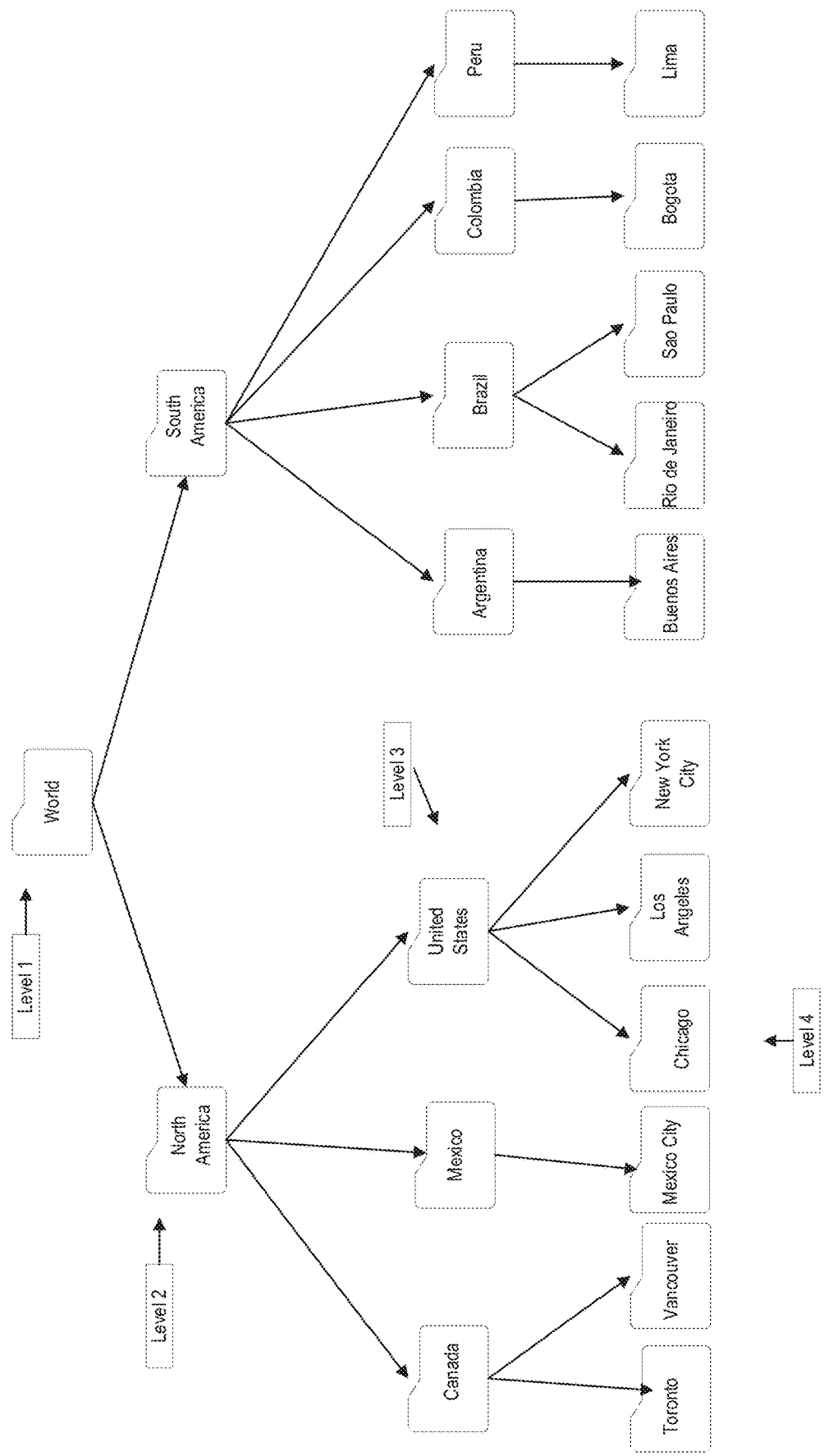
FIG. 4 shows an exemplary folder hierarchy for a folder directory generated based on the exemplary keyword hierarchy.
Figure 5A:
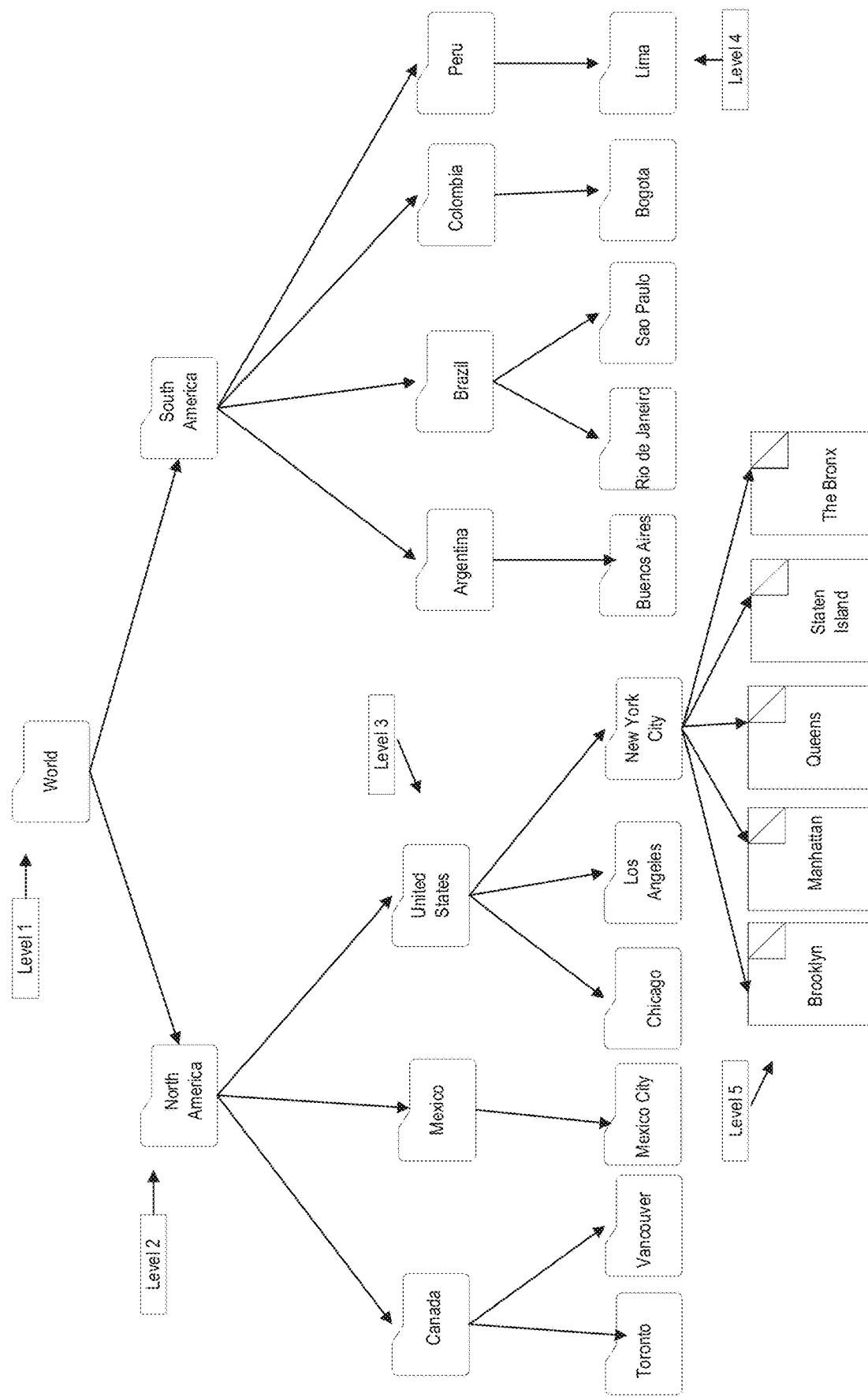
FIGS. 5A-5C show another exemplary folder hierarchy for the folder directory.

The folder hierarchy of the folder directory may reflect at least a portion of the keyword hierarchy. In an implementation, the FBDOL 200 may generate the folder directory such that the folder hierarchy of the folder directory reflects all levels of the keyword hierarchy. In other words, the FBDOL 200 may generate folders for each of the keyword nodes in the keyword hierarchy to form the folder directory. As a result, the folder hierarchy of the folder directory is identical with the keyword hierarchy, as shown in FIG. 4. In an implementation, the folders in the folder hierarchy may be named based on corresponding keywords in the keyword hierarchy. For example, the names of the folders are identical with the corresponding keywords in the keyword hierarchy. The documents associated with a keyword may be associated with a folder corresponding to the keyword. For example, as shown in FIG. 5A, the documents "Brooklyn," "Manhattan," "Queens," "Staten Island," and "The Bronx" are associated with the keyword "New York City" and are connected to the corresponding folder "New York City" at the fifth level of the folder directory.

Figure 5B:
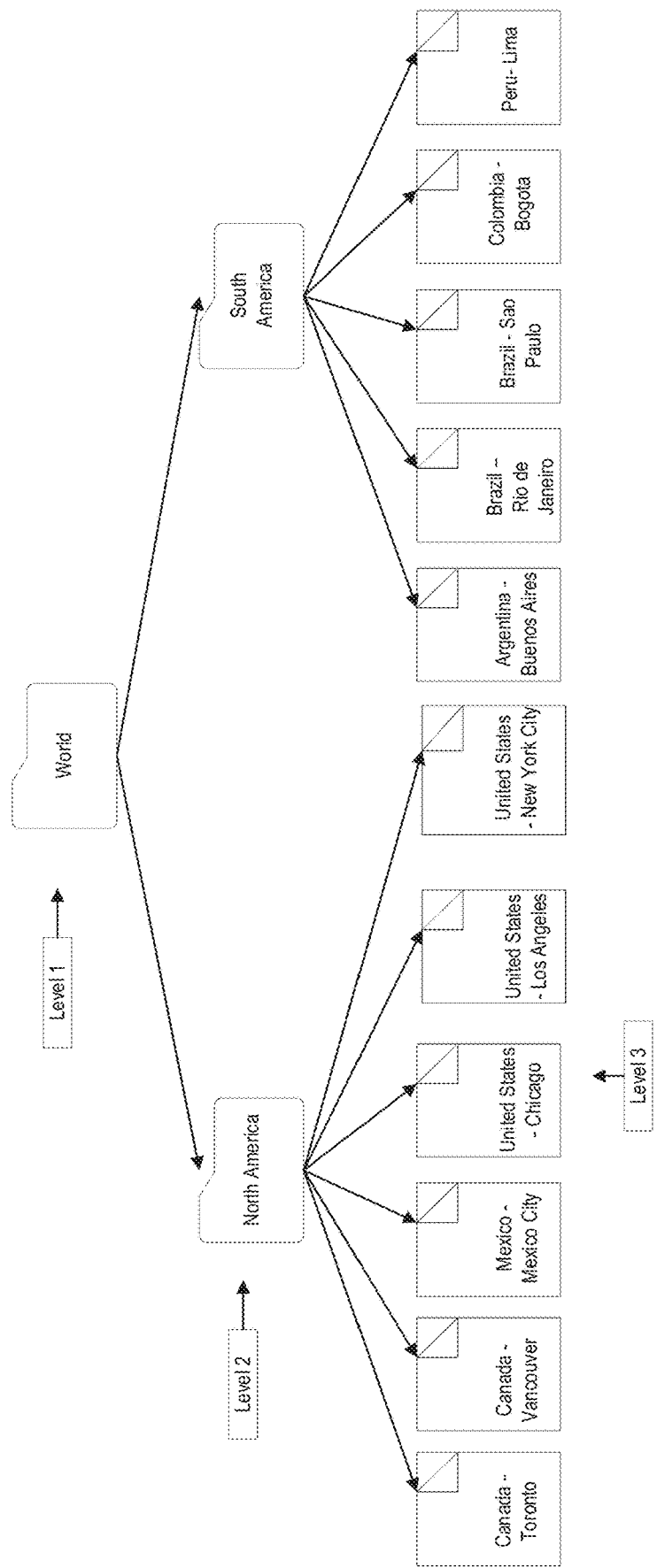
Figure 5C:
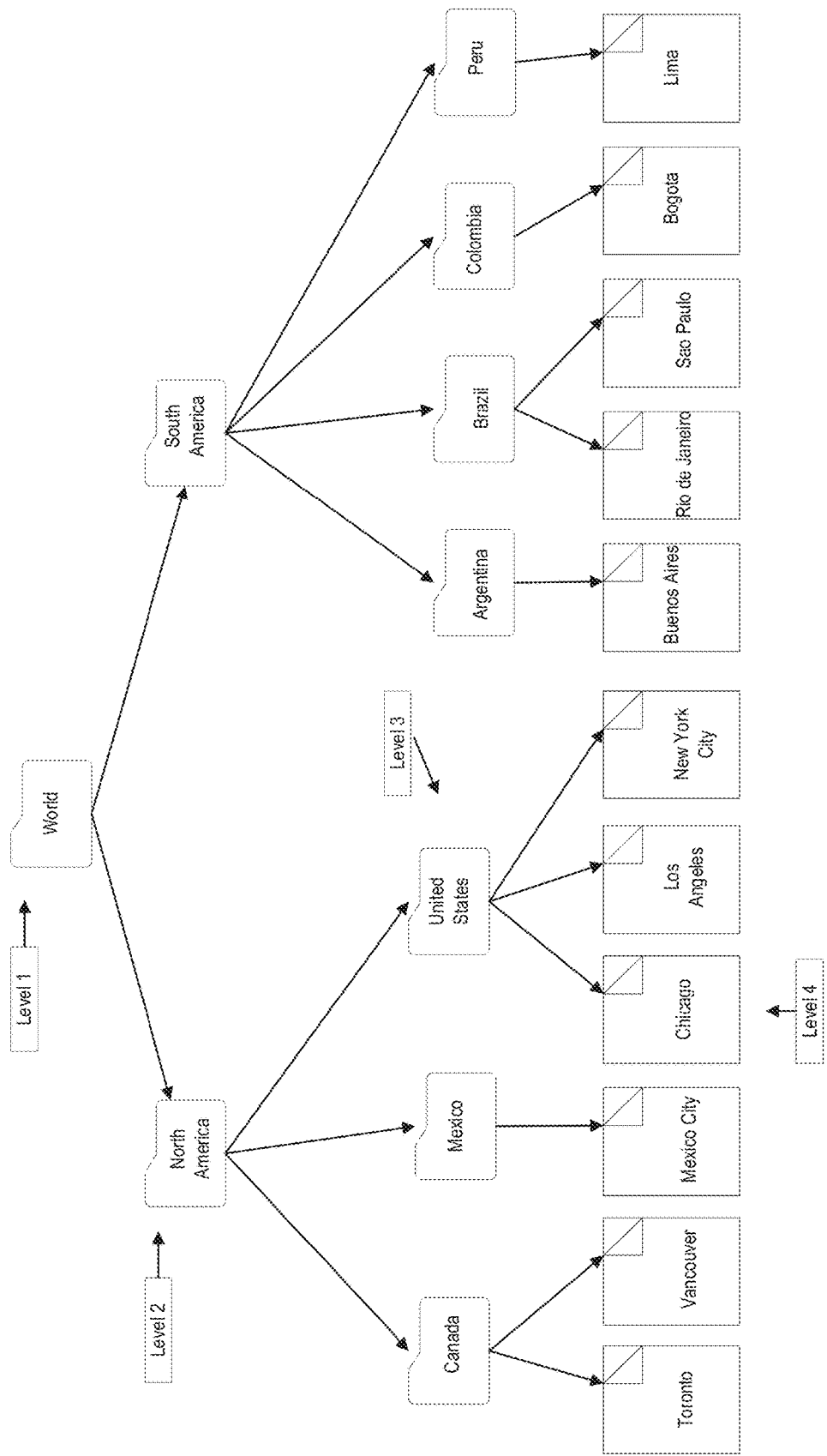
Figure 6A:
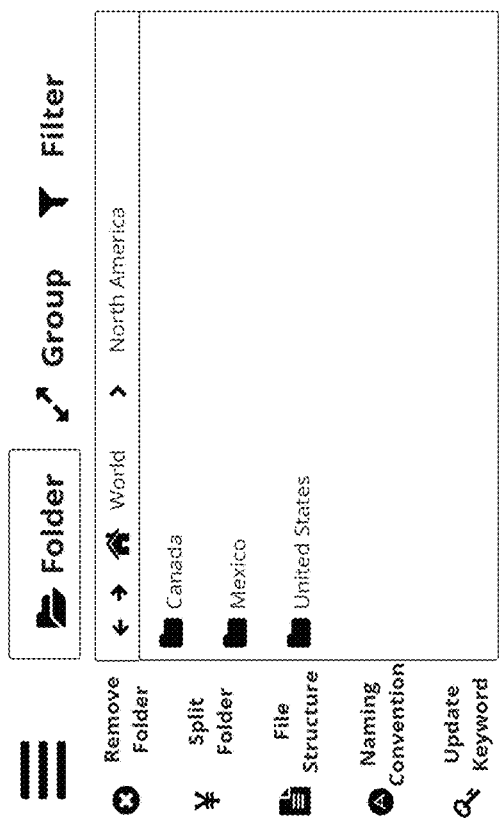
FIGS. 6A-6D show an exemplary folder view for the folder directory.
Figure 6B:
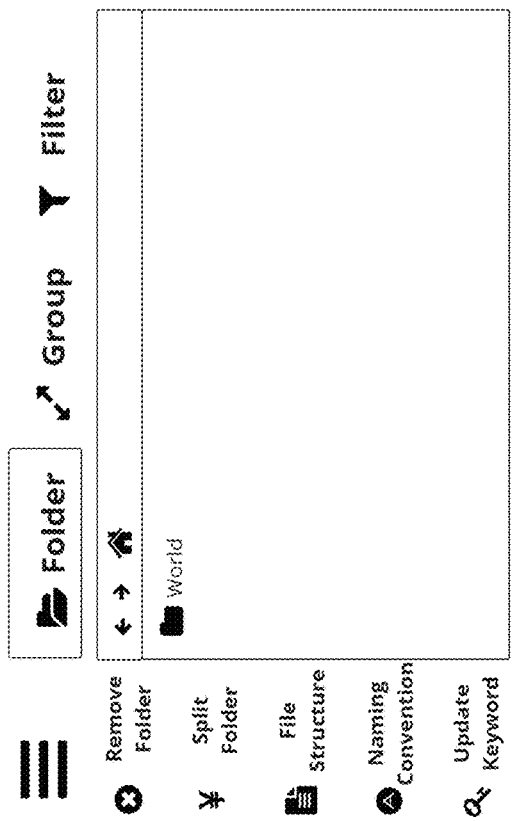
Figure 6C:
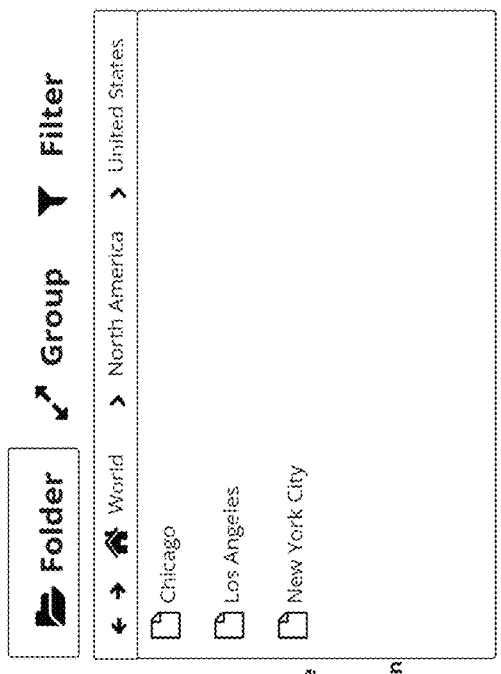
Figure 6D:
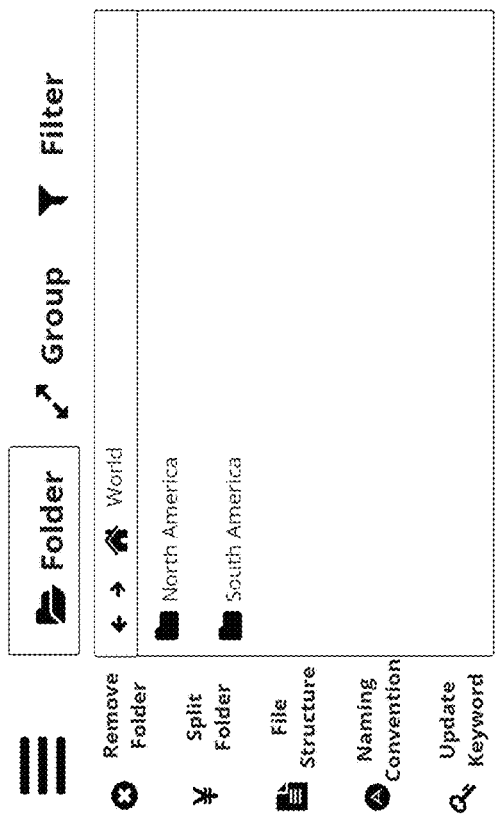

In some implementations, the FBDOL 200 may generate the folder directory to only reflect some levels of the keyword hierarchy. Take the exemplary keyword hierarchy shown in FIG. 3 as example, the FBDOL 200 may generate the folder directory to reflect the top level and the second level of the keyword hierarchy, and omit to reflect the third level and the bottom level of the keyword hierarchy, as shown in FIG. 5B. In the example as shown in FIG. 5B, the keywords at the third level and the bottom level of the keyword hierarchy shown in FIG. 3 are used to name the documents at the third level of the folder hierarchy. In another example, the FBDOL 200 may generate the folder directory to reflect the top level, the second level, and the third level of the keyword hierarchy and omit to reflect the bottom level of the keyword hierarchy, as shown in FIG. 5C. In this example, keywords at the bottom level of the keyword hierarchy may be used to name the documents.

In the keyword hierarchy, each of the plurality of documents is associated with a keyword hierarchy path that routes to the document. The keyword hierarchy path may represent a path from a top-level keyword to a lower-level keyword in the keyword hierarchy and the lower-level keyword is directed to the document. In an example with reference to the exemplary keyword hierarchy shown in FIG. 3, each of the bottom level keywords is used to represent a document. Where a document is represented by the bottom level keyword "Chicago," the keyword hierarchy path associated with the document may be "World-North America-United States" or "World-North America-United States-Chicago." In another example with reference to the exemplary keyword hierarchy shown in FIG. 3, a bottom level keyword is to represent a folder which may include one or more documents. As such, where a document is in a folder associated with the bottom level keyword "Chicago," the keyword hierarchy path associated with the document is "World-North America-United States-Chicago."

At the target folder determining module 130, the FBDOL 200 may determine a target folder for storing one of the documents in the folder directory based on the keyword hierarchy path associated with the document (206). In an implementation, the FBDOL 200 may identify a folder path matching the keyword hierarchy path associated with the document in the folder directory and determine a folder to which the folder path routes as the target folder.

In an example, the document is associated with the keyword hierarchy path "World-North America-United States-Chicago" and the folder directory is generated as shown in FIG. 5B. As the folder directory does not include lower-level folders corresponding to the third level and the fourth level in the keyword hierarchy, the FBDOL 200 may identify the folder path "World-North America" in the folder directory to match the keyword hierarchy path "World-North America-United States-Chicago." As a result, the FBDOL 200 may determine the "North America" folder as the target folder for storing the document.

In another example, the document is represented by the keyword "Chicago" and associated with the keyword hierarchy path portion "World-North America-United States," and the folder directory is generated as shown in FIG. 5C. With the keyword hierarchy path portion, the FBDOL 200 may identify the matching folder path "World-North America-United States" in the folder directory, and thus determine the "United States" folder as the target folder for storing the document.

After determining the target folder, the FBDOL 200 may store the document to the target folder in the folder directory at the document storing module 140 (208). In an implementation, the document may be stored with the name determined based on the keyword hierarchy path associated with the document. Specifically, the FBDOL 200 may identify a keyword hierarchy path associated with the document in the keyword hierarchy as discussed above and rename the document with at least a portion of keywords in the keyword hierarchy path. For example, where the document is associated with the keyword hierarchy path "World-North America-United States-Chicago," the FBDOL 200 may rename the document with one or more keywords in the keyword hierarchy path. The document may be renamed as, for example, "Chicago," "United States-Chicago," "North America-United States-Chicago," or "World-North America-United States-Chicago." In this way, the FBDOL 200 may automatically organize all the documents into the folder directory.

In some implementations, the folder path of the folder directory may not fully reflect the keyword hierarchy path in the keyword hierarchy. For example, as shown in FIG. 5B, the keyword hierarchy path "World-North America-United States-Chicago" for a document is partially reflected by the folder path "World-North America" To maintain the whole keyword hierarchy path for the document in the folder directory, the FBDOL 200 may identify a folder path routing to the document and identify a keyword hierarchy path associated with the document, determine a portion of the keyword hierarchy path not reflected by the folder path, and rename the document to reflect the portion of the keyword hierarchy path not reflected by the folder path based on a predetermined naming convention.

In the same example, as the portion "United States-Chicago" of the keyword hierarchy path is not reflected by the folder path in the folder directory, the FBDOL 200 may rename the document to reflect the keyword hierarchy path portion ""United States-Chicago". The FBDOL 200 may generate a keyword sequence including keywords "United States" and "Chicago," The keyword sequence may follow a predetermined sequence pattern such as "United States-Chicago" or "Chicago-United States." Here, the dash symbol is used as the delimiter to form the keyword sequence by way of example. Any other applicable symbol may be used as the delimiter. Then, the FBDOL 200 may rename the document with the keyword sequence such that the folder path in combination with the keyword sequence in the new name of the document reflecting an entirety of the keyword hierarchy path associated with the document. In this example, the folder path "World-North America" in combination with the name of the document "United States-Chicago" may reflect the entire keyword hierarchy path "World-North America-United States-Chicago."

Here, it would be appreciated that any other naming conventions for the document are applicable as long as they can properly reflect the keyword hierarchy path. For example, the document may also be renamed as "1 United States 2 Chicago," "United States_Chicago," and "[United States [Chicago]]."

The folders and documents in the folder directory may be viewed and operated in different ways to facilitate the user to navigate the documents. For example, the folders and documents may be displayed in folder view, group view, or filtering view for different interaction operations via the graphical user interface (GUI). FIGS. 6A-6D show an exemplary folder view for the folder directory. For example, the user may navigate from the "World" folder shown in FIG. 6A to its lower-level folders "North America" and "South America" shown in FIG. 6B. The user may further navigate from the "North America" folder shown in FIG. 6B to its lower-level folders "Canada," "Mexico," and "United States" shown in FIG. 6C. Similarly, the user may further navigate from the "United States" folder shown in FIG. 6C to its lower-level documents "Chicago," "Los Angeles," and "New York City" shown in FIG. 6D. In the folder view, in response to the user's request input via the GUI, the FBDOL 200 may perform removing operation and splitting operation on the folders.

Figures 1, 7A:
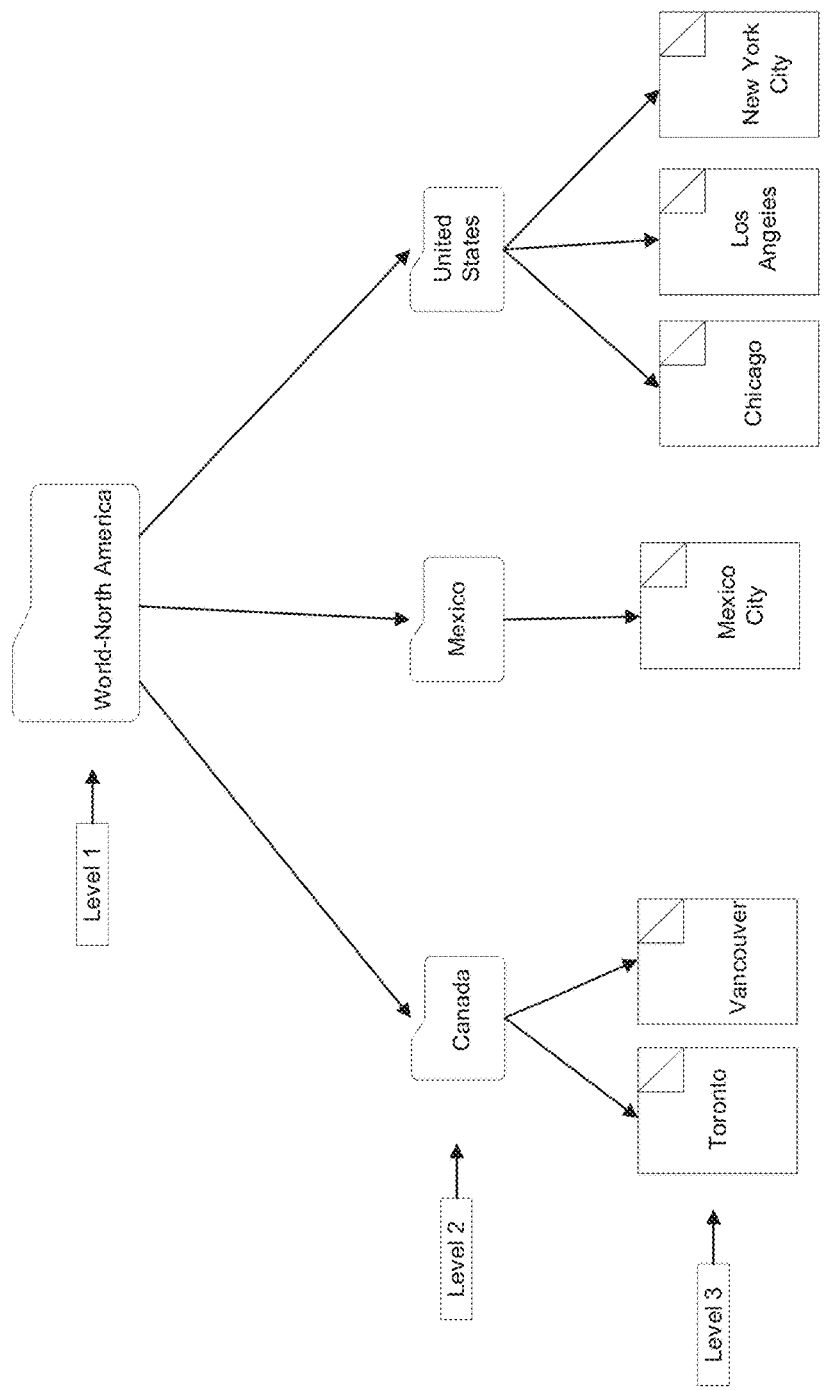
Figures 2C, 7A:
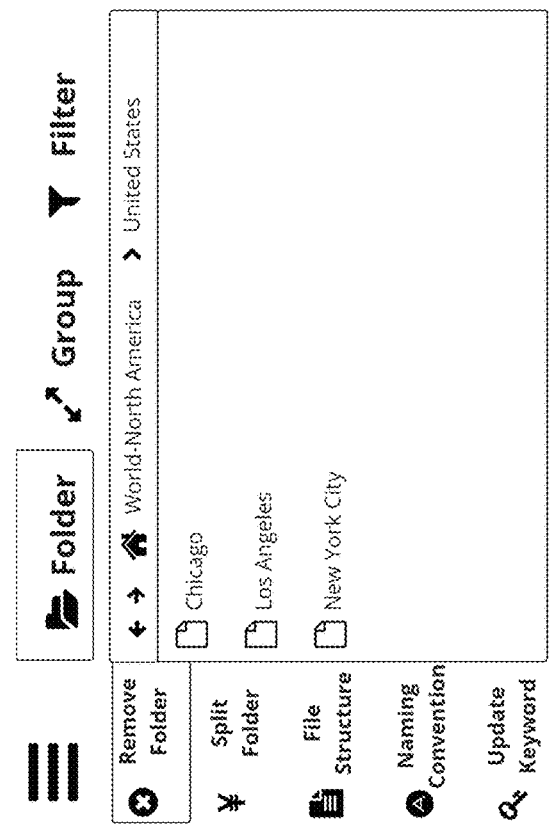
Figures 2A, 7A:
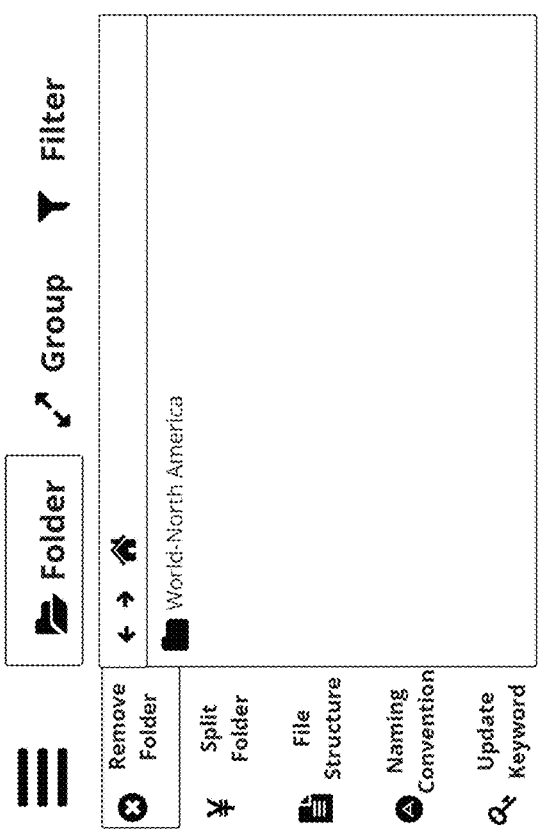

The folder hierarchy of the folder directory may be a perfect hierarchy or an imperfect hierarchy. In a perfect folder hierarchy, the documents are only at the bottom level of the folder directory. Where the folder directory has a perfect folder hierarchy and the user operates in the folder view to remove a folder at a level of the folder hierarchy, the FBDOL 200 may determine an upper-level folder of the folder and update a name of the upper-level folder to include a name of the folder. For example, the folder to be removed is "North America," the FBDOL 200 may determine that the upper-level folder of the "North America" folder is the "World" folder and rename the "World" folder as "World-North America" as shown in FIG. 7A-1 Then, the FBDOL 200 may move the lower-level folders "Canada," "Mexico," and "United States" of the "North America" folder up to be connected with the upper-level folder of "World-North America" and remove the "North America" folder as shown in FIG. 7A-1. As a result, the folder view displays the "World-North America" folder after the removal as shown in FIG. 7A-2A. The user may navigate from the "World-North America" folder shown in FIG. 7A-2A to its lower-level folders "Canada," "Mexico," and "United States" shown in FIG. 7A-2B. The user may further navigate from the "United States" folder shown in FIG. 7A-2B to its lower-level documents "Chicago," "Los Angeles," and "New York City" shown in FIG. 7A-2C.

Figures 2B, 7A:
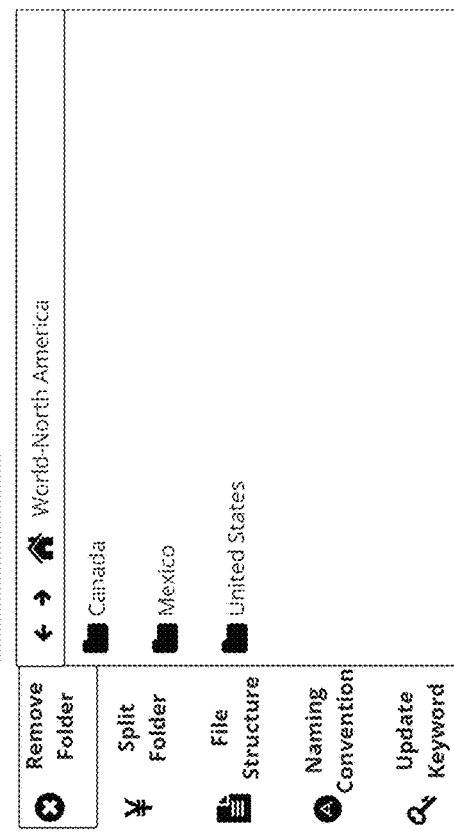
Figures 1, 7B:
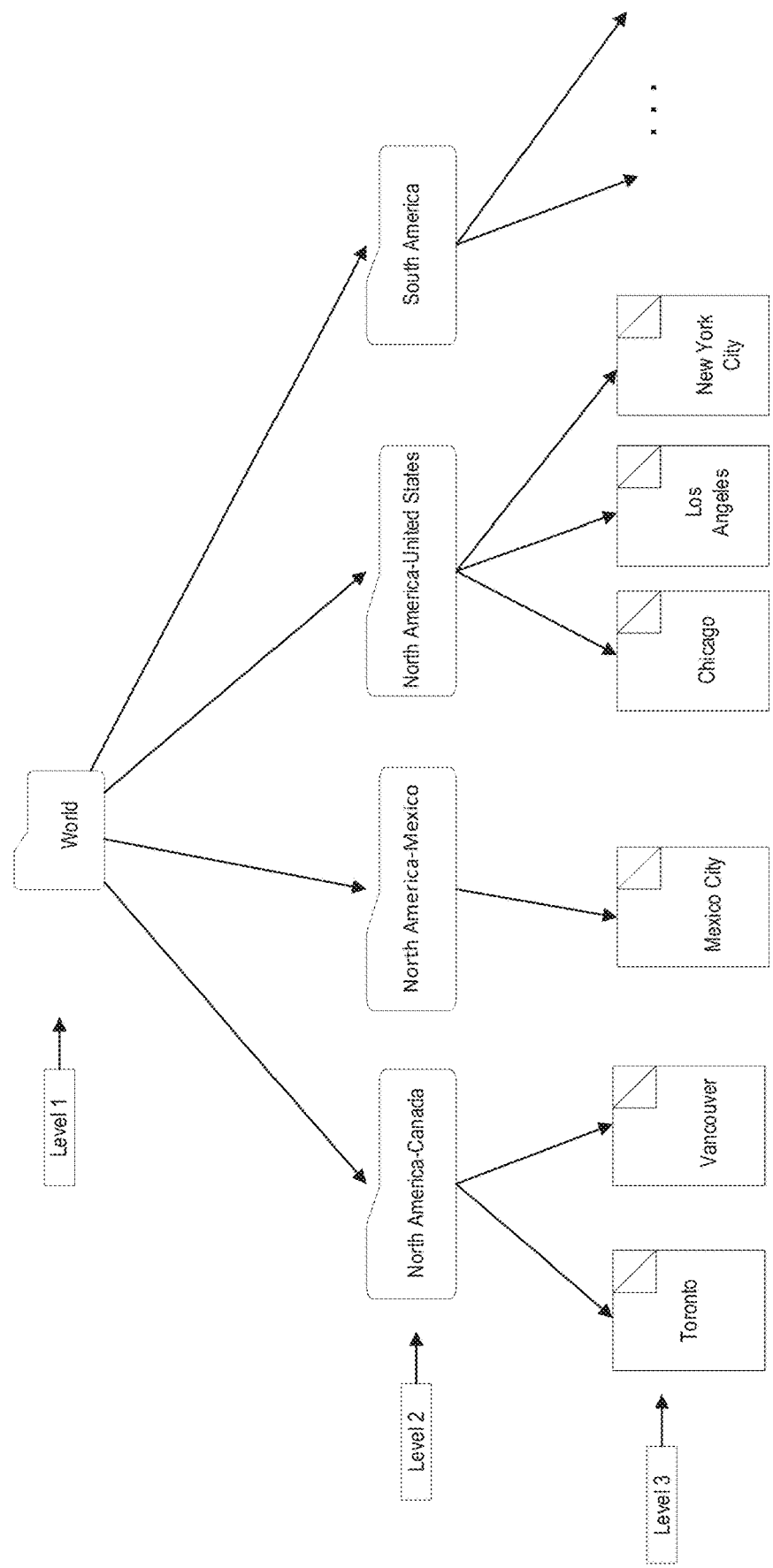
Figures 2A, 7B:
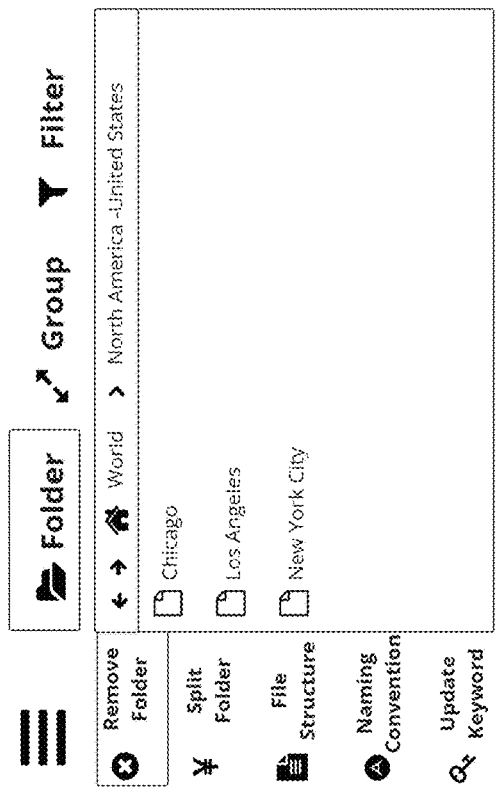
Figures 2B, 7B:
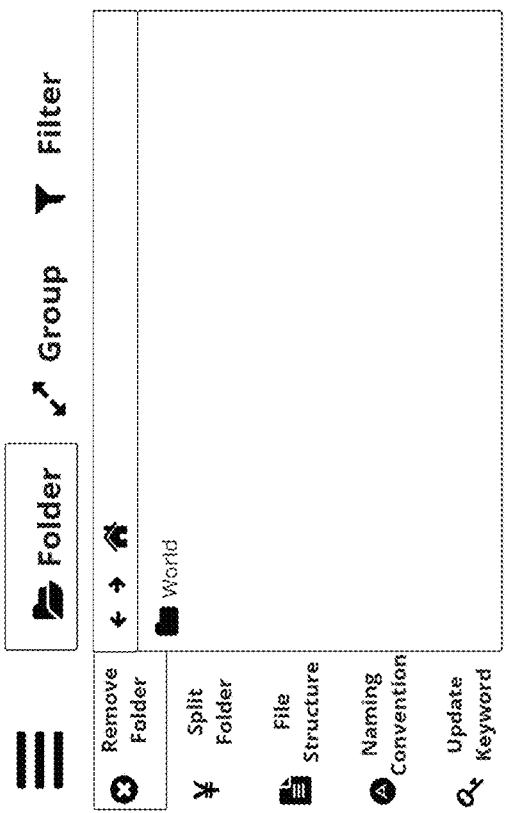
Figures 2C, 7B:
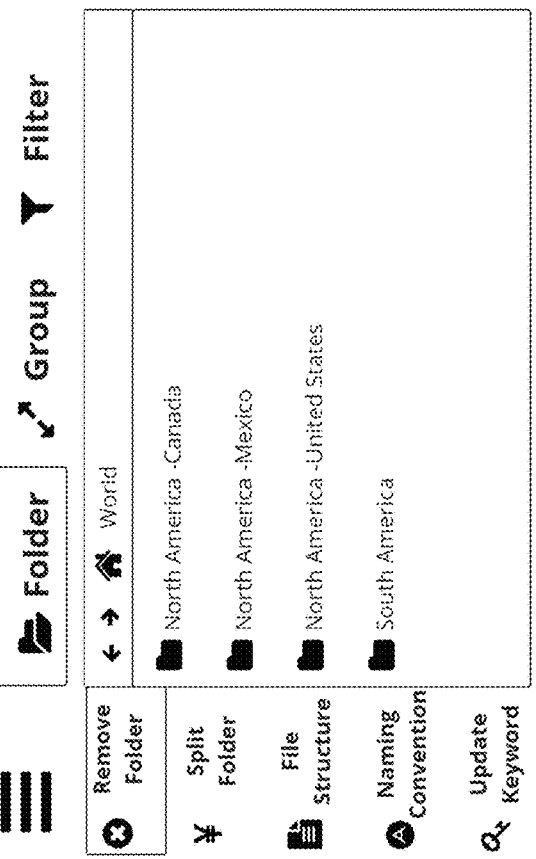

Alternatively, the FBDOL 200 may determine lower-level folders of the folder and update names of the lower-level folders to include the name of the folder. For example, the folder to be removed is "North America," the FBDOL 200 may determine that the lower-level folders of the "North America" folder are folders "Canada," "Mexico," and "United States" and rename the lower-level folders as "North America-Canada," "North America-Mexico," and "North America-United States" respectively as shown in FIG. 7B-1. Then, the FBDOL 200 may move the lower-level folders "North America-Canada," "North America-Mexico," and "North America-United States" up to be connected with the upper-level folder "World" and remove the "North America" folder as shown in FIG. 7B-1. After the removal, the user may navigate from the "World" folder shown in FIG. 7B-2A to its lower-level folders "North America-Canada," "North America-Mexico," "North America-United States," and "South America" shown in FIG. 7B-2B. The user may further navigate from the "North America-United States" folder shown in FIG. 7B-2B to its lower-level documents "Chicago," "Los Angeles," and "New York City" shown in FIG. 7B-2C.

Figures 1, 7C:
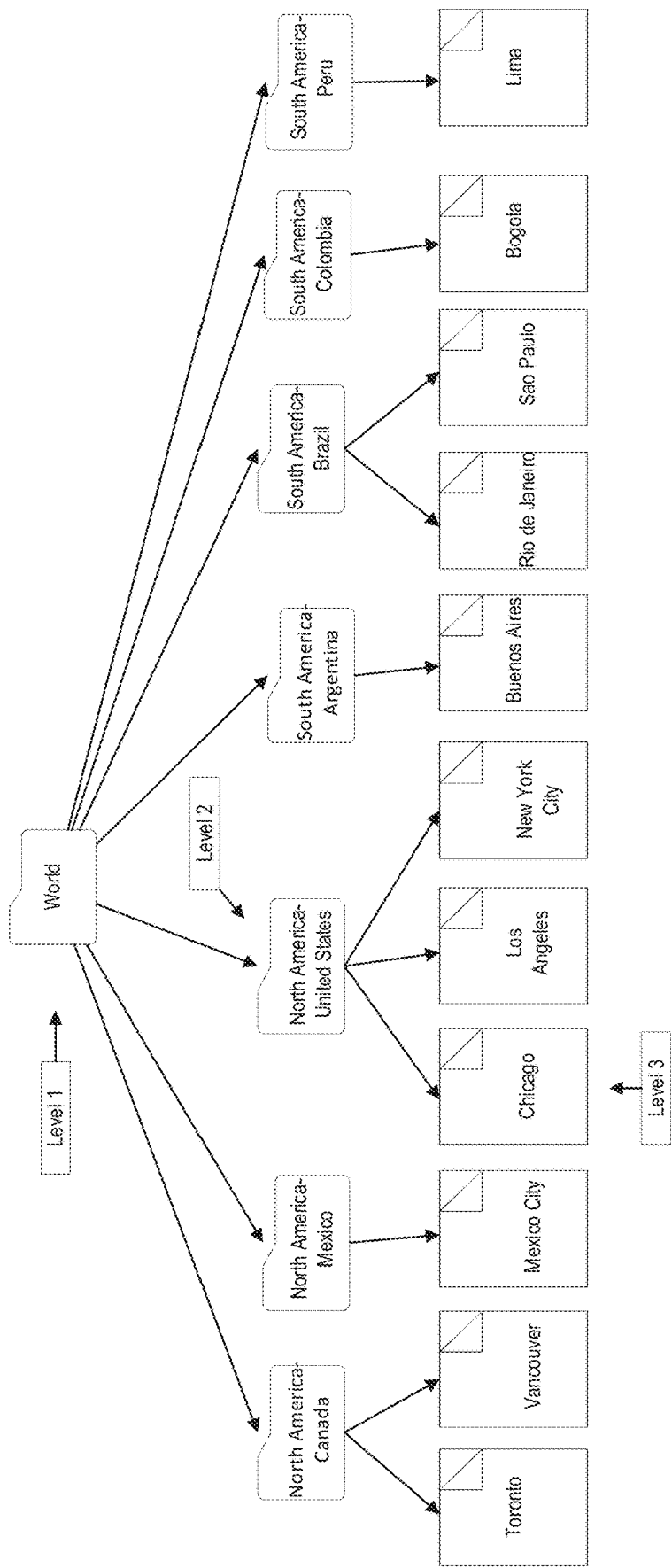
Figures 2A, 7C:
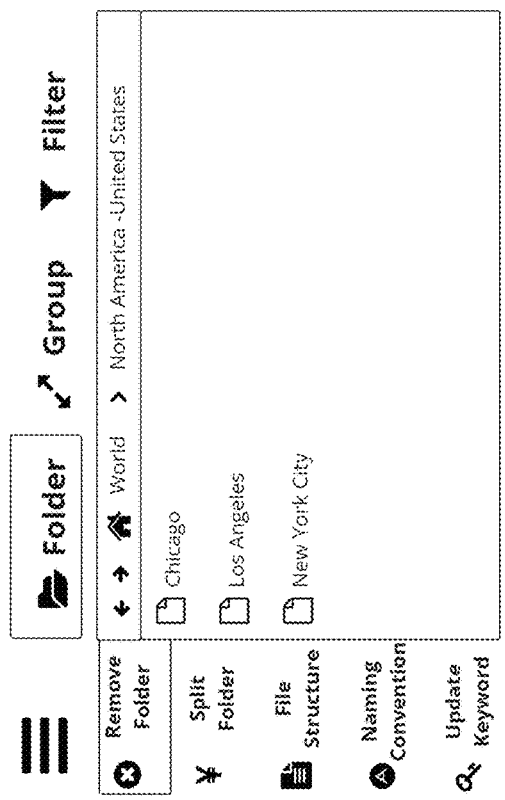
Figures 2B, 7C:
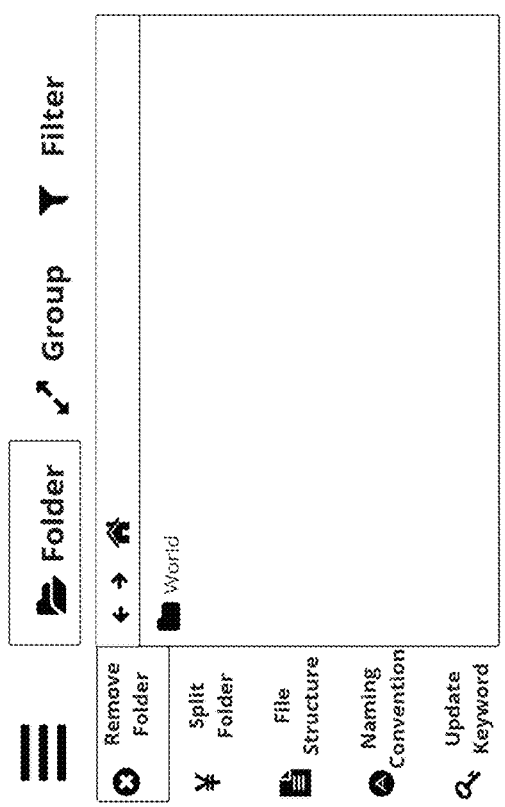
Figures 2C, 7C:
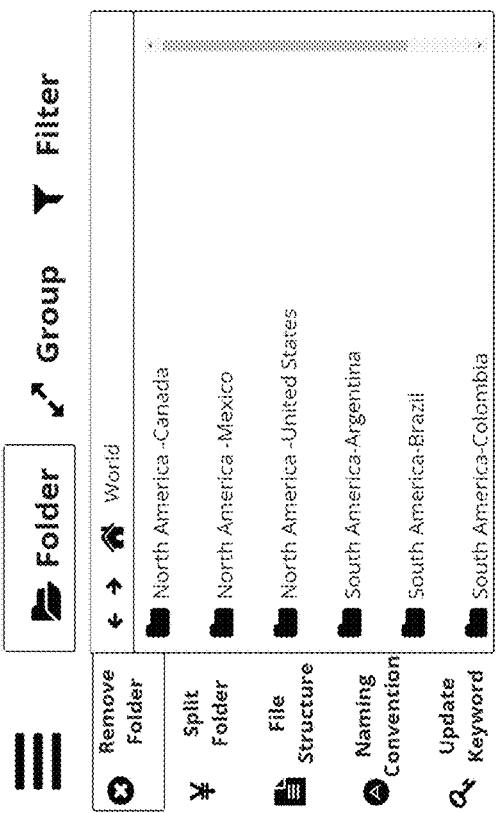

In an implementation, the FBDOL 200 may remove all folders at a level of the folder hierarchy. For example, where the FBDOL 200 removes the folders at the second level of the folder hierarchy, i.e., "North America" and "South America" as shown in FIG. 4, the FDBOL 200 may determine the lower-level folders under each of the removed folders, and update names of the lower-levels folders to include the name of the removed folder. The folders "Canada," "Mexico," and "United States" are under the "North America" folder and the folders "Argentina," "Brazil," "Colombia," and "Peru" are under the "South America" folder. As shown in FIG. 7C-1, the FBDOL 200 may rename the folders under "North America" folder as "North America-Canada," "North America-Mexico," and "North America-United States" and rename the folders under "South America" folder as "South America-Argentina," "South America-Brazil," "South America-Colombia," and "South America-Peru," and move these folders up to be connected with the first level folder "World." After removing the second level of folders, the user may navigate from the "World" folder shown in FIG. 7C-2A to its lower-level folders "North America-Canada," "North America-Mexico," "North America-United States," "South America-Argentina," "South America-Brazil," "South America-Colombia," and "South America-Peru" shown in FIG. 7C-2B. The user may further navigate from the "North America-United States" folder shown in FIG. 7C-2B to its lower-level documents "Chicago," "Los Angeles," and "New York City" shown in FIG. 7C-2C.

Figures 1, 7D:
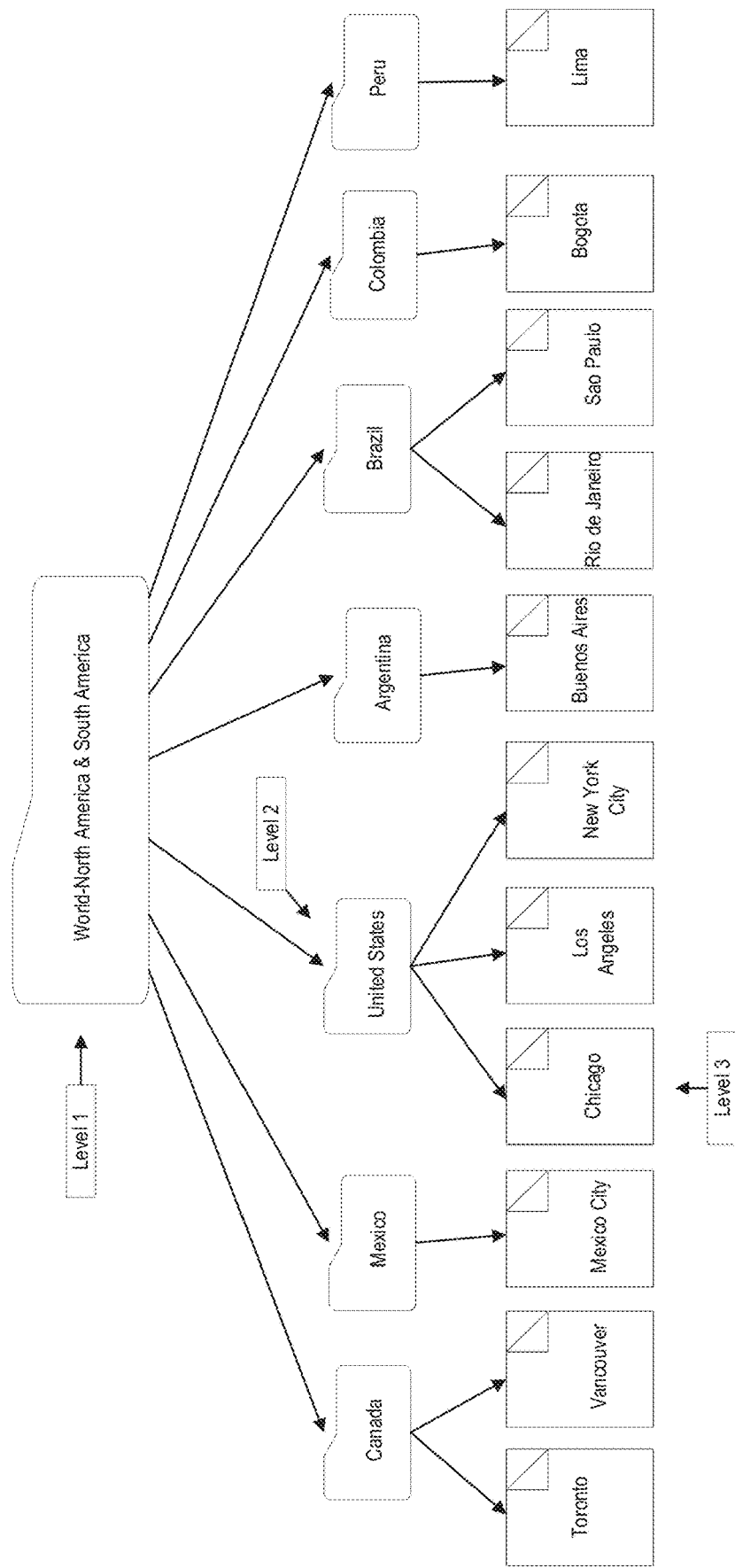
Figures 2A, 7D:
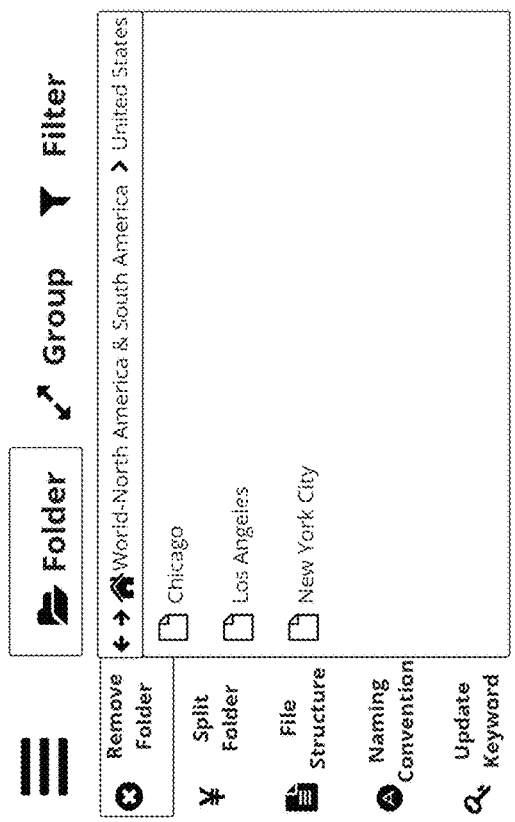
Figures 2B, 7D:
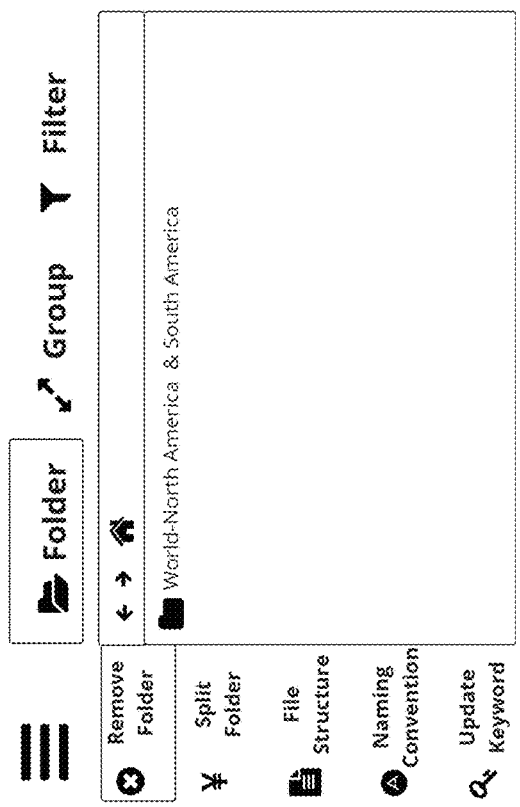
Figures 2C, 7D:
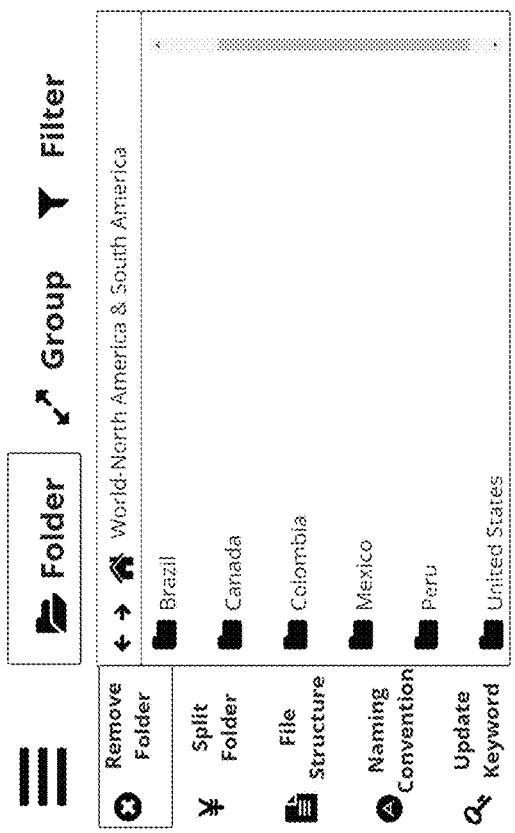

Additionally, or alternatively, to remove the folders at the second level of the folder hierarchy, i.e., "North America" and "South America" as shown in FIG. 4, the FDBOL 200 may determine a common upper-level folder of the removed folders, and update the name of the upper-level folder to include the names of the removed folders. The common upper-level folder of the folders "North America" and "South America" is the folder "World." As shown in FIG. 7D-1, the FBDOL 200 may rename the "World" folder as "World-North America & South America" and move the lower-level folders of the removed folders at the third level up to be connected with the first level folder "World-North America & South America." After removing the second level of folders, the user may navigate from the "World-North America & South America" folder shown in FIG. 7D-2A to its lower-level folders "Argentina," "Brazil," "Canada," "Colombia," "Mexico," "Peru," and "United States" shown in FIG. 7D-2B. The user may further navigate from the "United States" folder shown in FIG. 7D-2B to its lower-level documents "Chicago," "Los Angeles," and "New York City" shown in FIG. 7D-2C.

Figures 1, 8:
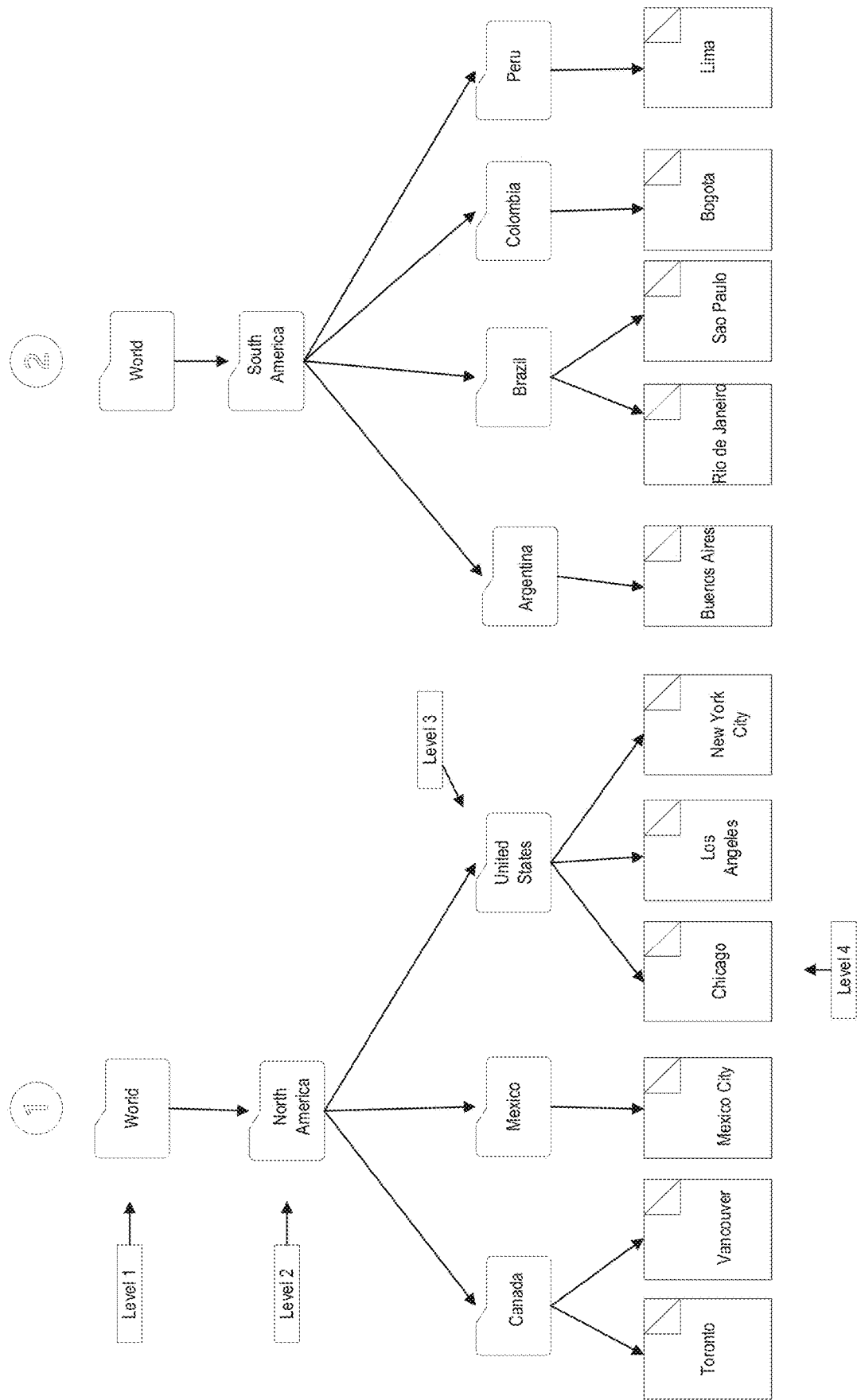
Figures 2A, 8:
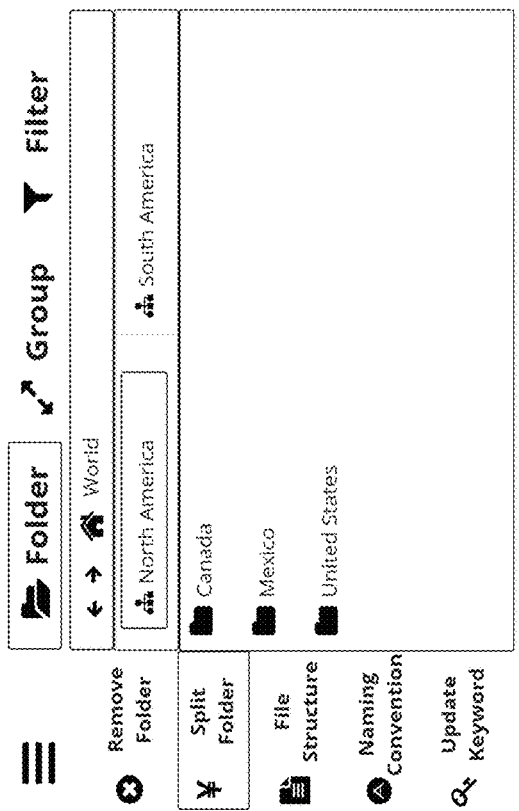
Figures 2C, 8:
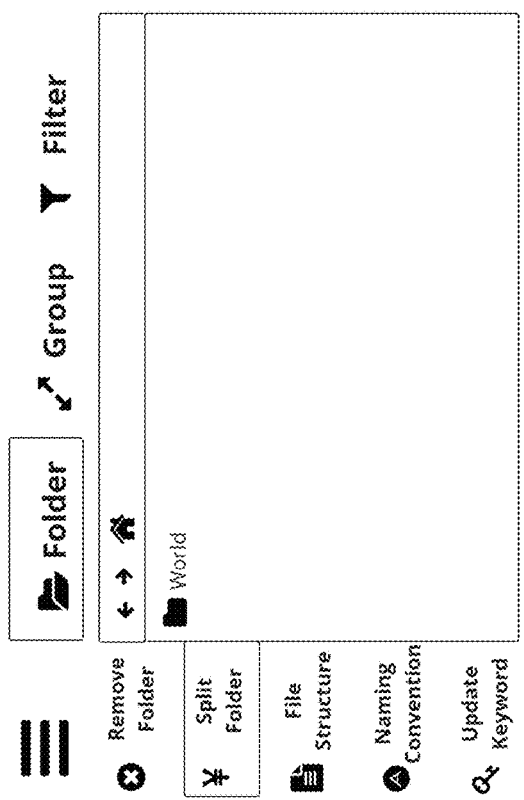
Figures 2B, 8:
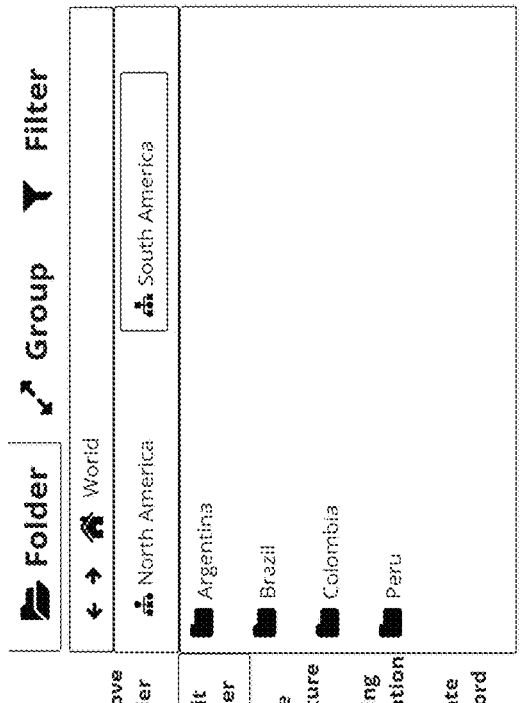
Figures 2D, 8:
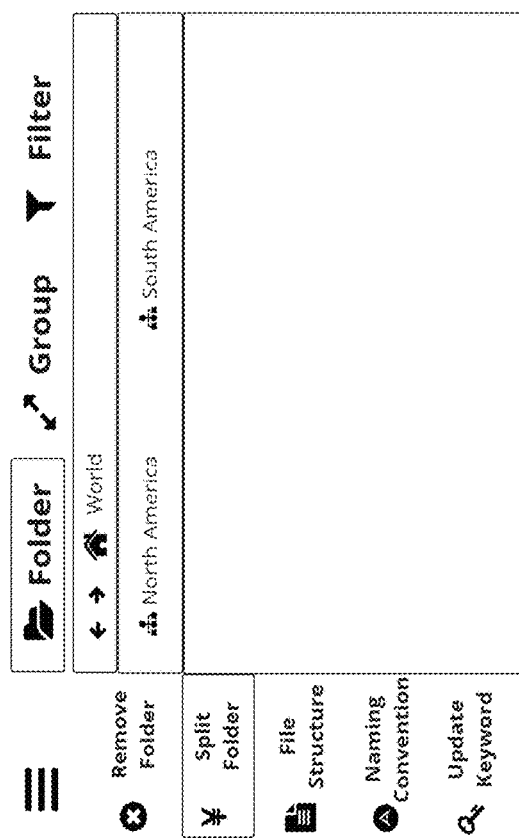

In the folder view, the FDBOL 200 may perform a splitting operation on a folder. The FDBOL 200 may split the folder hierarchy to generate two or more folder sub-hierarchies, each of the folder sub-hierarchies includes a portion of the folder hierarchy. For example, where the FDBOL 200 perform splitting operation on the folder "World," the FDBOL 200 may generate two sub-hierarchies under the folder "World". Alternatively, the FDBOL 200 may generate two sub-hierarchies for the folder such that the folder "World" presents in both folder sub-hierarchies, as shown in FIG. 8-1. The first folder sub-hierarchy may include the folder "North America" and all folders and documents under the "North America" folder and the second folder sub-hierarchy may include the folder "South America" and all folders and documents under the "South America" folder. As a result of the splitting, the user may navigate from the "World" folder shown in FIG. 8-2A to the two folder sub-hierarchies for "North America" and "South America" shown in FIG. 8-2B. By selecting the folder sub-hierarchy for "North America," the user may navigate to the lower-level folders "Canada," "Mexico," and "United States" as shown in FIG. 8-2C. Similarly, by selecting the folder sub-hierarchy for "South America," the user may navigate to the lower-level folders "Argentina," "Brazil," "Colombia," and "Peru" as shown in FIG. 8-2D.

In an implementation, the user may perform a splitting-and-removing operation on a folder. When receiving the user's request for splitting-and-removing the folder, for example, via the GUI, the FBDOL 200 may first split the folder hierarchy to generate two or more folder sub-hierarchies. Each of the folder sub-hierarchies may include a portion of the folder hierarchy. Then, for each of the two or more folder sub-hierarchies, in response to removing a folder at a level of the folder sub-hierarchy, the FBDOL 200 may determine an upper-level folder of the removed folder and update the name of the upper-level folder to include the name of the removed folder, and move the lower-level folders of the removed folder up to be connected with an upper-level folder of the removed folder in the folder sub-hierarchy. Alternatively, in response to removing a folder at a level of the folder sub-hierarchy, the FBDOL 200 may determine lower-level folders of the removed folder and update names of the lower-level folders to include the name of the removed folder, and move the lower-level folders of the removed folder up to be connected with an upper-level folder of the removed folder in the folder sub-hierarchy.

The folders and documents in the folder directory may also be viewed and operated in a group view. In an implementation, when the user performs a navigation operation on a folder via the GUI, the FDBOL 200 may traverse all lower-level folders under the folder to identify folders and documents under the folder and generate a navigation hierarchy for navigating folders and documents associated with the folder. The navigation hierarchy may reflect a folder hierarchy associated with the folder and be displayed in the group view.

Figures 1, 9:
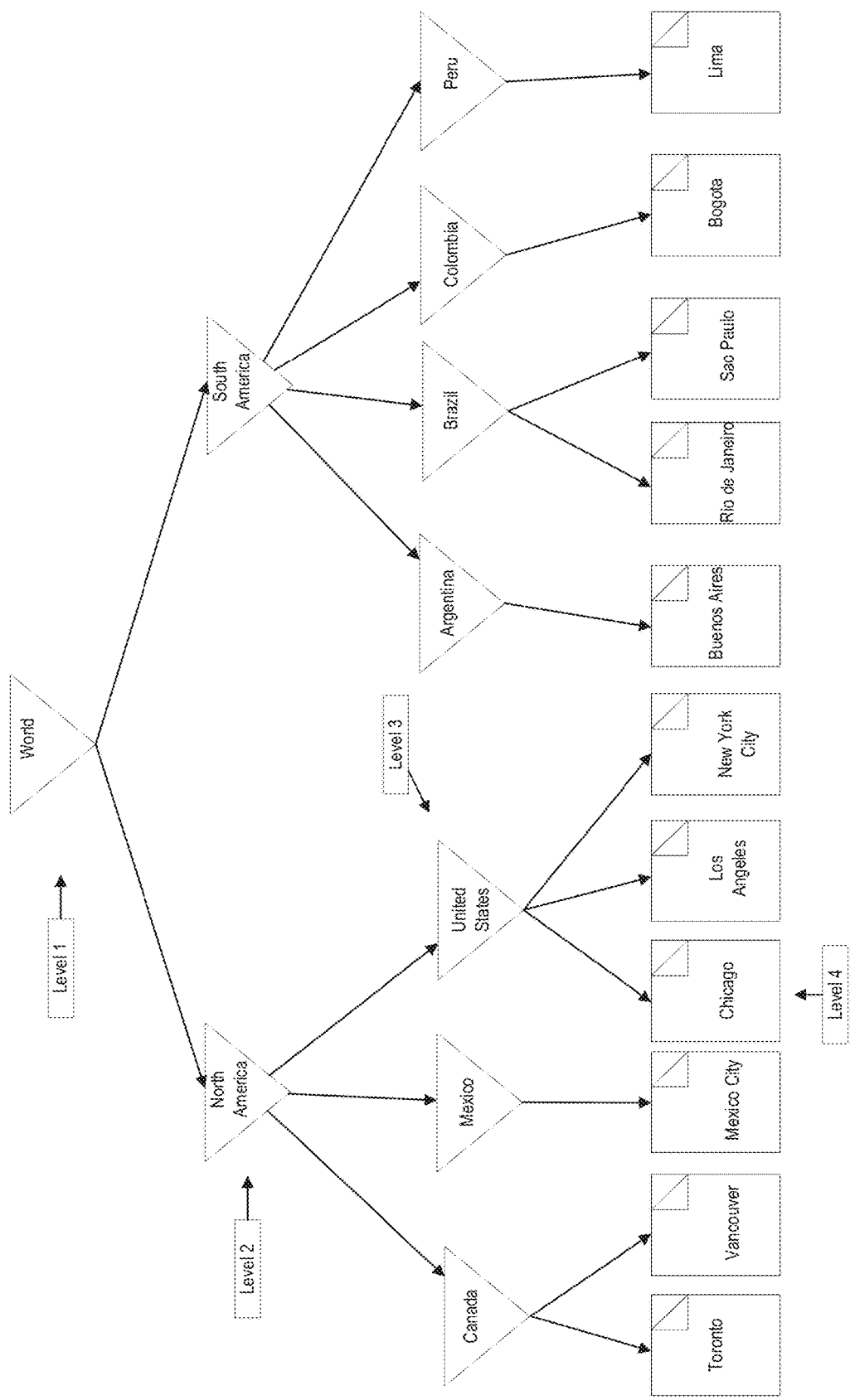
Figures 2A, 9:
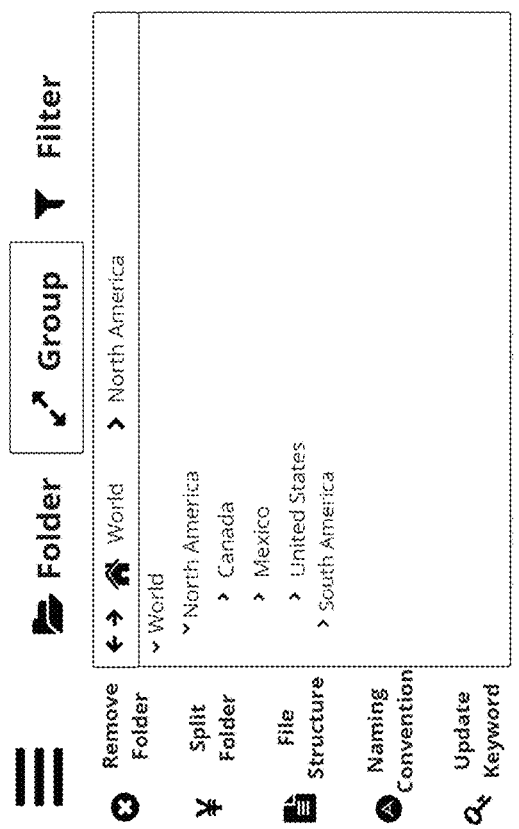
Figures 2B, 9:
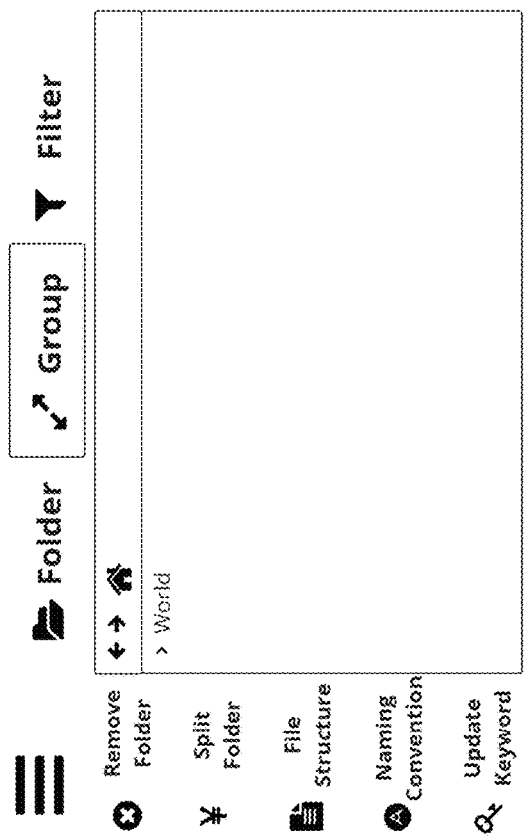
Figures 2C, 9:
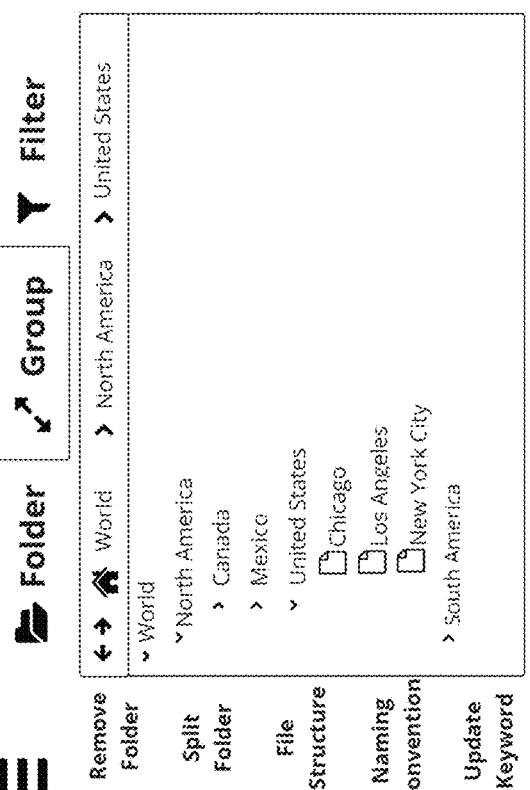
Figures 2D, 9:
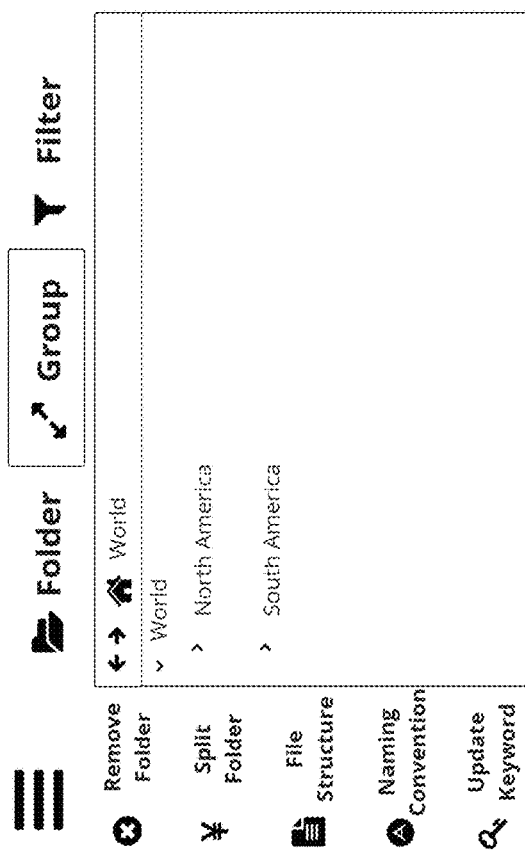

FIG. 9-1 shows an exemplary navigation hierarchy for navigating folders and documents associated with the folder "World" in the group view. As shown, the navigation hierarchy may be identical with the folder hierarchy of the folder directory associated with the "World" folder, and for each of navigation nodes in the navigation hierarchy, the name of the navigation node is identical with a name of a corresponding folder in the folder hierarchy reflected by the navigation hierarchy. The navigation hierarchy displayed in the group view may be collapsible and expandable. Where a navigation node is in collapsed state, a selection of the navigation node may trigger the FDBOL 200 to expand the navigation node to display lower-level navigation nodes under the navigation node. For example, in the group view as shown in FIG. 9-2A, where the user selects the "World" navigation node, this navigation node may expand to display its lower-level navigation nodes "North America" and "South America" as shown in FIG. 9-2B. Where the user selects the "North America" node, this node may expand to display its lower-level navigation nodes "Canada," "Mexico," and "United States" as shown in FIG. 9-2C. Where the user further selects the "United States" node, it may expand to display its lower-level navigation documents "Chicago," "Los Angeles," and "New York City." Where the navigation node is in expanded state, a selection of the navigation node may trigger the FDBOL 200 to collapse the navigation node to hide lower-level navigation nodes under the navigation node.

In some implementations, the FDBOL 200 may make use of a document viewer to serve as the group view. The document viewer may be used to display a navigable document. The navigable document may represent any structured or semi-structured document in which some portions of the content in the document may be indexed or collapsible and expandable. The navigable document may include, for example, a word processing document, a portal document format (PDF) document, HyperText Markup Language (HTML) document, and Extensible Markup Language (XML) document. Where the navigable document is a word processing document, the document viewer may be implemented with, for example, Microsoft Word™. Where the navigable document is a PDF document, the document viewer may be implemented with, for example, Adobe Acrobat™.

Figure 10:
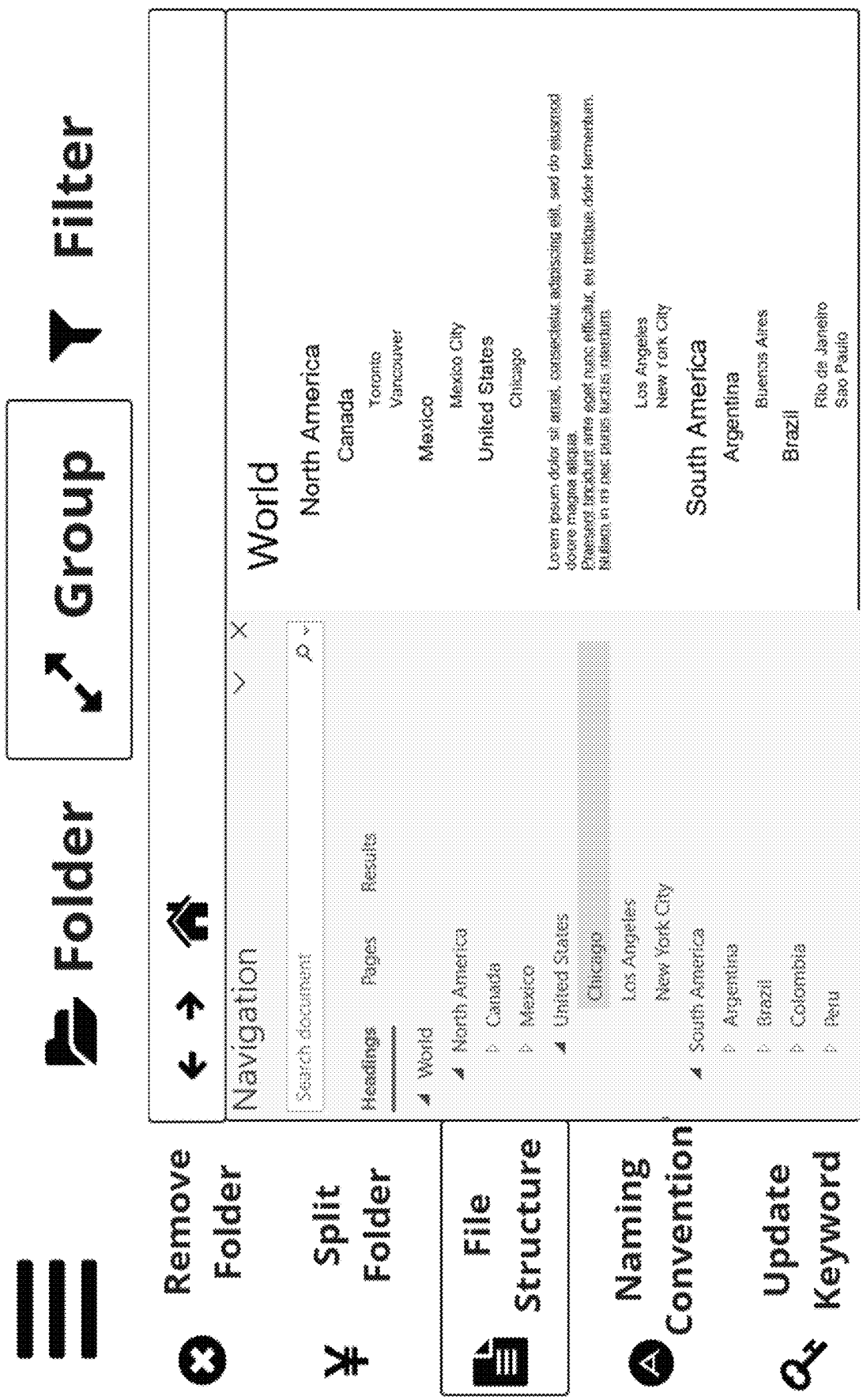
FIG. 10 shows an exemplary navigable document operation in the group view.

In this case, the FDBOL 200 may generate the navigation hierarchy for the navigable document and include names and content of the documents associated with the folder in the navigable document. In an example as shown in FIG. 10, the navigable document is a word processing document and Microsoft Word is used as the document viewer of the word processing document. The FDBOL 200 may make use of Microsoft Word application programming interface (API) to generate and operate the navigable document. The Microsoft Word API may include, for example, Javascript API and Visual Basic Script API. The FDBOL 200 may display the navigable document in the document viewer and the navigation hierarchy in the navigator panel of the document viewer. When the user selects a navigation node in the displayed navigation hierarchy, the FDBOL 200 may update the navigator panel of the document viewer to display names of lower-level navigation nodes under the navigation node. Additionally, or alternatively, the FDBOL 200 may update the document viewer to display names and content of documents associated with the navigation node in the navigable document. For example, where the navigation node "Chicago" is selected, the portion of the navigable document including names and content of the document associated with the navigation node will be displayed in the document viewer.

Figures 1, 11:
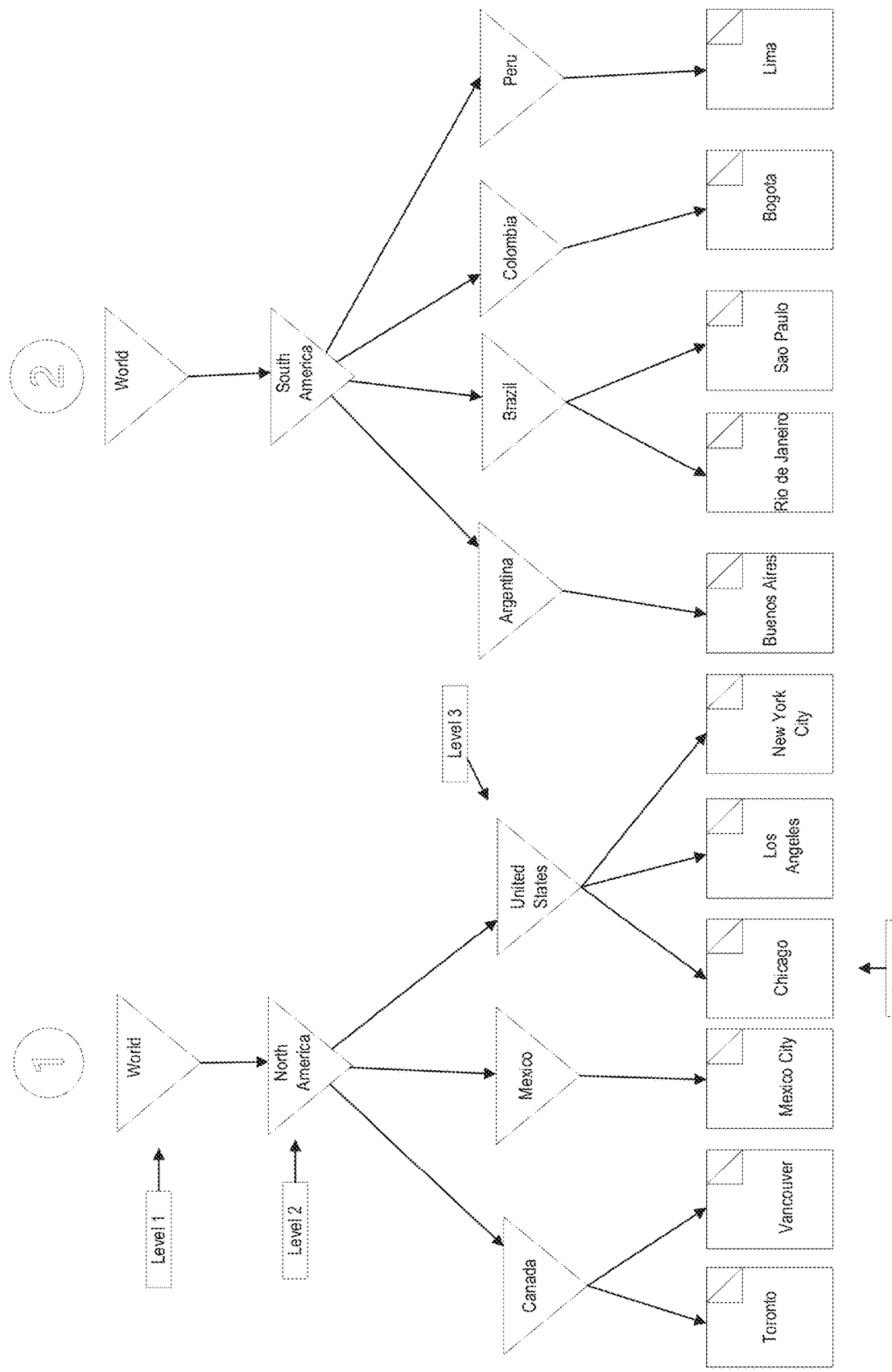
Figures 2A, 11:
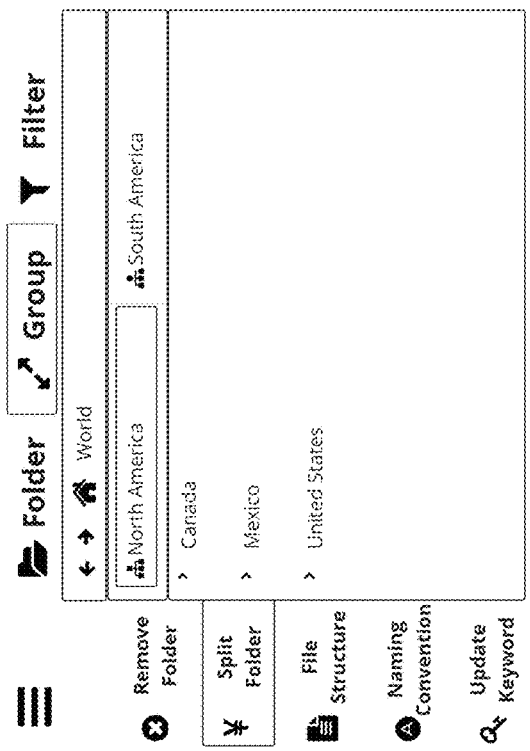
Figures 2C, 11:
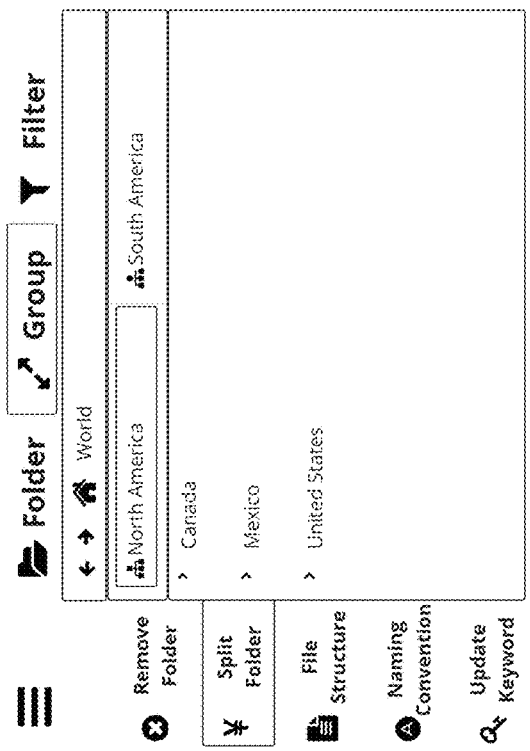
Figures 2B, 11:
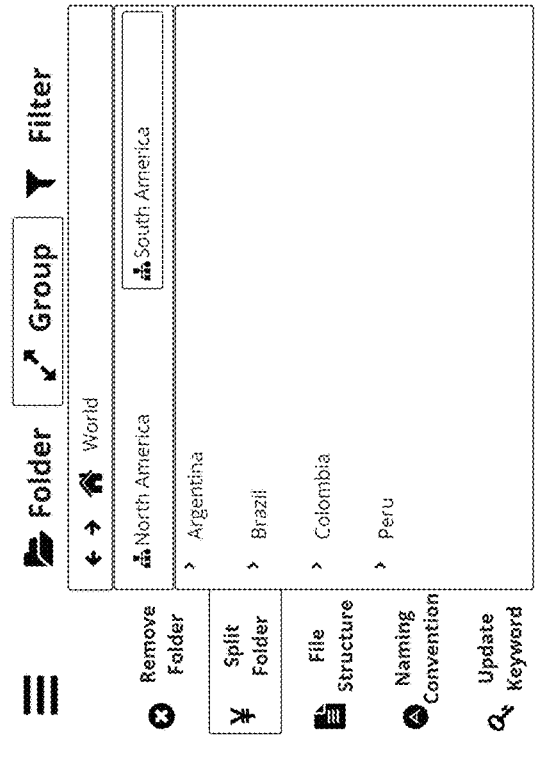
Figures 2D, 11:
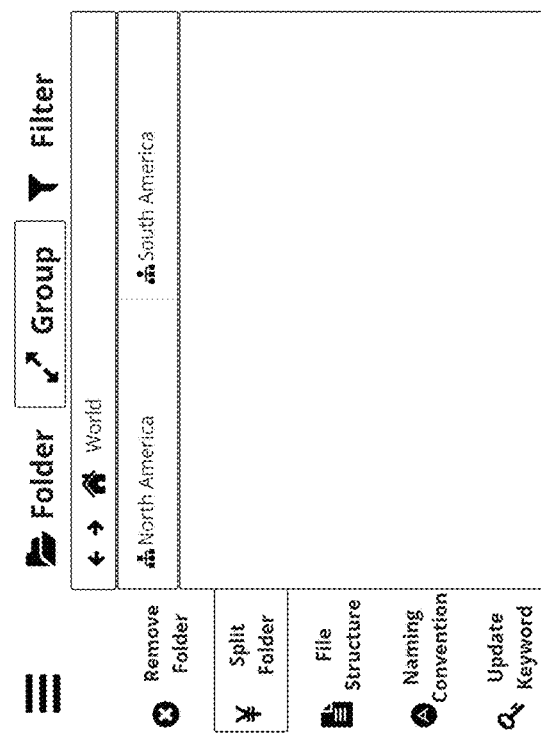

Moreover, in the group view, the FDBOL 200 may perform the splitting operation on the navigation hierarchy. For example, the FDBOL 200 may split the navigation hierarchy to generate two or more navigation sub-hierarchies, each of the navigation sub-hierarchies includes a portion of the navigation hierarchy. As shown in FIG. 11-1, the navigation hierarchy associated with the navigation node "World" is split into two navigation sub-hierarchies. The first navigation sub-hierarchy may include the navigation node "North America" and all lower-level nodes and documents under the "North America" node and the second navigation sub-hierarchy may include the navigation node "South America" and all lower-level nodes and documents under the "South America" node. As a result of the splitting, the user may navigate from the "World" node shown in FIG. 11-2A to the two navigation sub-hierarchies for "North America" and "South America" shown in FIG. 11-2B. By selecting the navigation sub-hierarchy for "North America," the user may navigate to the lower-level navigation nodes "Canada," "Mexico," and "United States" as shown in FIG. 11-2C. Similarly, by selecting the navigation sub-hierarchy for "South America," the user may navigate to the lower-level nodes "Argentina," "Brazil," "Colombia," and "Peru" as shown in FIG. 11-2D.

Figures 1, 12A:
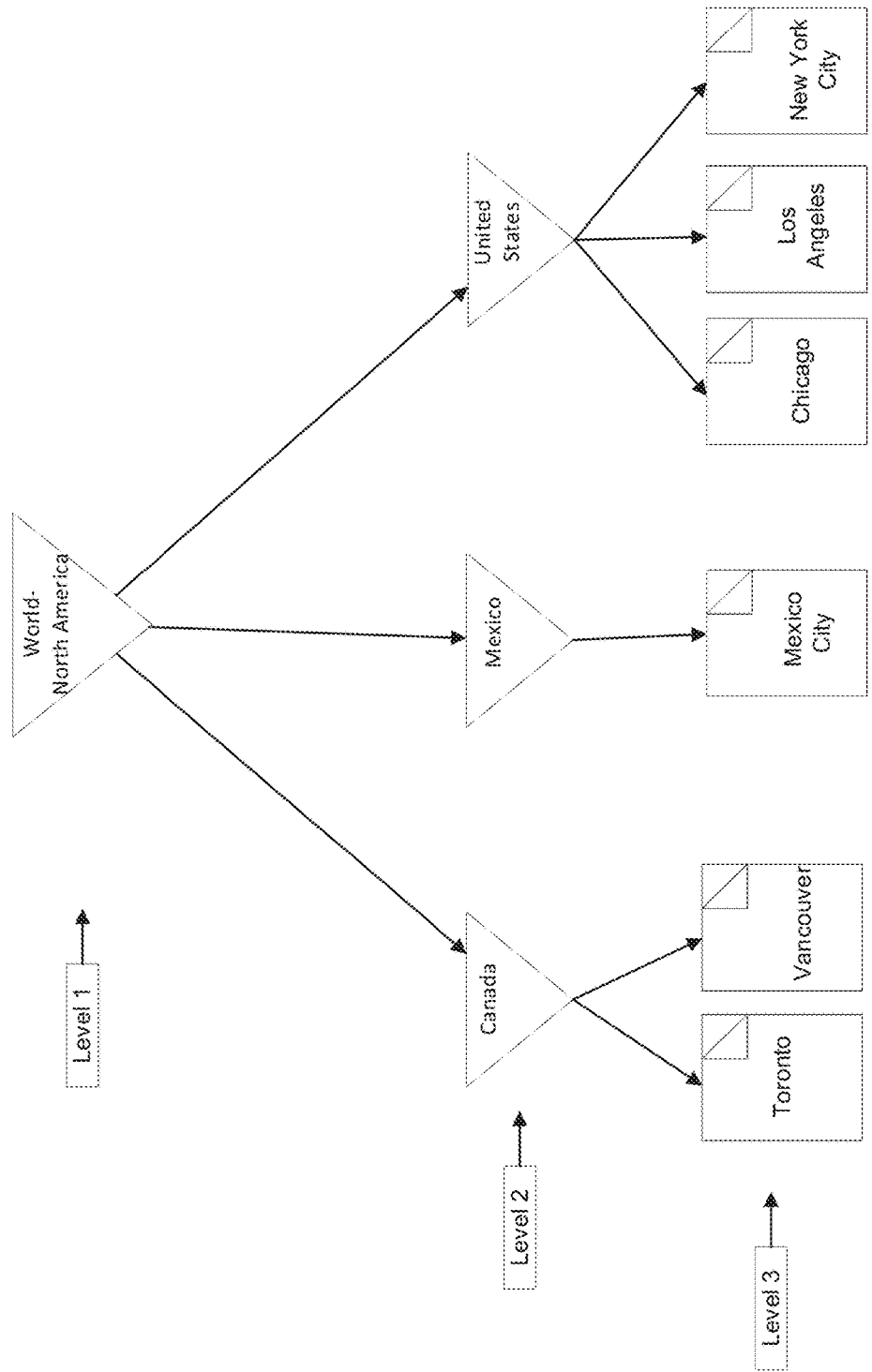
Figures 2A, 12A:
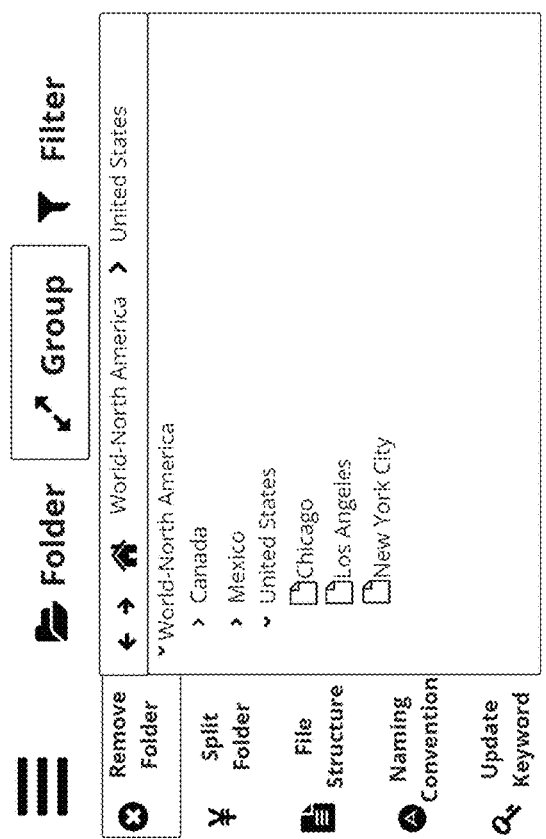
Figures 2B, 12A:
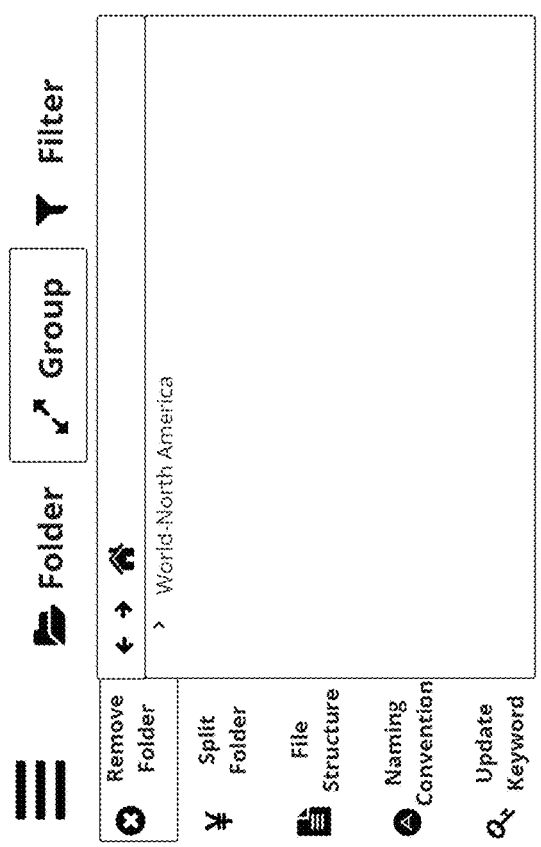
Figures 2C, 12A:
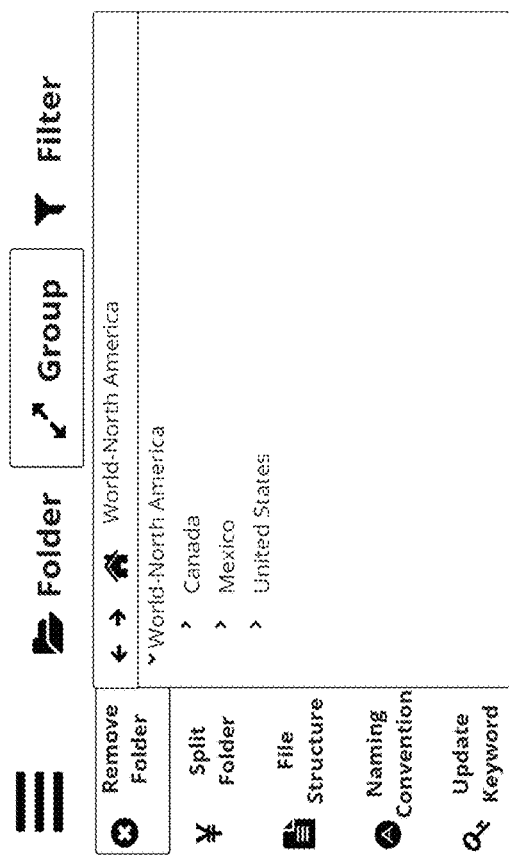

The FDBOL 200 may also remove a navigation node in the navigation hierarchy. In an example, the navigation hierarchy is a perfect hierarchy in which the documents are only at the bottom level of the navigation hierarchy. To remove a navigation node in the navigation hierarchy, the FDBOL 200 may determine an upper-level navigation node of the navigation node and update a name of the upper-level navigation node to include a name of the navigation node. In an example as shown in FIG. 12A-1, the navigation node "North America" is removed and the upper-level navigation node "World" is renamed as "World-North America." Then, the FDBOL 200 may move the lower-level navigation nodes "Canada," "Mexico," and "United States" of the "North America" navigation node up to be connected with the upper-level folder of "World-North America" in the navigation hierarchy. As a result, the group view displays the "World-North America" node after the removal as shown in FIG. 12A-2A. The user may expand the "World-North America" node to its lower-level nodes "Canada," "Mexico," and "United States" shown in FIG. 12A-2B. The user may further expand the "United States" node to its lower-level documents "Chicago," "Los Angeles," and "New York City" shown in FIG. 12A-2C.

Figures 1, 12B:
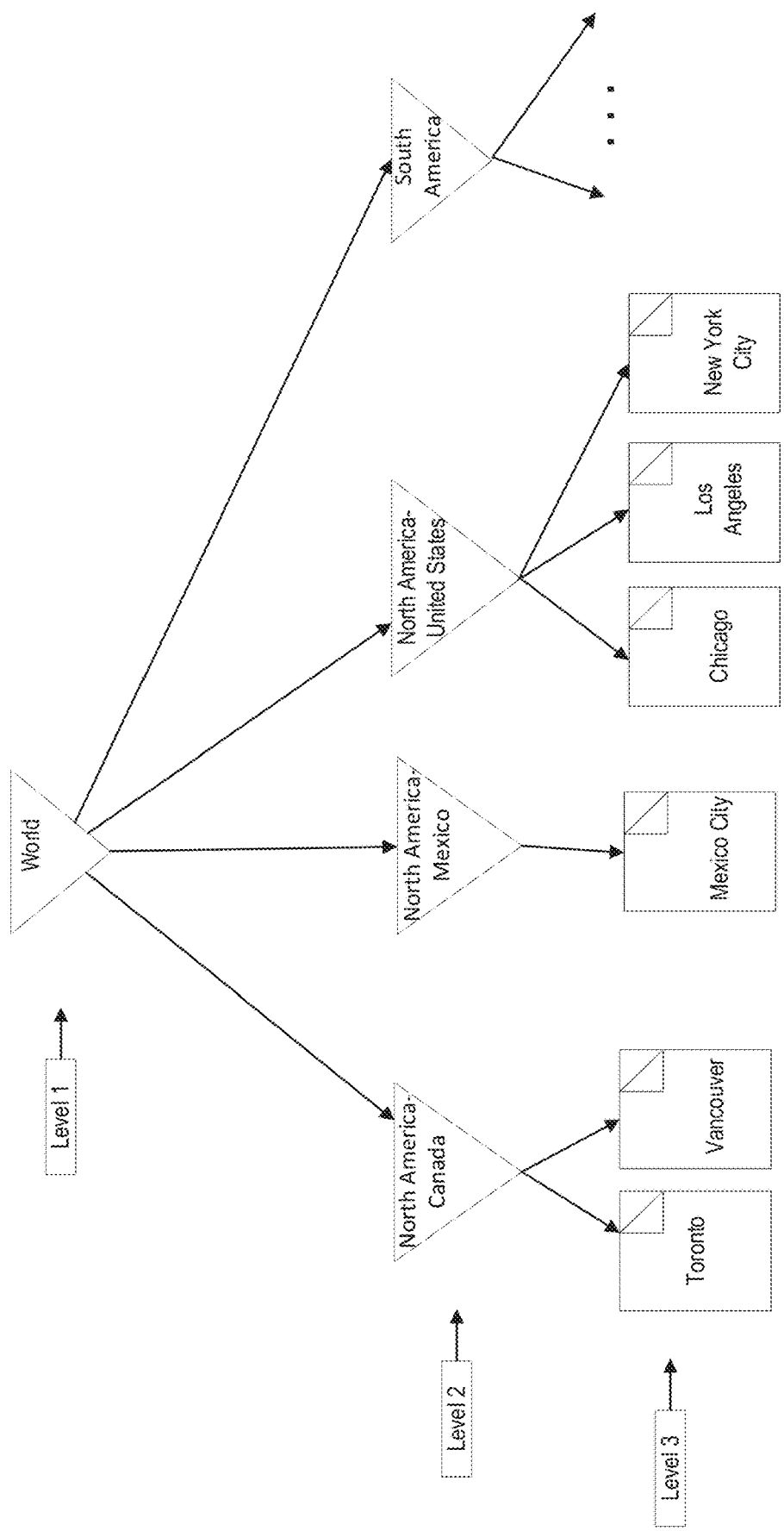
Figures 2A, 12B:
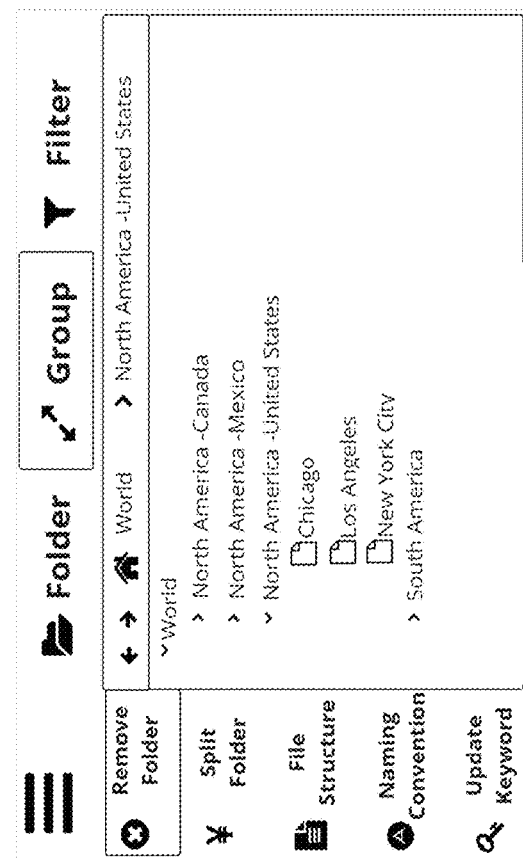
Figures 2B, 12B:
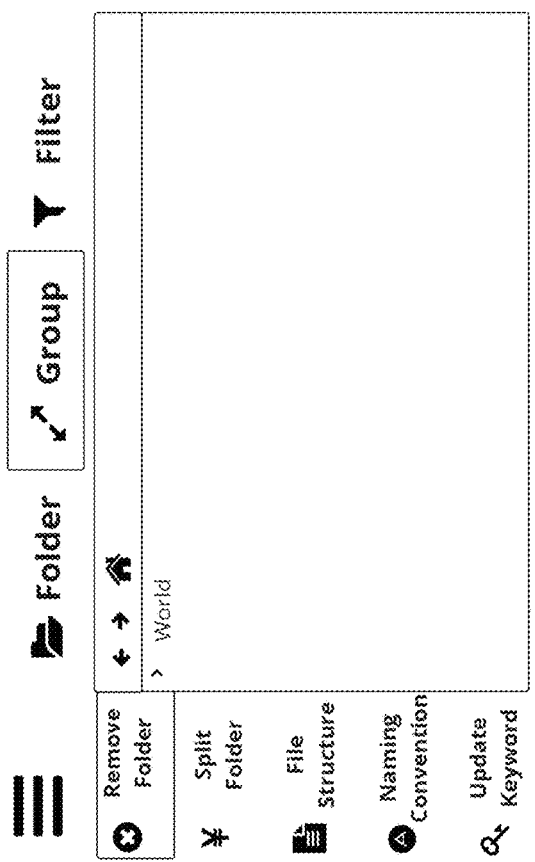
Figures 2C, 12B:
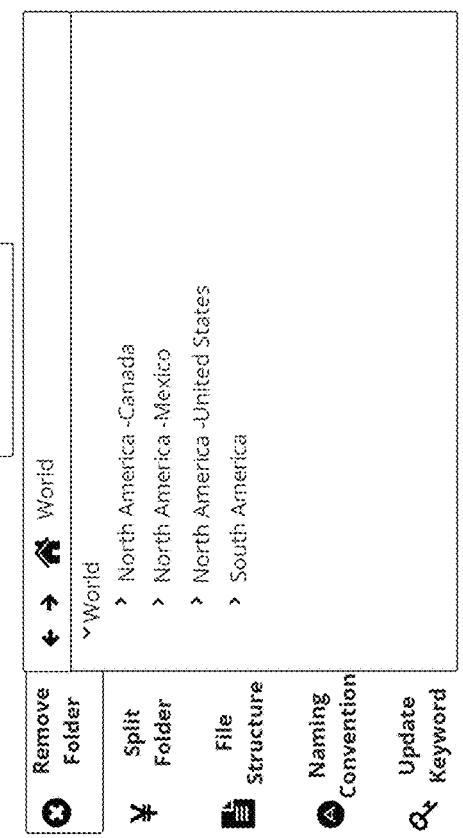

Alternatively, the FBDOL 200 may determine lower-level navigation nodes of the navigation node to be removed and update names of the lower-level navigation nodes to include a name of the navigation node. In an example as shown in FIG. 12B-1, the navigation node "North America" is removed and the lower-level nodes are renamed as "North America-Canada," "North America-Mexico," and "North America-United States" respectively. Then, the FDBOL 200 may move the lower-level navigation nodes up to be connected with the upper-level folder "World" in the navigation hierarchy, After the removal, the user may expand the "World" node shown in FIG. 12B-2A to its lower-level nodes "North America-Canada," "North America-Mexico," "North America-United States," and "South America" shown in FIG. 12B-2B. The user may further expand the "North America-United States" node to its lower-level documents "Chicago," "Los Angeles," and "New York City" shown in FIG. 12B-2C.

Figures 1, 12C:
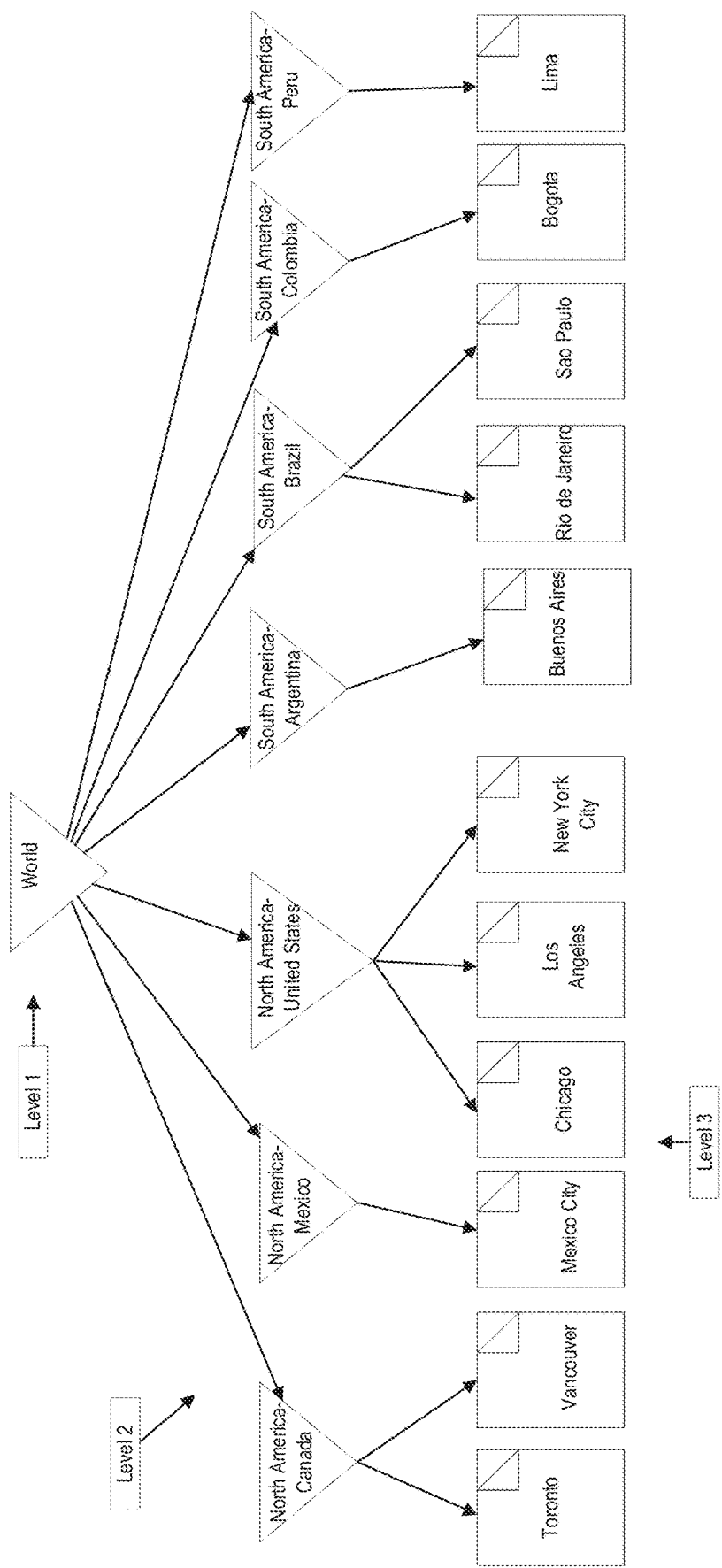
Figures 2A, 12C:
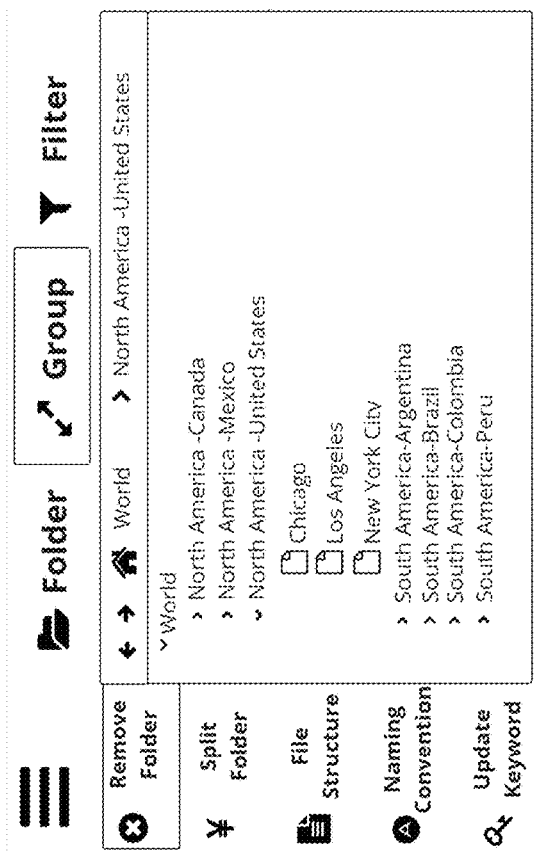
Figures 2B, 12C:
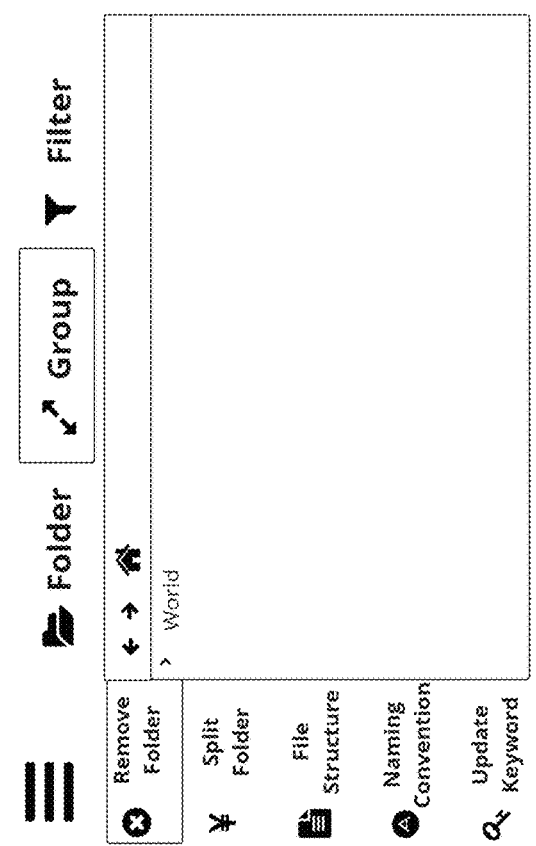
Figures 2C, 12C:
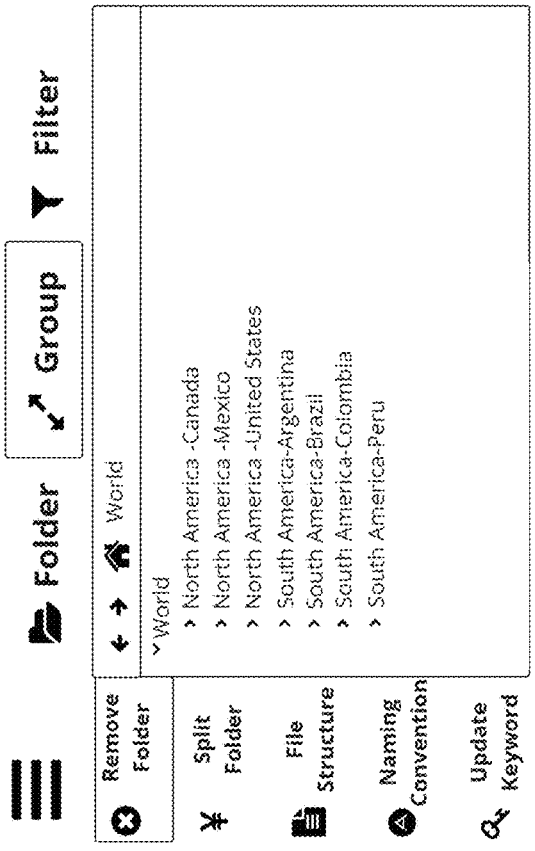

In an implementation, the FBDOL 200 may remove all navigation nodes at a certain level of the navigation hierarchy. For example, where the FBDOL 200 removes the navigation nodes at the second level of the navigation hierarchy, i.e.; "North America" and "South America," the FDBOL 200 may determine the lower-level navigation nodes under each of the removed navigation nodes, and update names of the lower-levels nodes to include the name of the removed navigation node. The nodes "Canada," "Mexico," and "United States" are under the "North America" node and the nodes "Argentina," "Brazil," "Colombia," and "Peru" are under the "South America" node. As shown in FIG. 12C-1, the FBDOL 200 may rename the navigation nodes under "North America" node as "North America-Canada," "North America-Mexico," and "North America-United States" and rename the navigation nodes under "South America" node as "South America-Argentina," "South America-Brazil," "South America-Colombia," and "South America-Peru," and move these nodes up to be connected with the first level node "World." After removing the second level of navigation nodes, the user may expand the "World" node shown in FIG. 12C-2A to its lower-level nodes "North America-Canada," "North America-Mexico," "North America-United States," "South America-Argentina," "South America-Brazil," "South America-Colombia," and "South America-Peru" as shown in FIG. 12C-2B. The user may further expand the "North America-United States" node to its lower-level documents "Chicago," "Los Angeles," and "New York City" as shown in FIG. 12C-2C.

The folders and documents in the folder directory may further be viewed and operated in a filtering view. In an implementation, when the user performs a filtering operation on a folder via the GUI, the FDBOL 200 may traverse all lower-level folders under the folder to identify folders and documents under the folder and generate a filtering hierarchy for filtering folders and documents associated with the folder. The filtering hierarchy may reflect a folder hierarchy associated with the folder and be displayed in the filtering view. In an example, the filtering hierarchy may reflect a folder hierarchy under the folder. In another example, the filtering hierarchy may reflect a folder hierarchy under the folder and the folder itself.

Figures 1, 13:
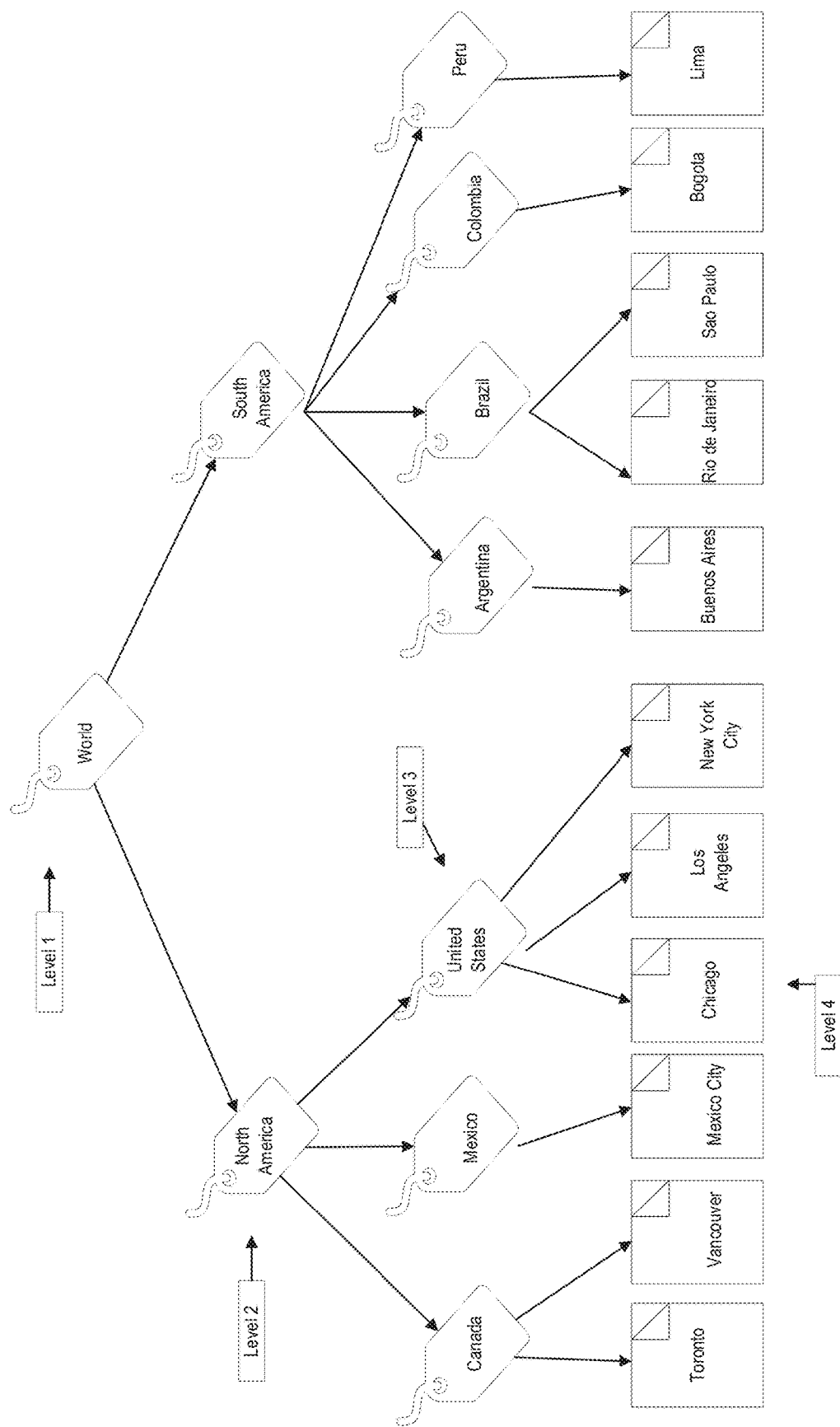

FIG. 13-1 shows an exemplary filtering hierarchy for filtering folders and documents associated with the folder "World" in the filtering view. As shown, the filtering hierarchy may be identical with the folder hierarchy of the folder directory associated with the "World" folder, and for each of filtering tags in the filtering hierarchy, the name of the filtering tag is identical with a name of a corresponding folder in the folder hierarchy reflected by the filtering hierarchy. In an implementation, the FDBOL 200 may display all filtering tags at different levels of filtering hierarchy in the filtering view. As shown in FIG. 13-2A, the filtering tags at different levels are listed in the different columns separately. The first column displays the filtering tag "World." The second column displays the filtering tags "North America" and "South America." The third column displays the filtering tags "Argentina," "Brazil," "Canada," "Colombia," "Mexico," "Peru," and "United States." The fourth column displays names of the documents "Bogota," "Buenos Aires," "Chicago," "Lima," "Los Angeles," "Mexico City," "New York," "Rio de Janeiro," "Sao Paulo, "Toronto," "Vancouver."

In the filtering view, when the user selects a filtering tag at a level of the filtering hierarchy, the FDBOL 200 may filter filtering tags at a lower level of the level to only display lower-level filtering tags under the filtering tag in the filtering hierarchy. In an example, where the filtering tag "North America" in the second column is selected in the filtering view, the FDBOL 200 will filter the lower-level filtering tags to only display filtering tags "Canada," "Mexico," and "United States" in the third column, as shown in FIG. 13-2B. Accordingly, the fourth column only displays names of the documents "Chicago," "Los Angeles," "Mexico City," "New York," "Toronto," "Vancouver."

Additionally, or Alternatively, the FDBOL 200 may filter filtering tads at all levels to only display filtering tags associated with the filtering tag in the filtering hierarchy. For example, where the user selects the filtering tag "United States" in the third column in the filtering view as shown in FIG. 13-2A, the FDBOL 200 will filter the filtering tads at all levels to only display the filtering tag "World" in the first column, the filtering tag "North America" in the second column, the filtering tag "United States" in the third column, and names of the documents "Chicago," "Los Angeles," and "New York City" in the fourth column, as shown in FIG. 13-2C.

In some implementations, the FDBOL 200 may make use of document viewer to serve as the filtering view. The document viewer may be used to display a filterable document. The filterable document may represent any document in which the content is filterable such as a spreadsheet document. Where the filterable document is a spreadsheet document, the document viewer may be implemented with, for example, Microsoft Excel™.

Figure 14:
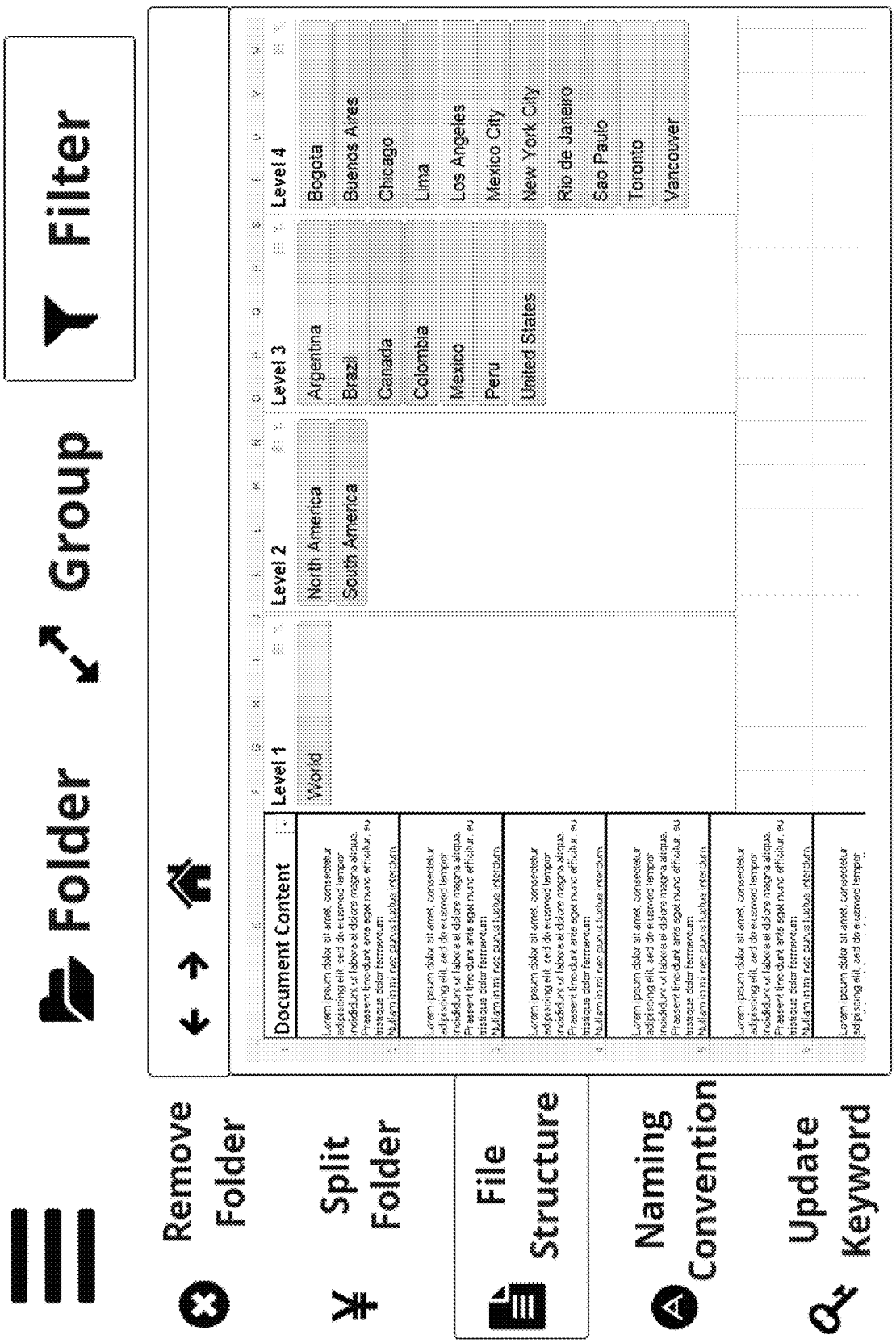
FIG. 14 shows an exemplary filterable document operation in the filtering view.

In this case, the FDBOL 200 may generate the filtering hierarchy in the filterable document and include names and content of the documents associated with the folder in the filterable document. In an example as shown in FIG. 14, the filterable document is a spreadsheet document and Microsoft Excel is used as the document viewer of the spreadsheet document. The FDBOL 200 may make use of Microsoft Excel API to generate and operate the filterable document. The Microsoft Excel API may include, for example, Javascript API and Visual Basic Script API. The FDBOL 200 may display the filterable document in the document viewer and the filtering hierarchy in the document viewer. When the user selects a filtering tag in the displayed filtering hierarchy, the FDBOL 200 may update the document viewer to only display names of lower-level filtering tags under the filtering tag or names of all levels of the filtering tags associated with the filtering tag. Additionally, or alternatively, the FDBOL 200 may update the document viewer to display names and content of documents associated with the filtering tag in the filterable document. For example, where the filtering tag "United States" is selected, the portion of the filterable document including names and content of the documents "Chicago," "Los Angeles," and "New York City" associated with the filtering tag will be displayed in the document viewer.

Figures 1, 15:
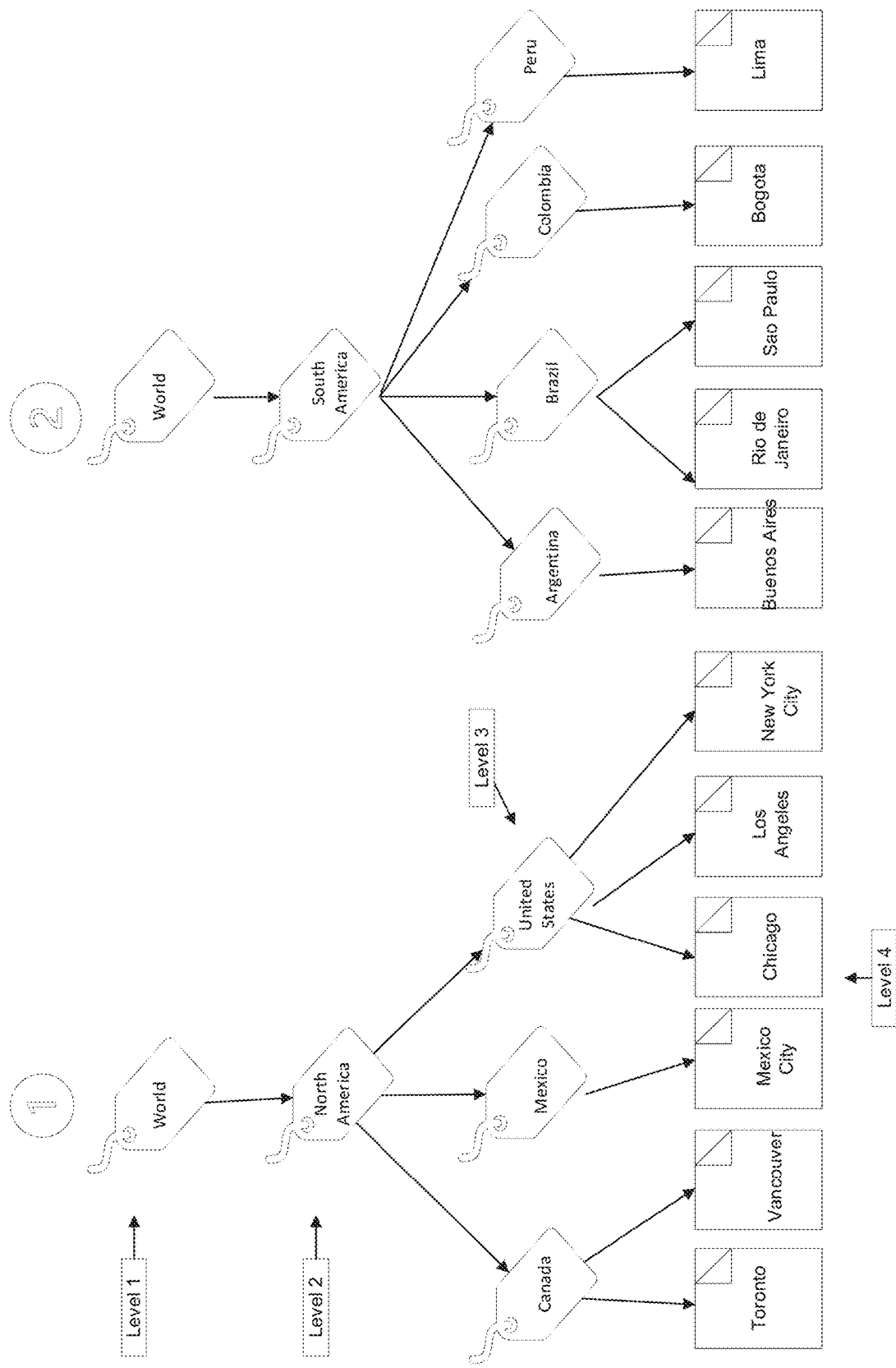
Figures 2A, 15:
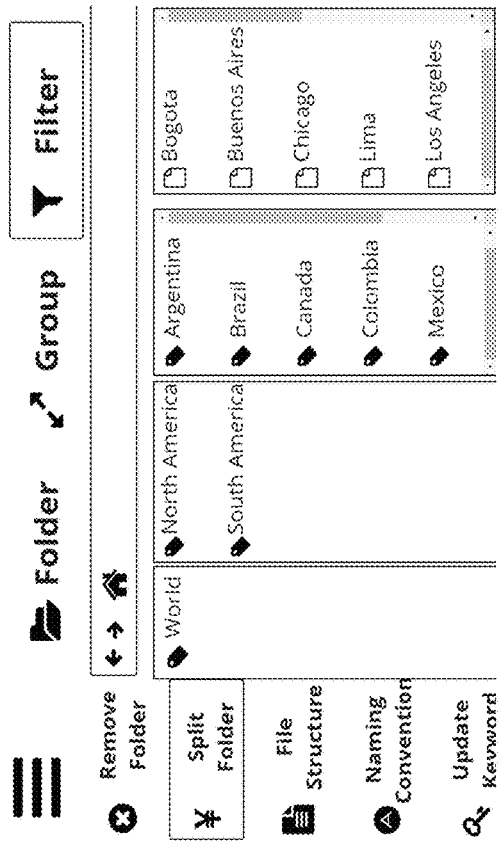
Figures 2C, 15:
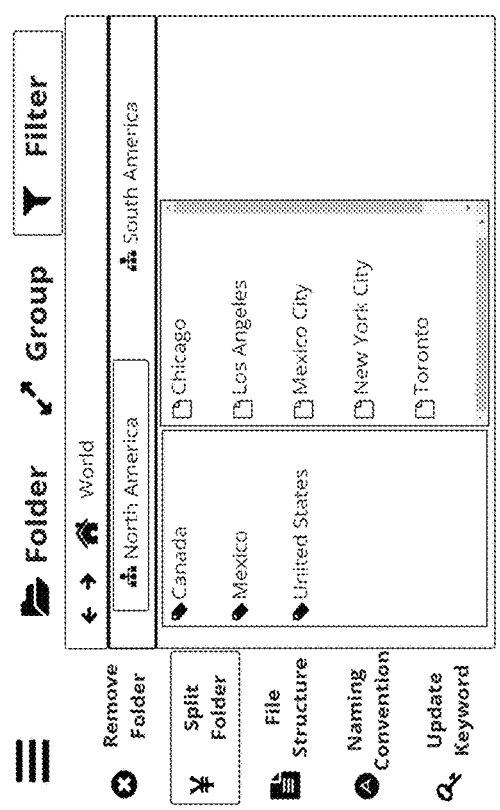
Figures 2B, 15:
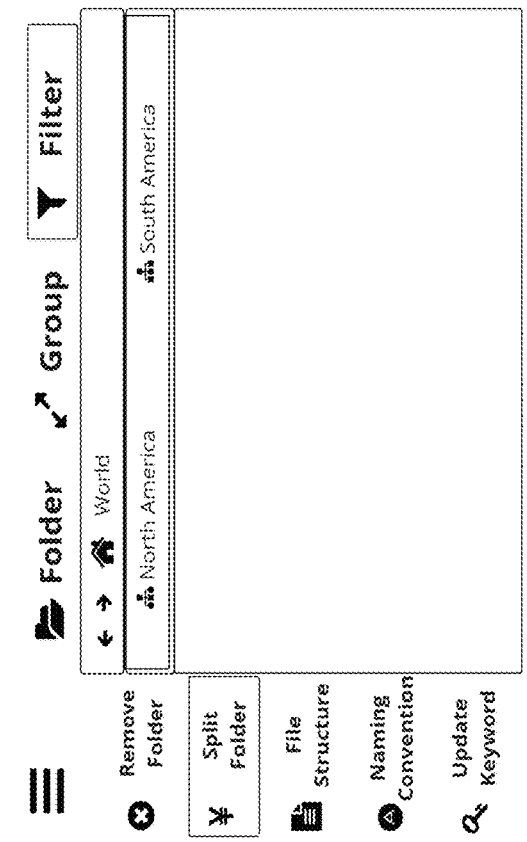
Figures 2D, 15:
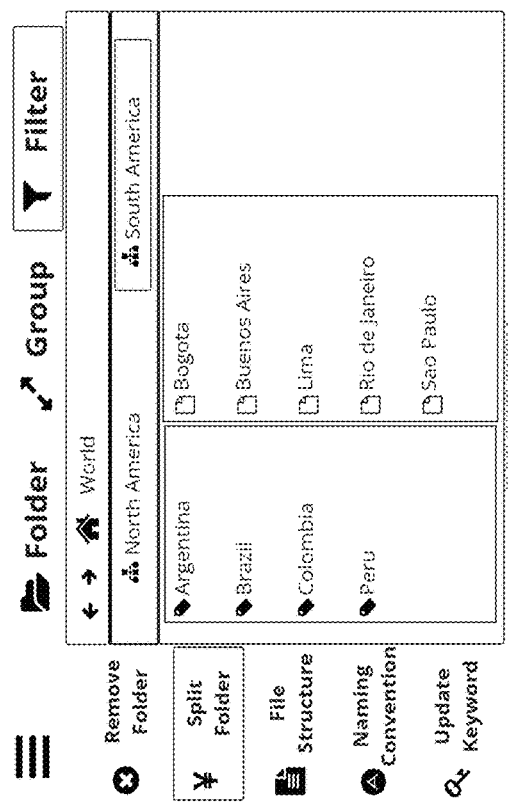

Moreover, in the filtering view, the FDBOL 200 may perform the splitting operation on the filtering hierarchy. For example, the FDBOL 200 may split the filtering hierarchy to generate two or more filtering sub-hierarchies. Each of the filtering sub-hierarchies includes a portion of the filtering hierarchy. As shown in FIG. 15-1, the filtering hierarchy associated with the filtering tag "World" is split into two filtering sub-hierarchies. The first filtering sub-hierarchy may include the filtering tag "North America" and all filtering tags under the "North America" tag and the second filtering sub-hierarchy may include the filtering tag "South America" and all filtering tags under the "South America" tag. As a result of the splitting, the user may navigate from the "World" tag shown in FIG. 15-2A to the two filtering sub-hierarchies for "North America" and "South America" shown in FIG. 15-2B. Where the filtering sub-hierarchy for "North America" is selected, the FDBOL 200 may display the filtering tags at lower-levels under the filtering tag "North America" as shown in FIG. 15-2C. The first column displays the filtering tags "Canada," "Mexico," and "United States." The second column displays names of the documents "Chicago," "Los Angeles," "Mexico City," "New York," "Toronto," "Vancouver."

Similarly, Where the filtering sub-hierarchy for "South America" is selected, the FDBOL 200 may display the filtering tags at lower-levels under the filtering tag "South America" as shown in FIG. 15-2D. The first column displays the filtering tags "Argentina," "Brazil," "Colombia," and "Peru." The second column displays names of the documents "Bogota," "Buenos Aires," "Lima," "Rio de Janeiro," "Sao Paulo."

Figures 1, 16A:
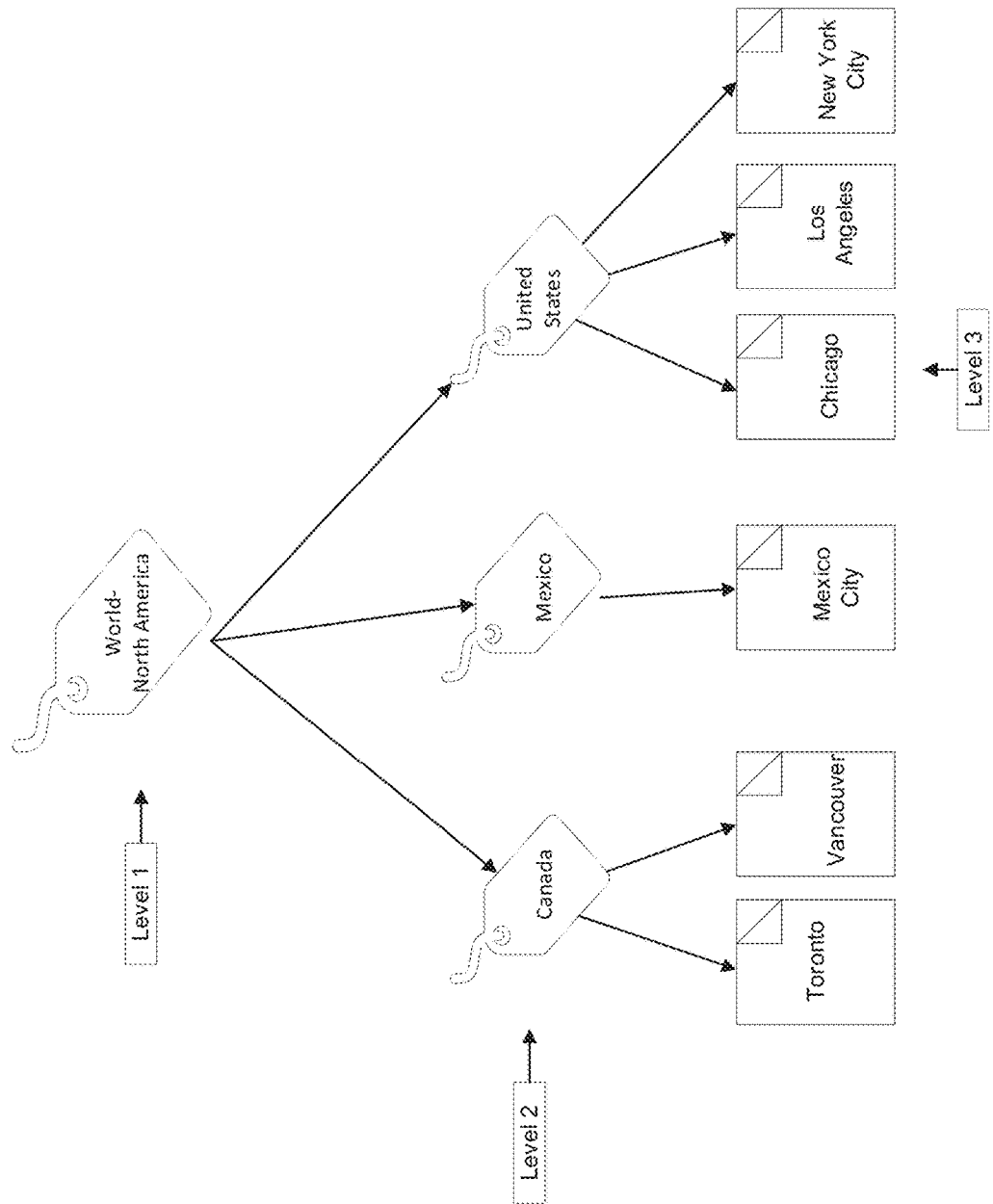
Figures 2A, 16A:
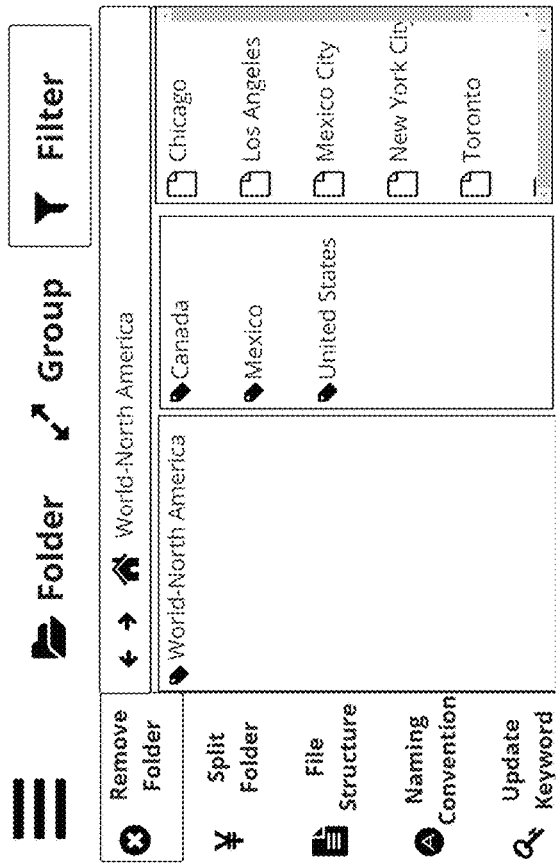
Figures 2B, 16A:
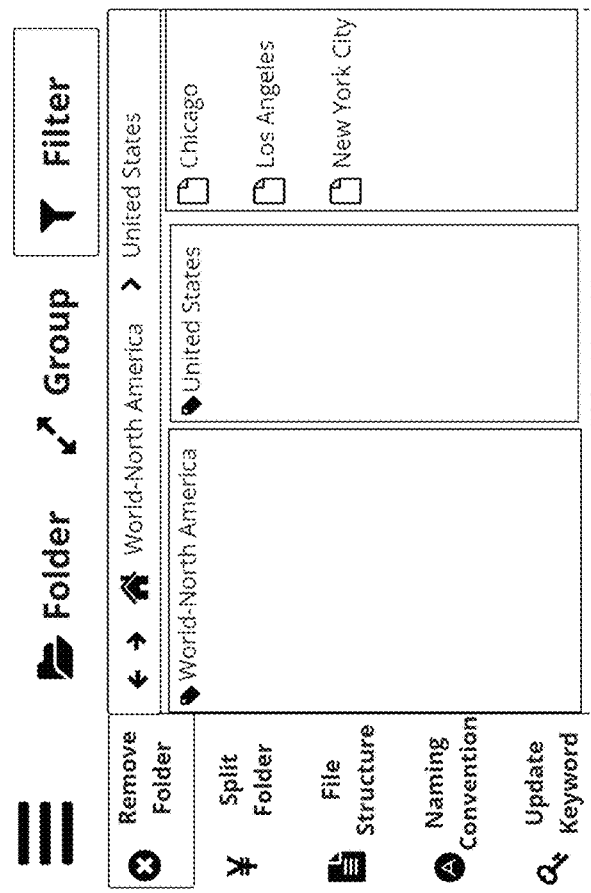

The FDBOL 200 may also remove a filtering tag in the filtering hierarchy. In an example, the filtering hierarchy is a perfect hierarchy in which the documents are only at the bottom level of the filtering hierarchy. To remove a filtering tag in the filtering hierarchy, the FDBOL 200 may determine an upper-level filtering tag of the filtering tag and update a name of the upper-level filtering tag to include a name of the filtering tag. In an example as shown in FIG. 16A-1, the filtering tag "North America" is removed and the upper-level filtering tag "World" is renamed as "World-North America." Then, the FDBOL 200 may move the lower-level filtering tags "Canada," "Mexico," and "United States" of the "North America" filtering tag up to be connected with the upper-level folder "World-North America" in the filtering hierarchy. As a result, the filtering view may display filtering tags at different lower-levels under the "World-North America" tag after the removal as shown in FIG. 16A-2A. Where the user selects the filtering tag "United States" in the second column in the filtering view as shown in FIG. 16A-2A, the FDBOL 200 will filter the filtering tags at all levels to only display the filtering tag "World-North America" in the first column, the filtering tag "United States" in the second column, and names of the documents "Chicago," "Los Angeles," and "New York City" in the fourth column, as shown in FIG. 16A-2B.

Figures 1, 16B:
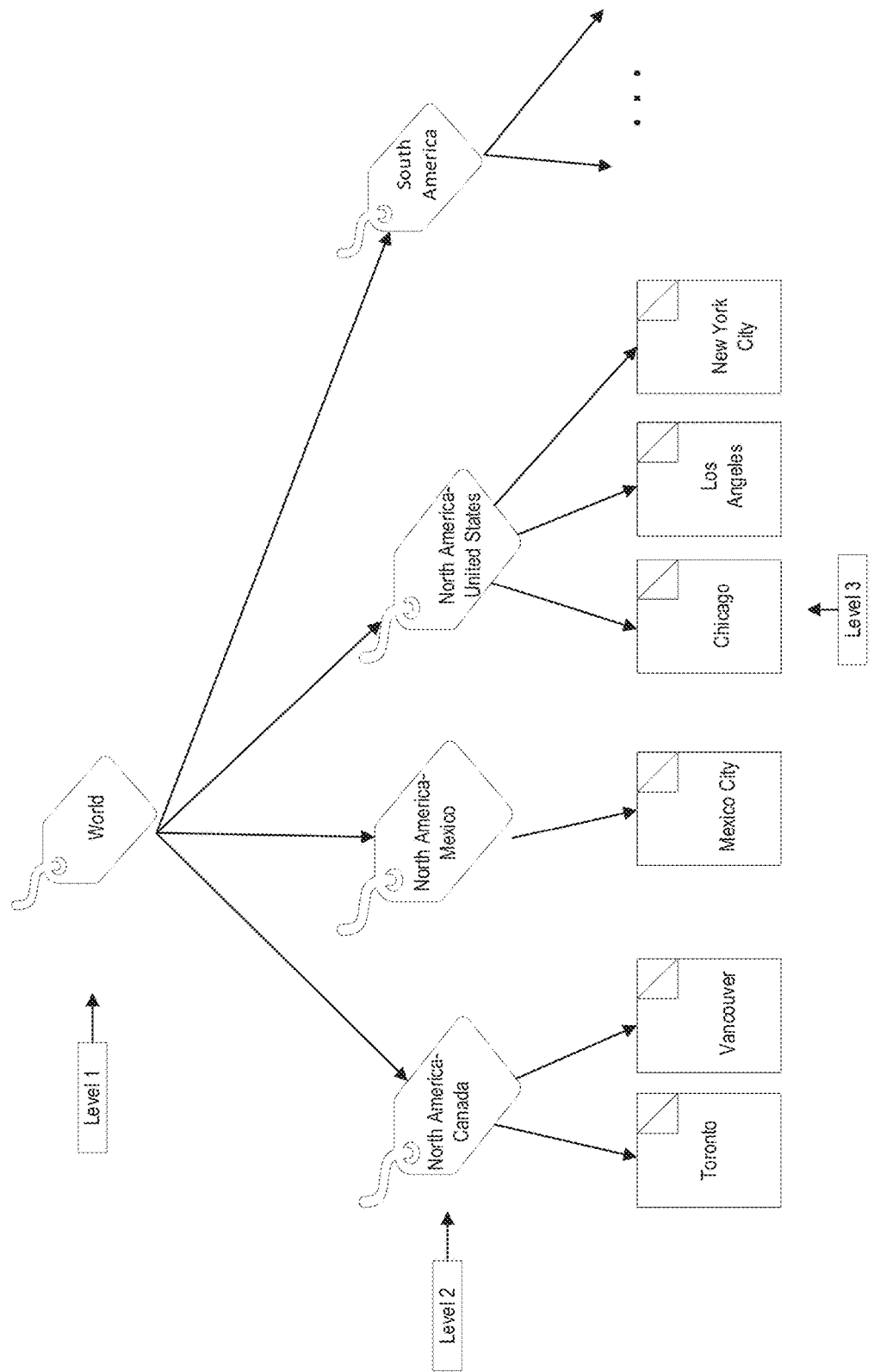
Figures 2B, 16B:
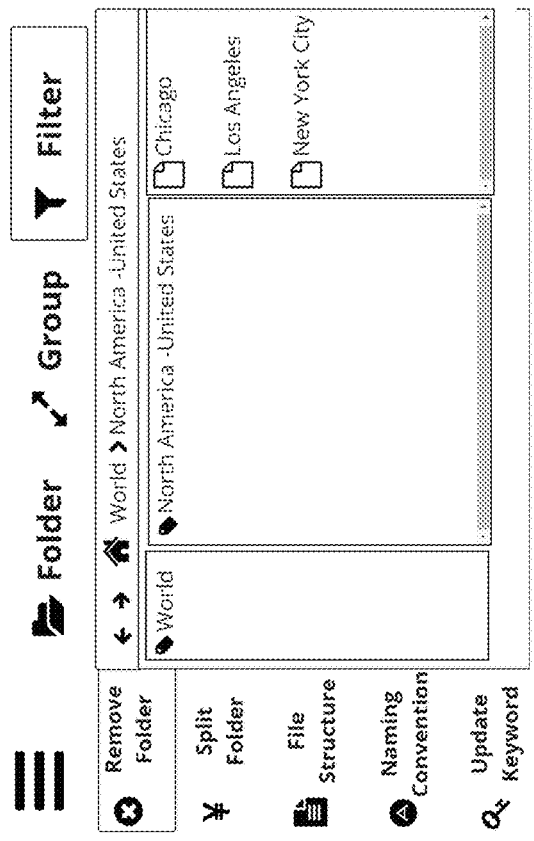
Figures 2A, 16B:
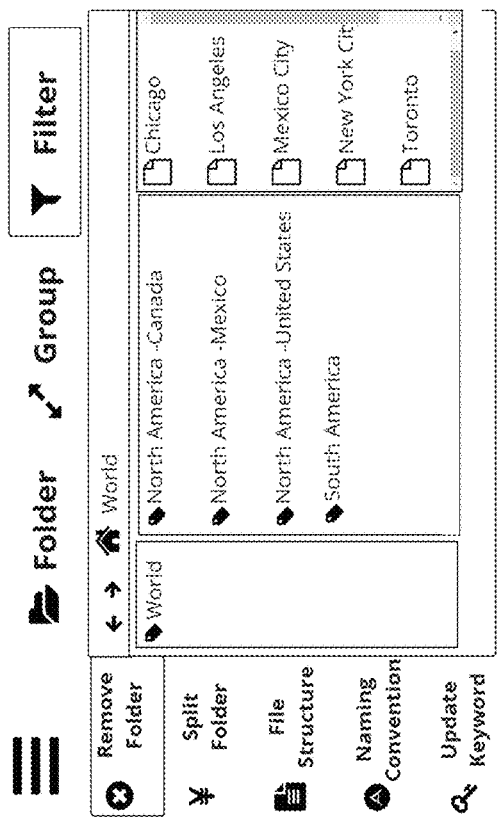

Alternatively, the FBDOL 200 may determine lower-level filtering tags of the filtering tag to be removed and update names of the lower-level filtering tags to include a name of the filtering tag. In an example as shown in FIG. 16B-1, the filtering tag "North America" is removed and the lower-level filtering tags are renamed as "North America-Canada," "North America-Mexico," and "North America-United States" respectively. Then, the FDBOL 200 may move the lower-level filtering tags up to be connected with the upper-level filtering tag "World" in the filtering hierarchy. After the removal, the filtering view may display renamed filtering tags "North America-Canada," "North America-Mexico," and "North America-United States," and "South America" in the second column as shown in FIG. 16B-2A. Where the user selects the filtering tag "North America-United States", the FDBOL 200 will filter the filtering tags at all levels to only display the filtering tags associated with the "North America-United States" tag, including the filtering tag "World" in the first column, the filtering tag "North America-United States" in the second column, and names of the documents "Chicago," "Los Angeles," and "New York City" in the third column, as shown in FIG. 16B-2B.

Figures 1, 16C:
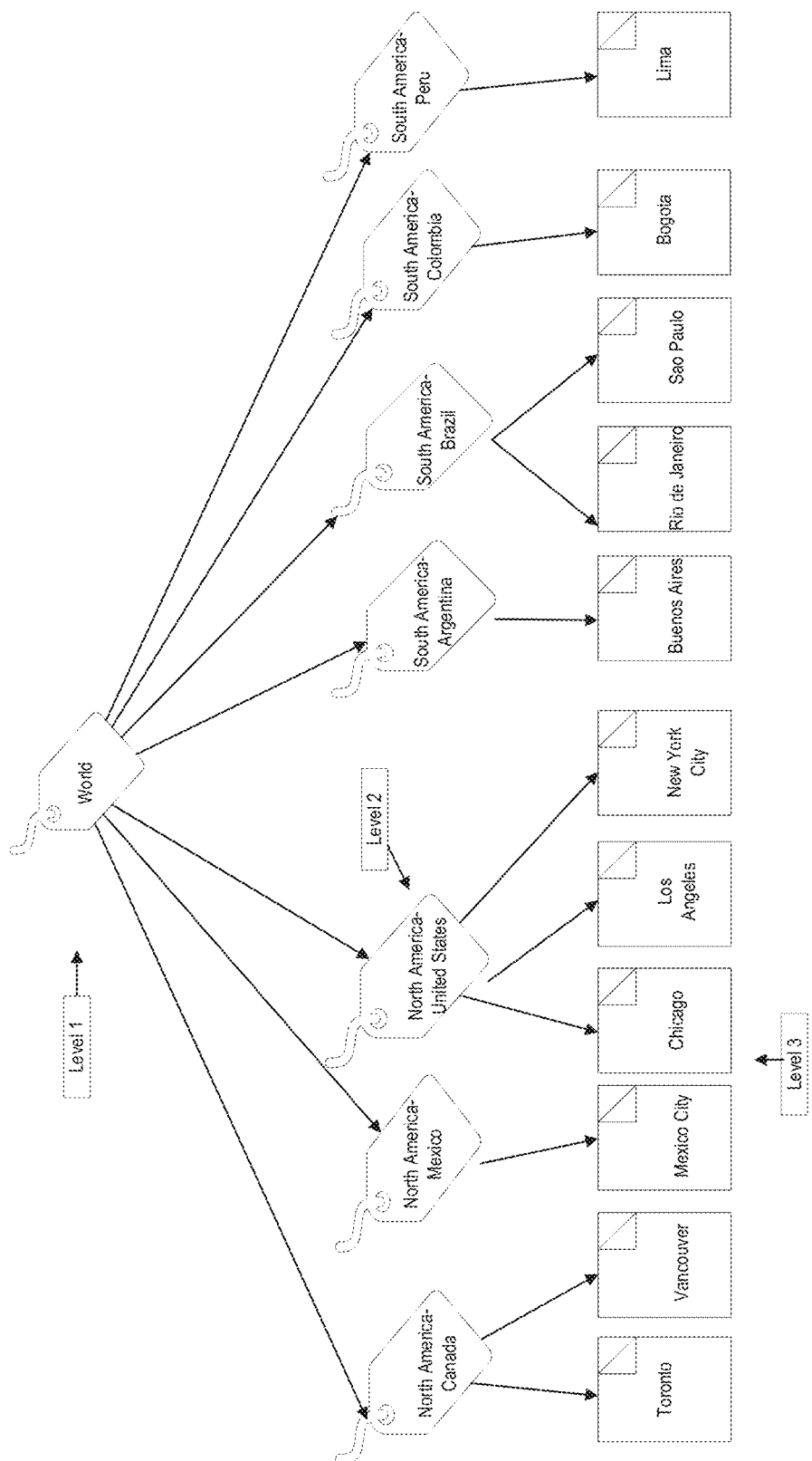
Figures 2A, 16C:
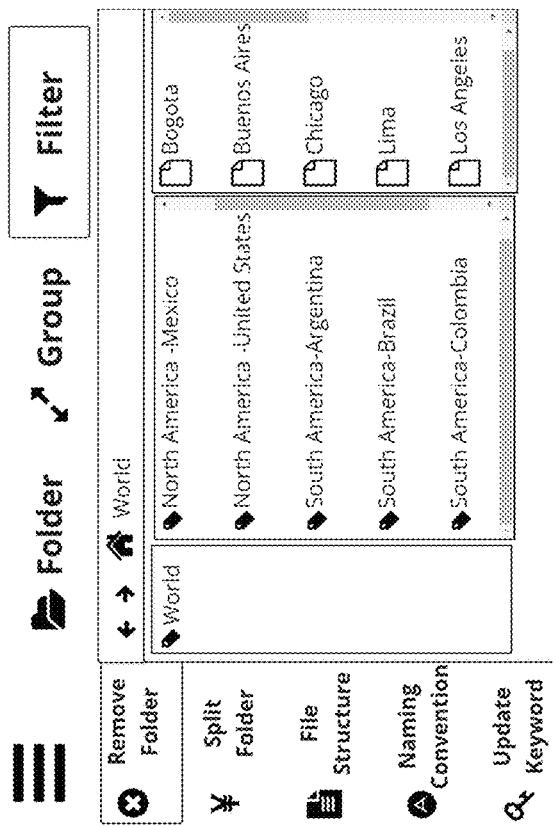
Figures 2B, 16C:
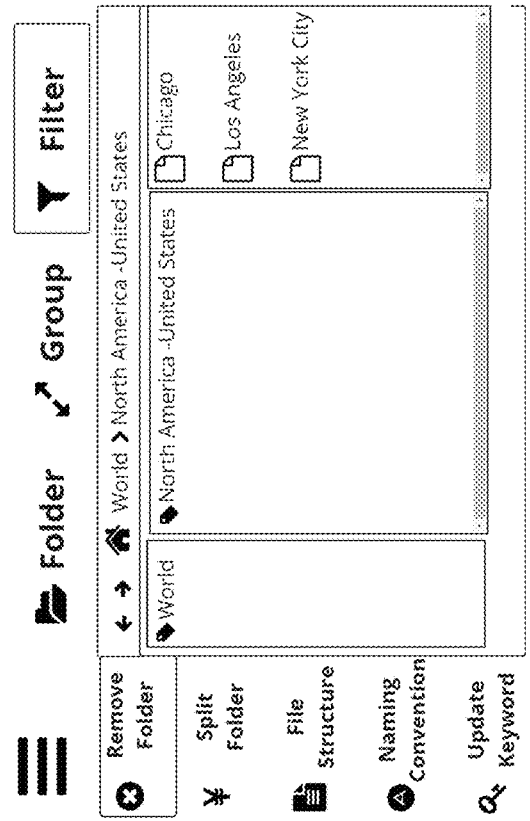

In an implementation, the FBDOL 200 may remove all filtering tags at a level of the filtering hierarchy. For example, where the FBDOL 200 removes the filtering tag at the second level of the filtering hierarchy, i.e., "North America" and "South America," the FDBOL 200 may determine the lower-level filtering tags under each of the removed filtering tags, and update names of the lower-levels tags to include the name of the removed filtering tag. The tags "Canada," "Mexico," and "United States" are under the "North America" tag and the tags "Argentina," "Brazil," "Colombia," and "Peru" are under the "South America" tag. As shown in FIG. 16C-1, the FBDOL 200 may rename the filtering tags under "North America" tag as "North America-Canada," "North America-Mexico," and "North America-United States" and rename the filtering tags under "South America" tag as "South America-Argentina," "South America-Brazil," "South America-Colombia," and "South America-Peru," and move these tags up to be connected with the first level tag "World."

After removing the second level of filtering tags, the filtering view may display renamed filtering tags "North America-Canada," "North America-Mexico," "North America-United States," "South America-Argentina," "South America-Brazil," "South America-Colombia," and "South America Peru" in the second column as shown in FIG. 16C-2A. Similarly, where the user selects the filtering tag "North America-United States" in the filtering view as shown in FIG. 16B-2A, the FDBOL 200 will filter the filtering tags at all levels to display the filtering tags associated with the "North America-United States" tag, including the filtering tag "World" in the first column, the filtering tag "North America-United States" in the second column, and names of the documents "Chicago," "Los Angeles," and "New York City" in the third column, as shown in FIG. 16C-2B.

Figures 1A, 17A:
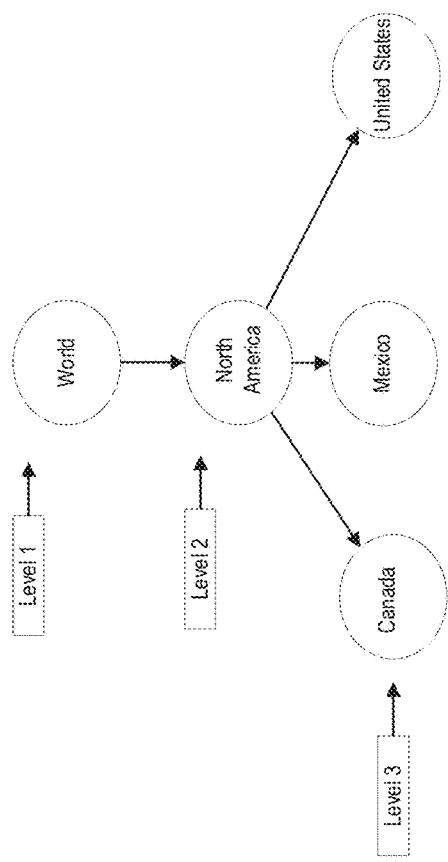
FIGS. 17A-1A-17A-1B show an exemplary keyword addition operation for the keyword hierarchy.
Figures 1B, 17A:
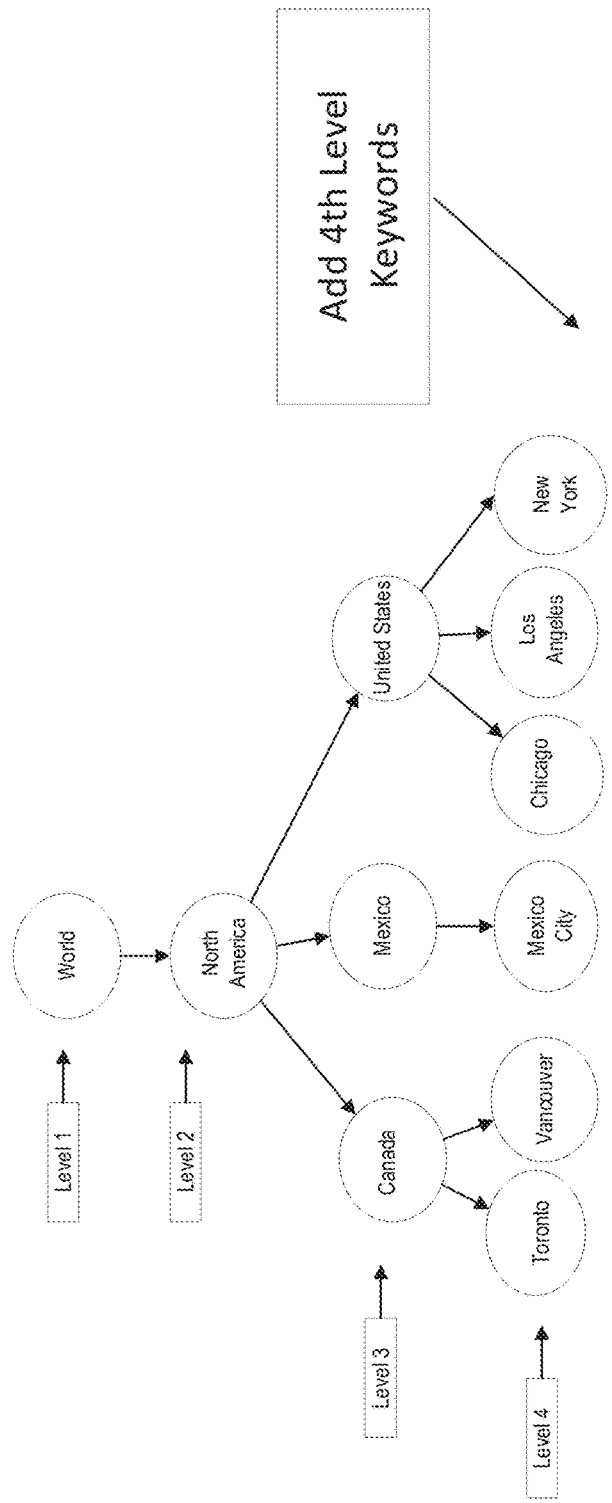
Figures 2B, 17A:
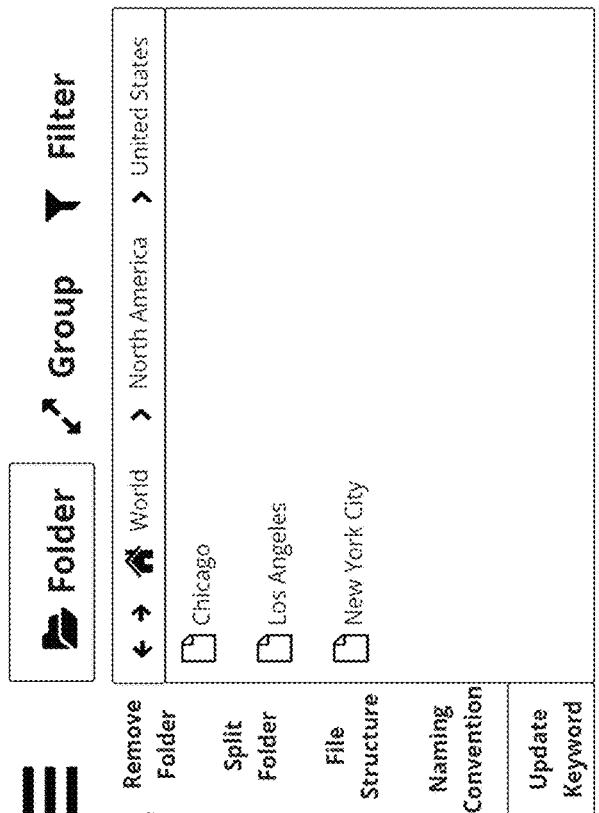
Figures 2A, 17A:
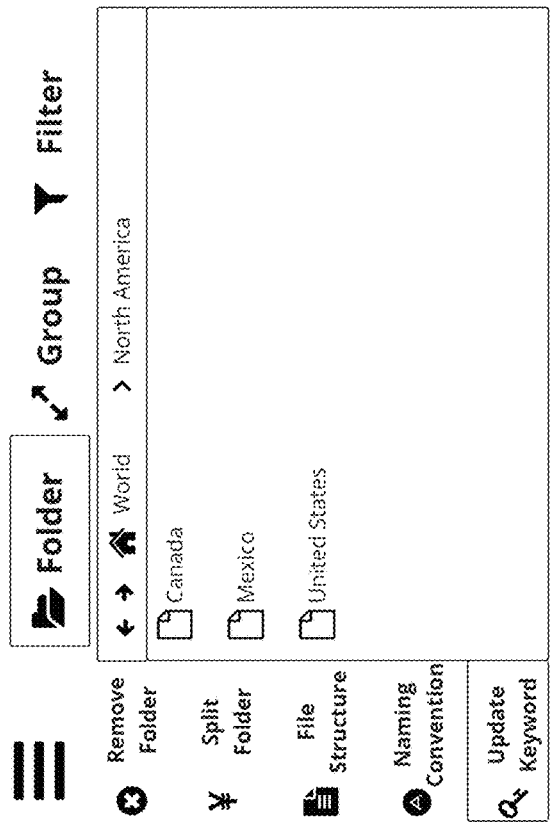

In some implementations, after generating the keyword hierarchy for the plurality of documents at step 202 discussed above, the FBDOL 200 may allow the user to update the keyword hierarchy, for example, via a GUI by adding a new level of keywords. In an example, the generated keyword hierarchy is shown in FIG. 17A-1A, which includes three levels of keywords. At the request of the user, the FBDOL 200 may add the fourth level keywords to the keyword hierarchy, as shown in FIG. 17A-1B. FIG. 17A-2A shows an exemplary GUI for updating the keyword hierarchy. By performing a keyword addition operation, the user may add the fourth level keywords "Chicago," "Los Angeles," and "New York City" under the keyword "United States," as shown in FIG. 17A-2B.

Figures 1A, 17B:
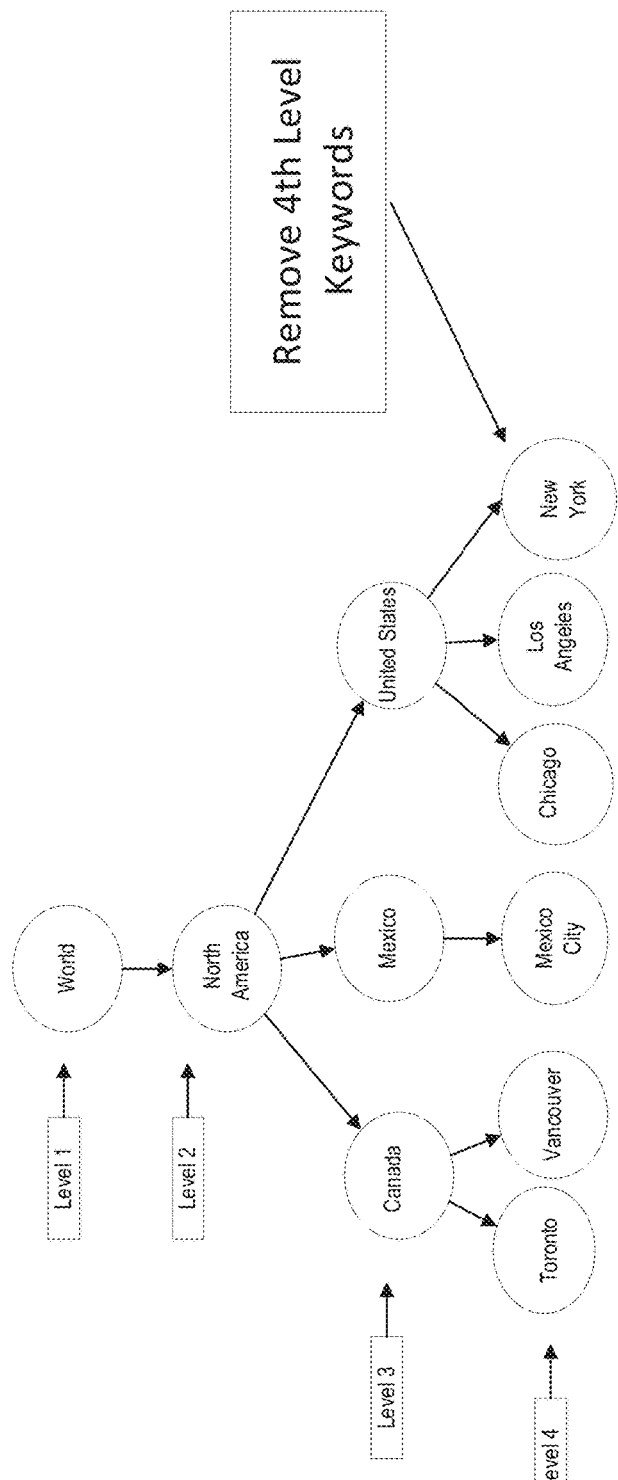
Figures 1B, 17B:
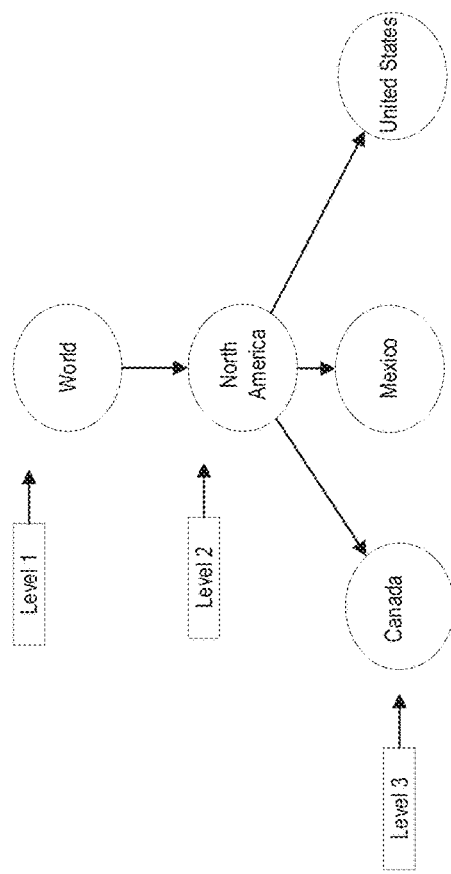
Figures 2A, 17B:
Figures 2B, 17B:
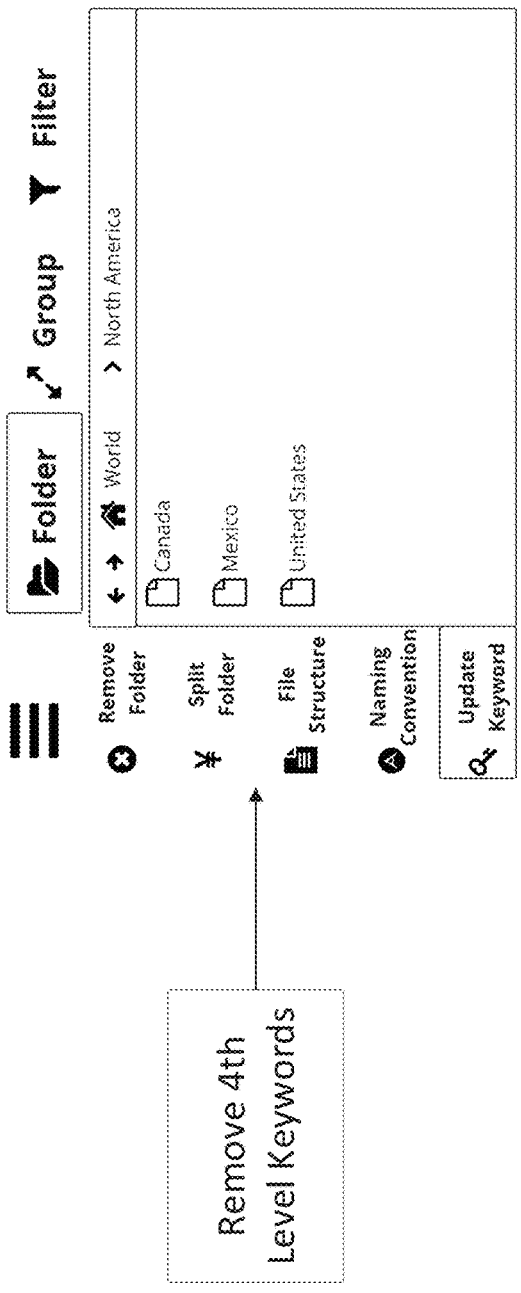

In the similar way, the FBDOL 200 may also allow the user to update the keyword hierarchy by removing a level of keywords. In an example, the keyword hierarchy is shown in FIG. 17B-1A, which includes four levels of keywords. At the request of the user, the FBDOL 200 may remove the fourth level keywords from the keyword hierarchy, as shown in FIG. 17B-1B. FIG. 17B-2A shows an exemplary GUI for updating the keyword hierarchy. By performing a keyword removal operation, the user may remove the fourth-level keywords. As a result, the third level keywords are displayed as the bottom level keywords, as shown in FIG. 17B-2B.

Figures 1A, 17C:
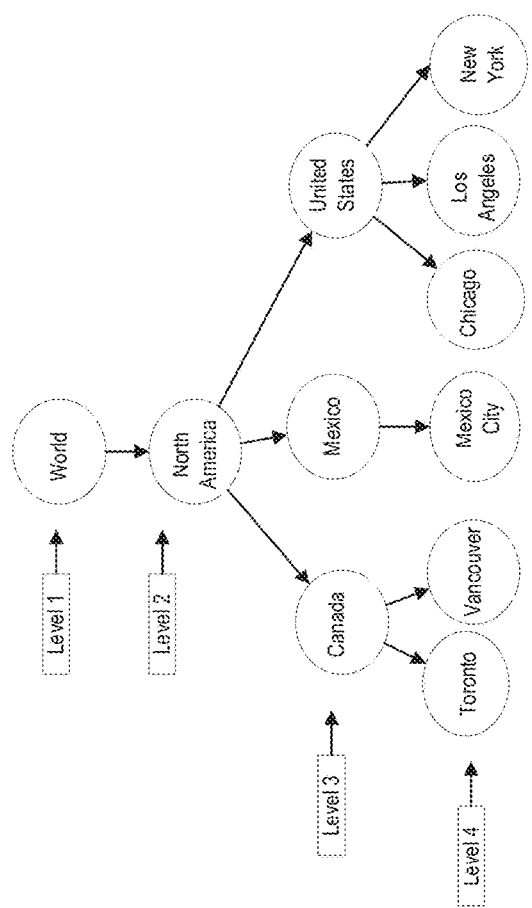
Figures 1B, 17C:
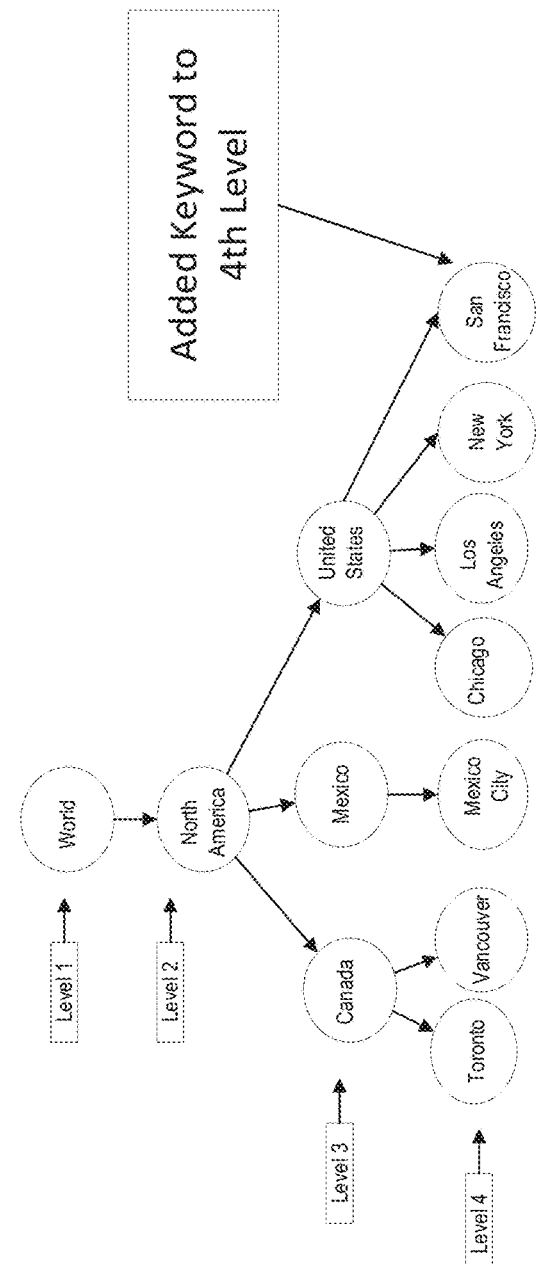
Figures 2A, 17C:
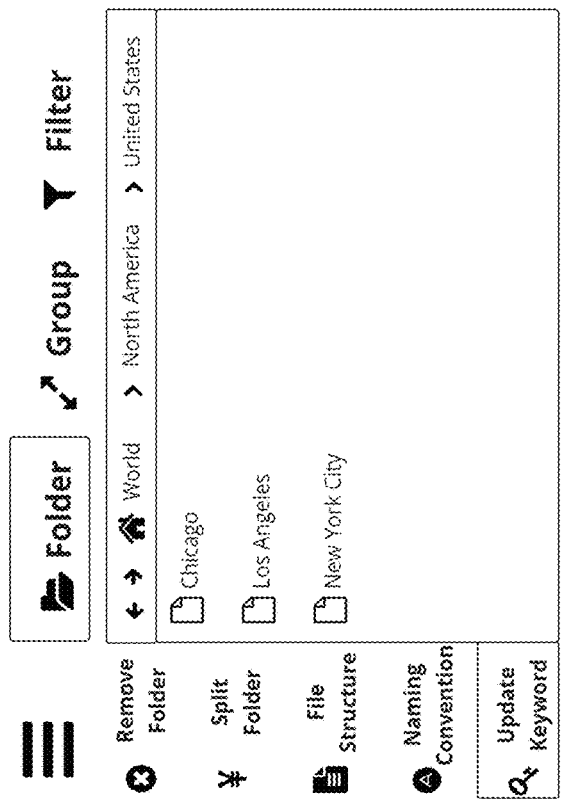
Figures 2B, 17C:
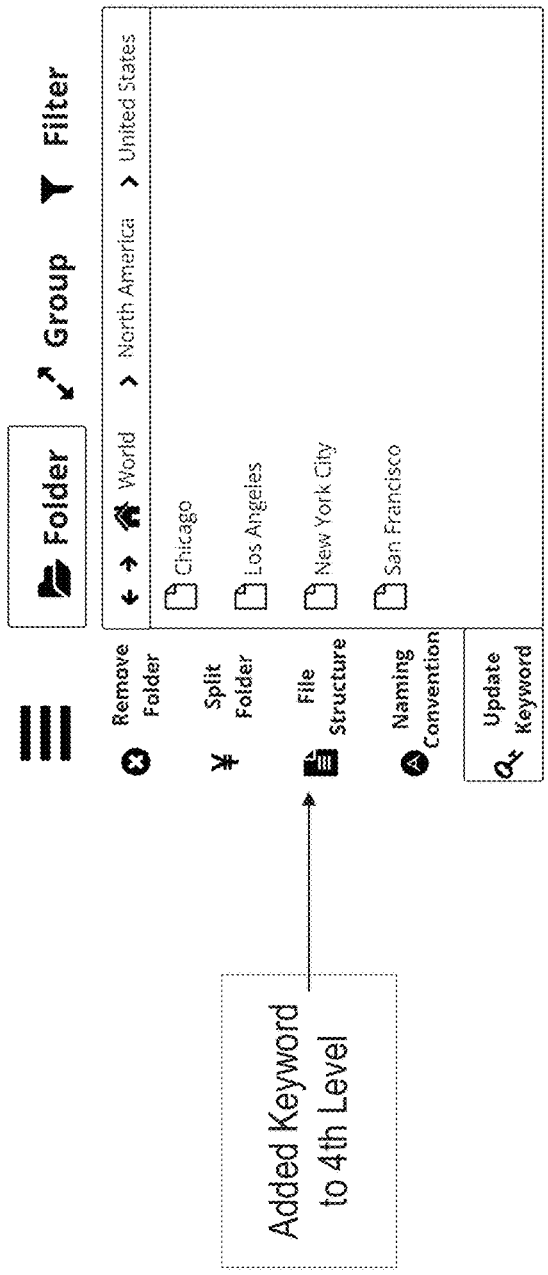

Further, the FBDOL 200 may allow the user to update the keyword hierarchy by adding one or more keywords to a specific level of the keyword hierarchy. In an example, the keyword hierarchy is shown in FIG. 17C-1A, which includes four levels of keywords. At the request of the user, the FBDOL 200 may add a new keyword "San Francisco" to the fourth level of the keyword hierarchy under the third-level keyword "United States,", as shown in FIG. 170-1B. FIG. 170-2A shows an exemplary GUI for updating the keyword hierarchy. By performing a keyword addition operation, the user may add the keyword "San Francisco" to the fourth level under the keyword "United States," as shown in FIG. 170-2B.

In some implementations, the FBDOL 200 may also provide a GUI to allow the user to rename and move the keywords in the keyword hierarchy. For example, At the request of the user, the FBDOL 200 rename a specific keyword in the keyword hierarchy. Additionally, or alternatively, the FBDOL 200 rename all keywords at a specific level of the keyword hierarchy in batch. The FBDOL 200 may move a specific keyword to connected to a different keyword without changing the level of the specific keyword. Additionally, or alternatively, the FBDOL 200 may move the specific keyword to a different level.

Figures 1, 18:
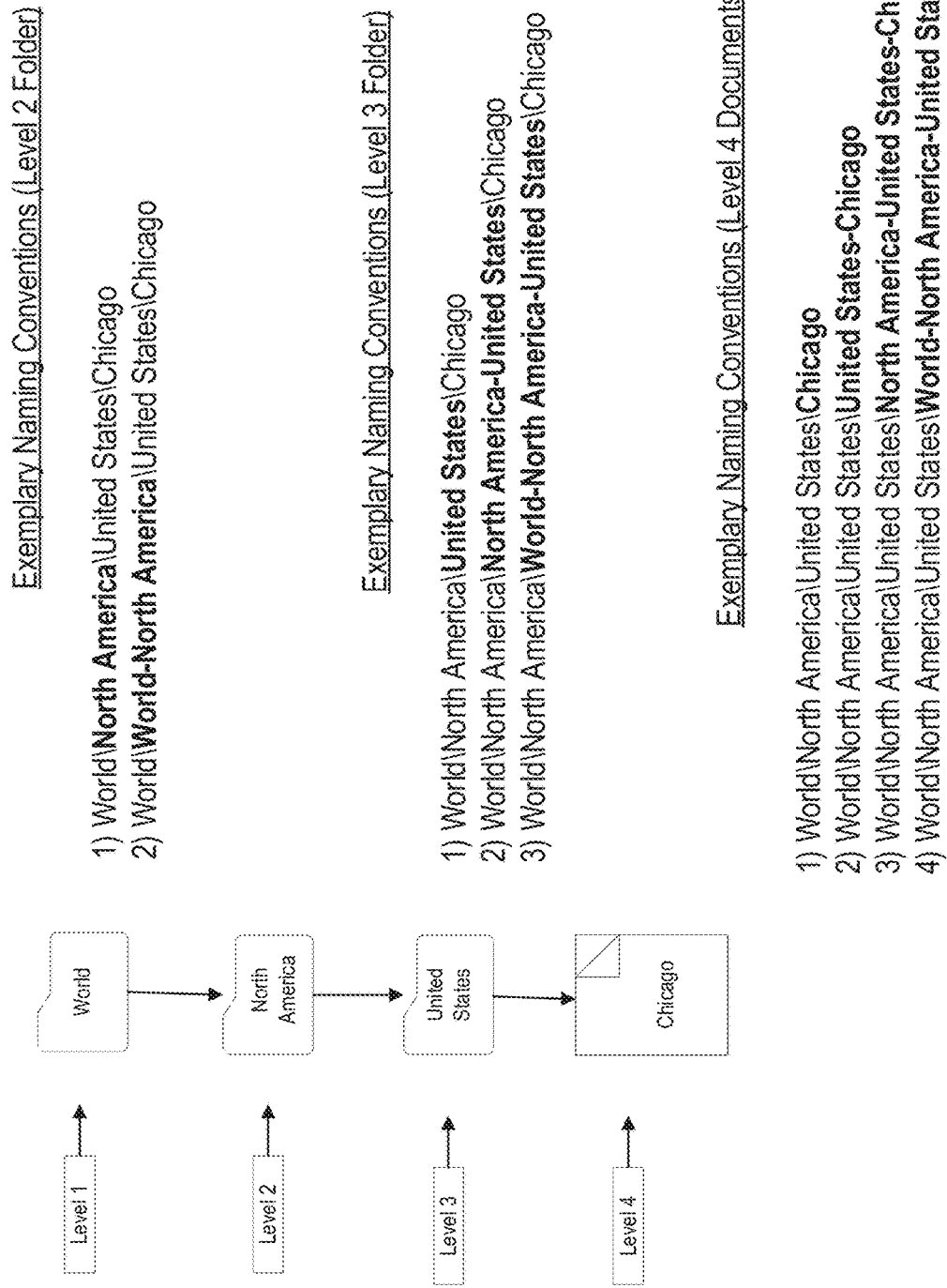
Figures 2A, 18:
Figures 2C, 18:
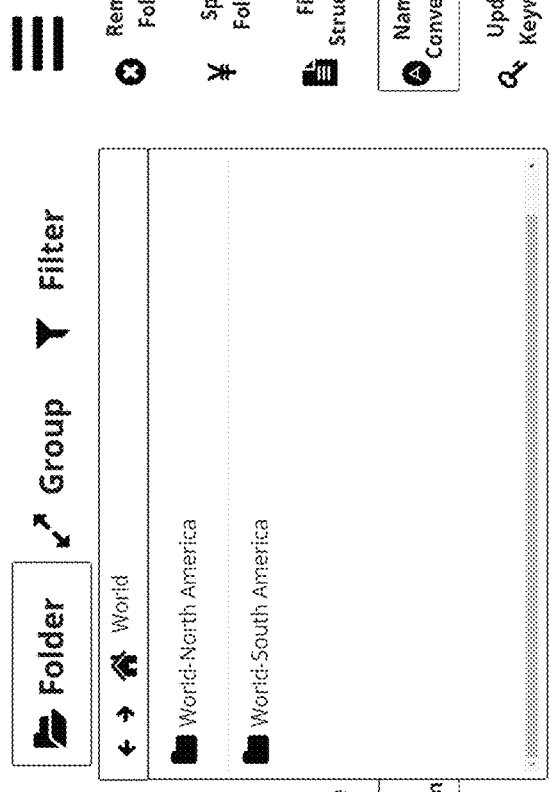
Figures 2B, 18:
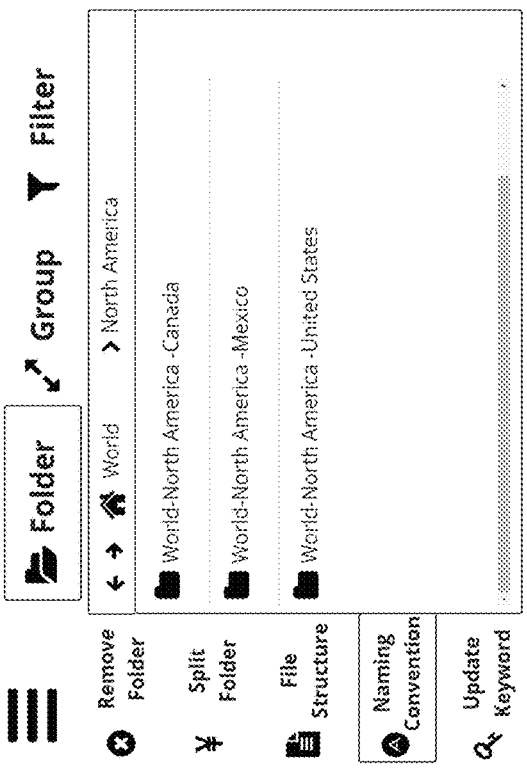

FIG. 18-1 shows a variety of exemplary naming conventions for the folders and documents at different levels of the folder hierarchy, in relation to the keyword hierarchy path, "World-North America-United States-Chicago" As shown, the folder "North America" at the second level may be renamed to include the name of the associated folder at the first level such as "World-North America." The folder "United States" at the third level may be renamed to include the names of the associated folders at the first and/or second levels, such as "North America-United States" and "World-North America-United States," Similarly, the document "Chicago" at the fourth level may be renamed to include the names of the associate folders at the first, second, and/or third levels, such as "United States-Chicago," "North America-United States-Chicago," and "World-North America-United States-Chicago." It should be appreciated that other appropriate folder and document naming conventions are applicable to the folder directory in the present disclosure. FIGS. 18-2A-18-2C shows exemplary GUI to rename the folders and documents in the folder view according to the keyword hierarchy as shown in FIG. 3. In FIG. 18-2A, the lower-level folders under the "World" folder may be renamed as "World-North America" and "World-South America." In FIG. 18-2B, the lower-level folders under the "North America" folder may be renamed as "World-North America-Canada," "World-North America-Mexico," and "World-North America-United States." In FIG. 18-2C, the lower-level documents under the "United States" folder may be renamed as "World-North America-United States-New York City," "World-North America-United States Los Angeles," and "World-North America-United States-Chicago."

Figures 1, 19:
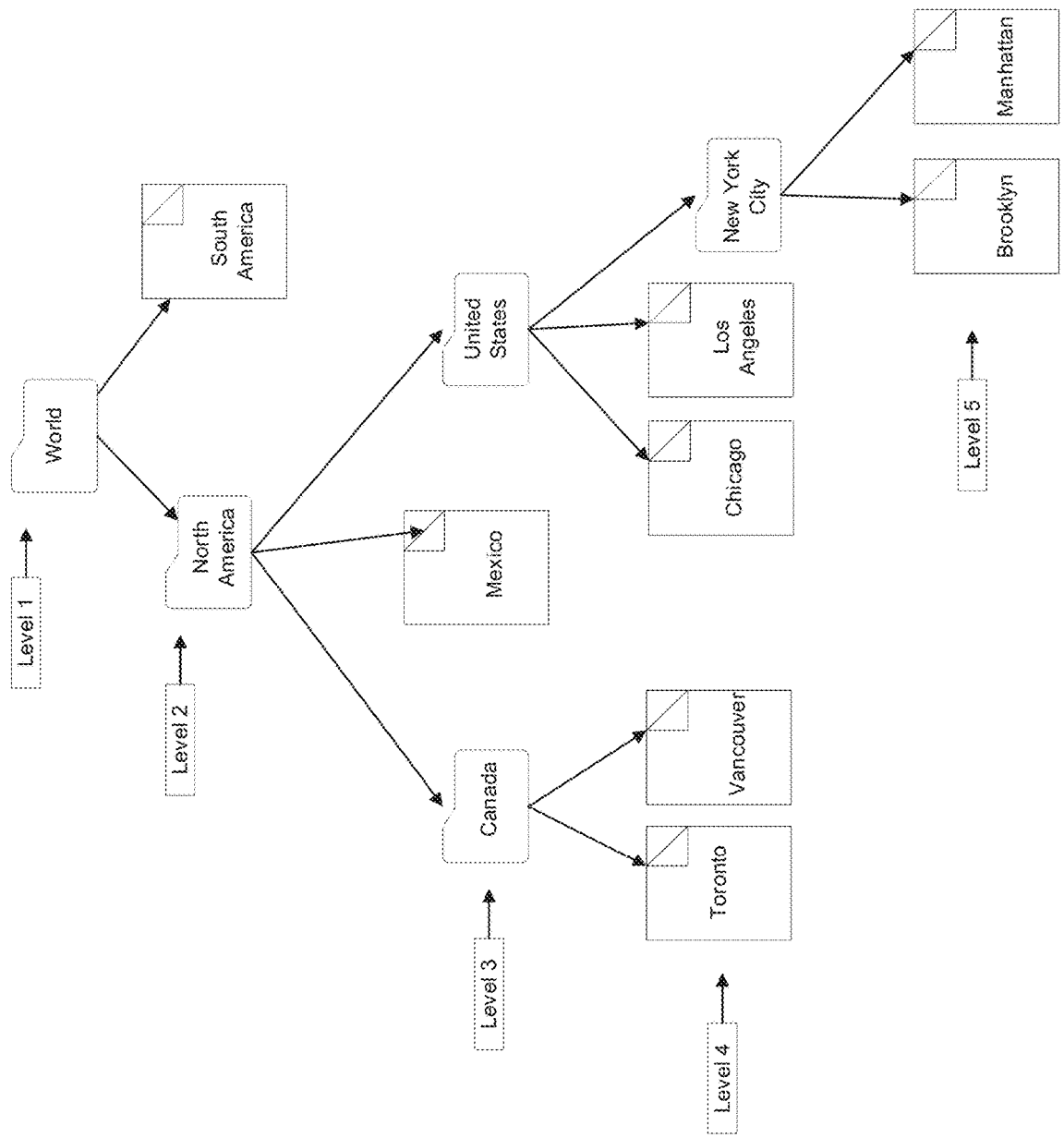
Figures 2A, 19:
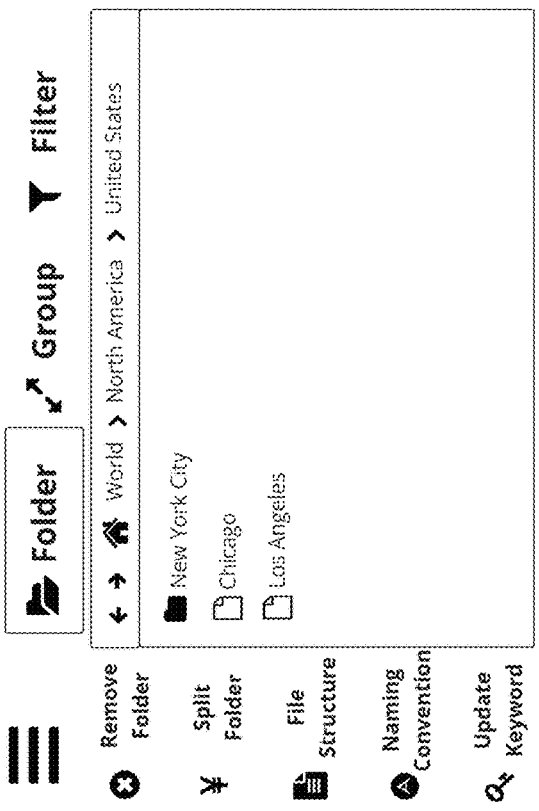
Figures 2B, 19:
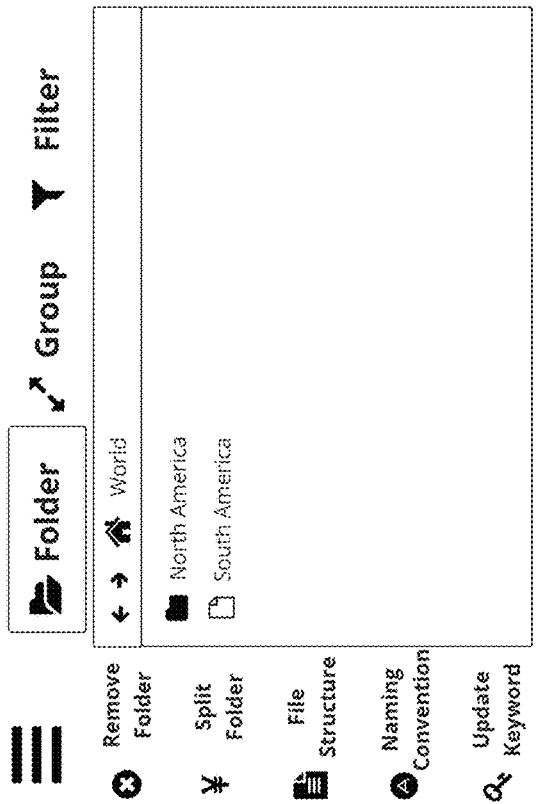
Figures 2C, 19:
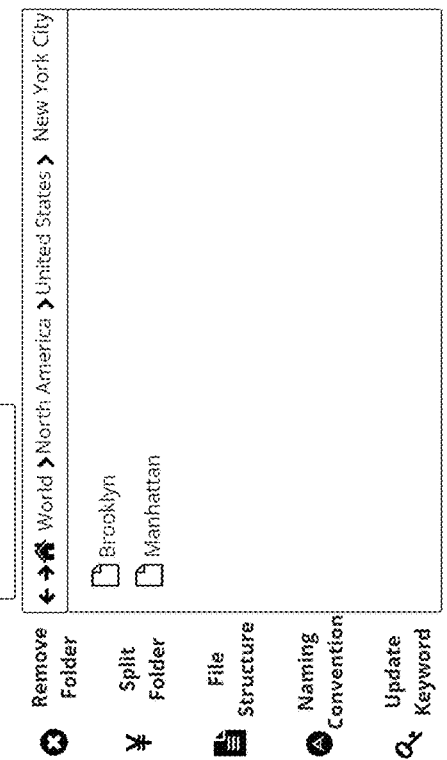
Figures 2D, 19:
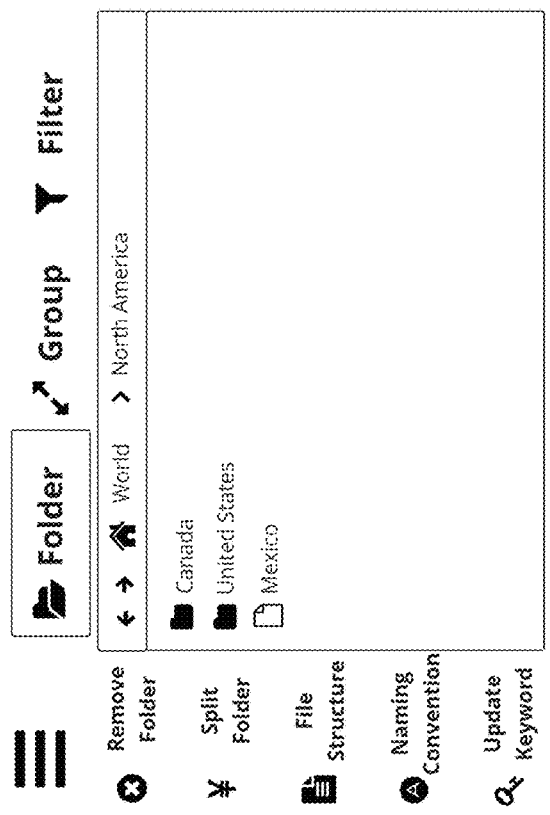

FIG. 19-1 shows an exemplary imperfect folder hierarchy. In comparison with the perfect hierarchy, the documents may be stored in folders at different levels of the folder directory. As shown in FIG. 19-1, the document "South America" is at the second level and stored in the first level folder "World" while the document "Mexico" is at the third level and stored in the second level folder "North America." FIGS. 19-2A 19-2D show exemplary folder views for operating the folder directory with the imperfect folder hierarchy. For example, the user may navigate from the "North America" folder shown in FIG. 19-2A to its lower-level folders "Canada" and "United States" and its lower-level document "Mexico" shown in FIG. 19-2B. The user may further navigate from the "United States" folder shown in FIG. 19-2B to its lower-level folder "New York City" and its lower-level documents "Chicago" and "Los Angeles" shown in FIG. 19-2C. Similarly, the user may further navigate from the "New York City" folder shown in FIG. 19-2C to its lower-level documents "Brooklyn" and "Manhattan" shown in FIG. 19-2D. It should be appreciated that the operations in the folder view, group view, and filtering view discussed above in the context of perfect hierarchy are applicable to the imperfect hierarchy.

Figure 20:
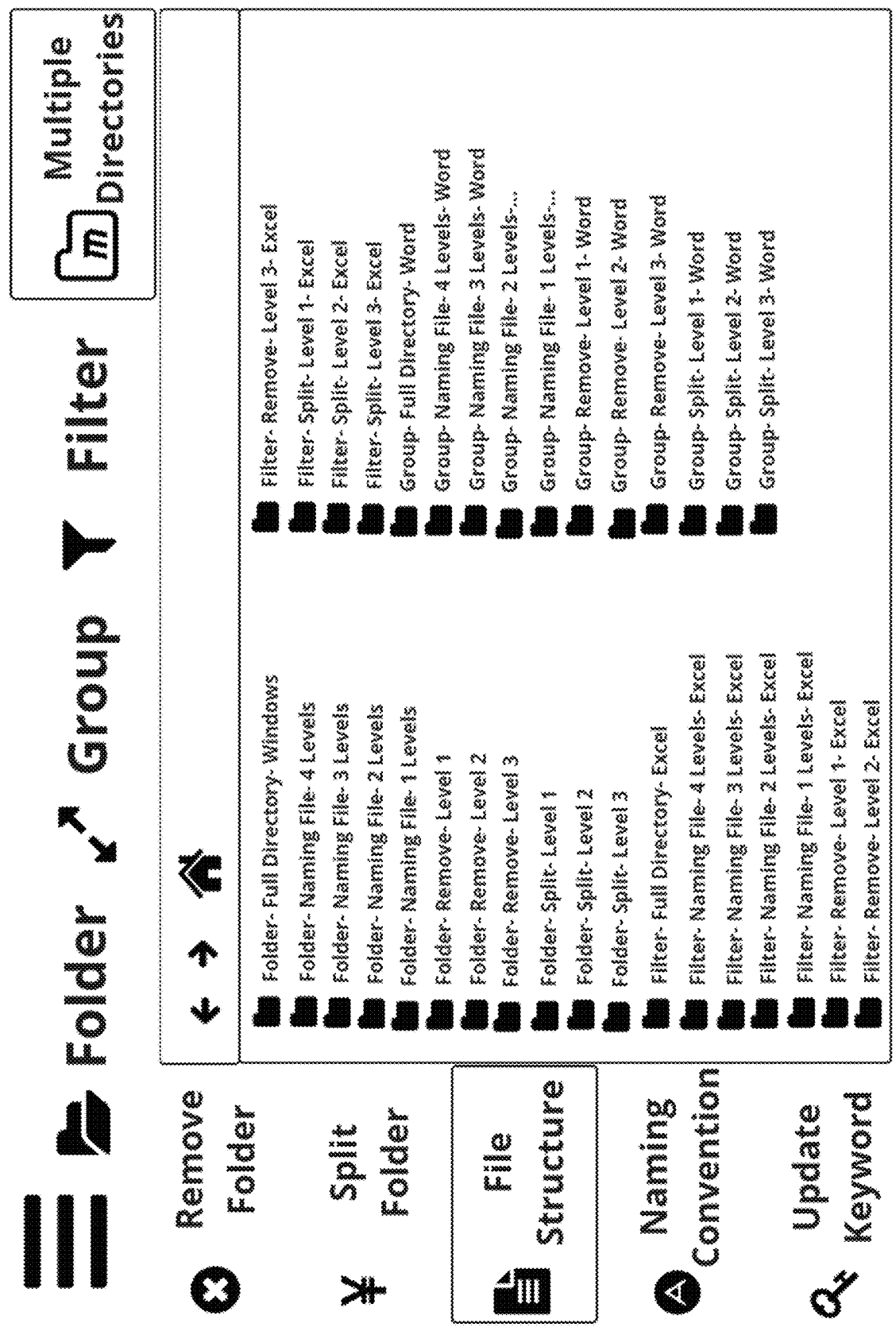
FIG. 20 shows exemplary multiple separate folder directories generated based on the same keyword hierarchy.

In some implementations, the FBDOL 200 may separately generate a plurality of folder directories in the data storage system based on the same keyword hierarchy. The plurality of folder directories may respectively reflect different view options for navigating and operating the folders and documents as shown in FIG. 20. For example, each of the folder directories may be displayed and operated in different folder views. In each of the plurality of folder directories, a folder hierarchy of the folder directory reflects at least a portion of the keyword hierarchy and folders in the folder hierarchy are named based on corresponding keywords in the at least a portion of the keyword hierarchy.

The plurality of folder directories may be generated to reflect different portions of the keyword hierarchy. For example, the FBDOL 200 may generate the first folder directory to reflect the top level and the second level, and omit to reflect the third level and the bottom level of the keyword hierarchy, generate the second folder directory to reflect the top level, the second level, the third level, and omit to reflect the bottom level of the keyword hierarchy, and generate the third folder directory to reflect all levels of the keyword hierarchy. In this way, the same content in the plurality of documents may be navigated and viewed in the different folder views.

The plurality of folder directories may separately store copies of the documents, To the end, the FBDOL 200 may duplicate the documents for each of the plurality of folder directories. For each of the duplicated documents, the FBDOL 200 may determine a target folder for storing the duplicated document based on the keyword hierarchy path associated with the duplicated document and store the duplicated document to the target folder in the folder directory, as discussed above in the context of a single folder directory.

Figure 21:
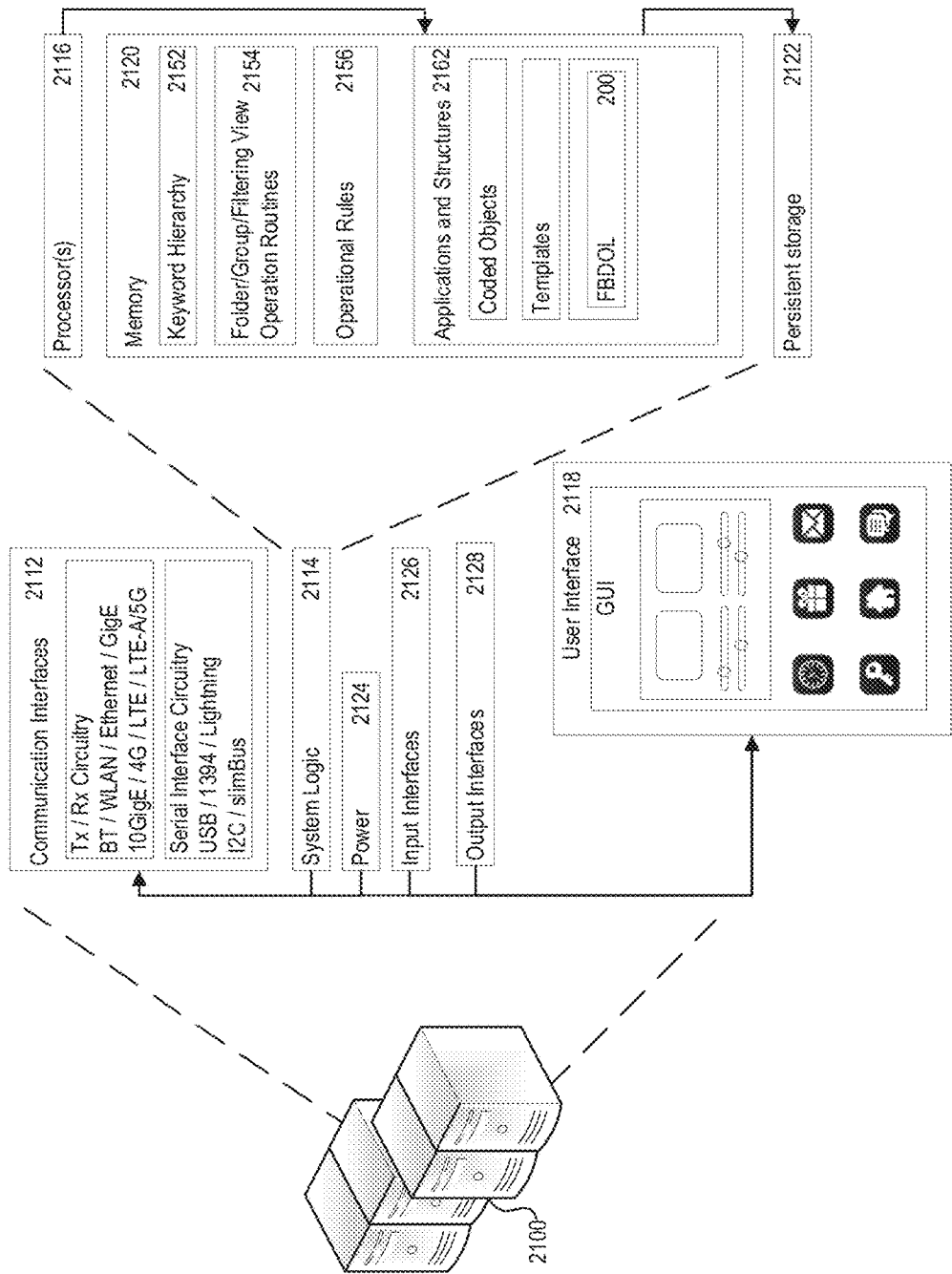
FIG. 21 shows an exemplary specific execution environment for executing the folder-based data organization logic.

FIG. 21 shows an exemplary specific execution environment for executing the FBDOL 200 as described above. The execution environment 2100 may include system logic 2114 to support execution of the FBDOL 200 described above. The system logic 2114 may include processors 2116, memory 2120, and/or other circuitry. The memory 2120 may include keyword hierarchy 2152, folder/group/filtering view operation routines 2154, and operational rules 2156. The memory 2120 may further include applications and structures 2162, for example, coded objects, machine instructions, templates, or other structures to support obtaining keyword hierarchy, generating the folder directory, or other tasks described above. The applications and structures may implement the FBDOL 200.

The execution environment 2100 may also include communication interfaces 2112, which may support wireless, e.g. Bluetooth, Wi-Fi, WLAN, cellular (4G, LTE/A, 5G), and/or wired, Ethernet, Gigabit Ethernet, optical networking protocols. The communication interfaces 2112 may also include serial interfaces, such as universal serial bus (USB), serial ATA, IEEE 1394, lighting port, I²C, slimBus, or other serial interfaces. The execution environment 2100 may include power functions 2124 and various input interfaces 2126. The execution environment may also include a user interface 2118 that may include human-to-machine interface devices and/or graphical user interfaces (GUI). In some implementations, the system logic 2114 may be distributed over one or more physical machines or be implemented as one or more virtual machines.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CD-ROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context

What is claimed is:

1. A folder-based data organization method, comprising:
obtaining, with a processor circuitry, a keyword hierarchy for a plurality of documents, the keyword hierarchy configured for organizing the plurality of documents and comprising a plurality of levels for the keyword hierarchy, wherein each of the plurality of levels comprises at least one keyword, with each of the plurality of documents associated with a keyword hierarchy path that routes to the document in the keyword hierarchy;
generating, with the processor circuitry, a folder directory in a data storage system based on the keyword hierarchy, the folder directory being displayed for navigating the plurality of documents, wherein a folder hierarchy of the folder directory reflects at least a portion of the keyword hierarchy and folders in the folder hierarchy are named based on corresponding keywords in the at least a portion of the keyword hierarchy;
determining, with the processor circuitry, a target folder for storing one of the documents in the folder directory based on the keyword hierarchy path associated with the document;
storing, with the processor circuitry, the document to the target folder in the folder directory;
in response to a filtering operation on a folder, traversing lower-level folders under the folder to identify folders and documents under the folder and generating a filtering hierarchy for filtering the folders and documents associated with the folder, the filtering hierarchy reflecting a folder hierarchy associated with the folder; and
in response to a selection of one or more filtering tags at a level of the filtering hierarchy, filtering tags at a lower level of the level to filter out lower-level filtering tags under non-selected filtering tags at the level of the filtering hierarchy and only display names of lower-level filtering tags under the one or more selected filtering tags in the filtering hierarchy.

2. The method of claim 1, wherein for each of the folders in the folder hierarchy, a name of the folder is identical with a corresponding keyword in the at least a portion of the keyword hierarchy reflected by the folder hierarchy.

3. The method of claim 1, wherein the folder hierarchy of the folder directory is identical with the keyword hierarchy.

4. The method of claim 1, wherein the folder hierarchy of the folder directory reflects the keyword hierarchy other than a bottom level of the keyword hierarchy and keywords at the bottom level of the keyword hierarchy are used for naming the documents respectively.

5. The method of claim 1, wherein the determining the target folder comprises:
identifying a folder path matching the keyword hierarchy path associated with the document in the folder directory; and
determining a folder to which the folder path routes as the target folder.

6. The method of claim 1, wherein the method further comprises:
identifying, for each of the documents and folders in the folder directory, a keyword hierarchy path associated with the document or the folder in the keyword hierarchy; and
renaming the document or the folder using at least a portion of keywords in the keyword hierarchy path.

7. The method of claim 6, wherein the renaming the document further comprises:
identifying a folder path routing to the document and identifying a keyword hierarchy path associated with the document;
determining a portion of the keyword hierarchy path not reflected by the folder path; and
renaming the document to reflect the portion of the keyword hierarchy path not reflected by the folder path based on a predetermined naming convention.

8. The method of claim 7, wherein the renaming the document to reflect the portion of the keyword hierarchy path not reflected by the folder path comprises:
generating a keyword sequence including keywords in the portion of the keyword hierarchy path not reflected by the folder path, the keyword sequence following a predetermined sequence pattern; and
renaming the document with the keyword sequence such that the folder path in combination with the keyword sequence in a new name of the document reflecting an entirety of the keyword hierarchy path associated with the document.

9. The method of claim 1, wherein the folder hierarchy of the folder directory is a perfect hierarchy in which the documents are only at a bottom level of the folder hierarchy, the method further comprises:
in response to removing a folder at a level of the folder hierarchy, determining an upper-level folder of the folder and updating a name of the upper-level folder to include a name of the folder, or determining lower-level folders of the folder and updating names of the lower-level folders to include the name of the folder; and
moving the lower-level folders up to be connected with the upper-level folder of the folder in the folder hierarchy of the folder directory.

10. The method of claim 1, wherein the method further comprises:
in response to a splitting operation on the folder hierarchy, splitting the folder hierarchy to generate two or more folder sub-hierarchies, each of the folder sub-hierarchies includes a portion of the folder hierarchy.

11. The method of claim 1, wherein the method further comprises:
in response to a splitting-and-removing operation on the folder hierarchy,
splitting the folder hierarchy to generate two or more folder sub-hierarchies, each of the folder sub-hierarchies includes a portion of the folder hierarchy, and
for each of the folder sub-hierarchies, in response to removing a folder at a level of the folder sub-hierarchy,
determining an upper-level folder of the folder and updating a name of the upper-level folder to include a name of the folder, or
determining lower-level folders of the folder and updating names of the lower-level folders to include the name of the folder, and
moving the lower-level folders up to be connected with an upper-level folder of the folder in the folder sub-hierarchy.

12. The method of claim 1, wherein the method further comprises:
in response to a navigation operation on a folder, traversing lower-level folders under the folder to identify folders and documents under the folder and generating a navigation hierarchy for navigating the folders and documents associated with the folder, the navigation hierarchy reflecting a folder hierarchy associated with the folder.

13. The method of claim 12, wherein the navigation hierarchy is identical with the folder hierarchy associated with the folder, and for each of navigation nodes in the navigation hierarchy, a name of the navigation node is identical with a name of a corresponding folder in the folder hierarchy reflected by the navigation hierarchy.

14. The method of claim 12, the method further comprises:
displaying the navigation hierarchy associated with the folder for navigating the folders and documents, the navigation hierarchy are collapsible and expandable; and
in response to a selection of a navigation node in the navigation hierarchy, displaying names of lower-level navigation nodes under the navigation node in the navigation hierarchy.

15. The method of claim 12, wherein the generating the navigation hierarchy comprises:
generating the navigation hierarchy for a navigable document;
including names and content of the documents associated with the folder in the navigable document; and
in response to a navigation operation on a navigation node at a level of the navigation hierarchy, displaying names of lower-level navigation nodes under the navigation node and names and content of documents associated with the navigation node in the navigable document.

16. The method of claim 12, wherein the method further comprises:
in response to a splitting operation on the navigation hierarchy, splitting the navigation hierarchy to generate two or more navigation sub-hierarchies, each of the navigation sub-hierarchies includes a portion of the navigation hierarchy.

17. The method of claim 12, wherein the navigation hierarchy is a perfect hierarchy in which the documents are only at a bottom level of the navigation hierarchy, the method further comprises:
in response to removing a navigation node at a level of the navigation hierarchy, determining an upper-level navigation node of the navigation node and updating a name of the upper-level navigation node to include a name of the navigation node, or determining lower-level navigation nodes of the navigation node and updating names of the lower-level navigation nodes to include the name of the navigation node; and moving the lower-level navigation nodes up to be connected with the upper-level navigation nodes of the navigation node in the navigation hierarchy.

18. The method of claim 1, wherein the folder hierarchy of the folder directory is a perfect hierarchy in which the documents are only at a bottom level of the folder hierarchy.

19. The method of claim 1, wherein the filtering hierarchy is identical with the folder hierarchy associated with the folder, and for each of filtering tags in the filtering hierarchy, a name of the filtering tag is identical with a name of a corresponding folder in the folder hierarchy reflected by the filtering hierarchy.

20. The method of claim 1, the method further comprises:
displaying the filtering hierarchy associated with the folder for filtering the folders and documents associated with the folder.

21. The method of claim 1, the method further comprises:
in response to a selection of one or more filtering tags at a level of the filtering hierarchy, filtering tags at all levels of the filtering hierarchy to only display names of filtering tags associated with the one or more filtering tags in the filtering hierarchy.

22. The method of claim 1, wherein the generating the filtering hierarchy comprises:
generating the filtering hierarchy in a filterable document; and
including names and content of the documents associated with the folder in the filterable document.

23. The method of claim 1, wherein the method further comprises:
in response to a splitting operation on the filtering hierarchy, splitting the filtering hierarchy to generate two or more filtering sub-hierarchies, each of the filtering sub-hierarchies includes a portion of the filtering hierarchy.

24. The method of claim 1, wherein the filtering hierarchy is a perfect hierarchy in which the documents are only at a bottom level of the filtering hierarchy, the method further comprises:
in response to removing a filtering tag at a level of the filtering hierarchy, determining an upper-level filtering tag of the filtering tag and updating a name of the upper-level filtering tag to include a name of the filtering tag, or determining lower-level filtering tags of the filtering tag and updating names of the lower-level filtering tags to include the name of the filtering tag; and
moving the lower-level filtering tags up to be connected with the upper-level filtering tags of the filtering tag in the filtering hierarchy.

25. The method of claim 1, wherein the obtaining the keyword hierarchy for the plurality of documents:
generating the keyword hierarchy based on file properties of the documents, content of the documents, or contextual information of the documents.

26. The method of claim 1, wherein the generating the keyword hierarchy comprises:
obtaining a keyword learning model trained to extract keywords describing a document from content of the document; and
inputting content of the documents to the keyword learning model to generate the keyword hierarchy; or
generating, with a rule-based system, the keyword hierarchy.

27. The method of claim 1, wherein the generating the folder directory in the data storage system comprises:
generating a plurality of folder directories separately in a data storage system based on the keyword hierarchy, the plurality of folder directories respectively reflecting different folder view options for navigating the plurality of documents, wherein in each of the plurality of folder directories, a folder hierarchy of the folder directory reflects at least a portion of the keyword hierarchy and folders in the folder hierarchy are named based on corresponding keywords in the at least a portion of the keyword hierarchy; and
the method further comprises:
duplicating the plurality of documents for each of the plurality of folder directories;
for each of the duplicated documents, determining a target folder for storing the duplicated document in the folder directory based on a keyword hierarchy path associated with the duplicated document; and
storing the duplicated document to the target folder in the folder directory.

28. The method of claim 1, wherein the method further comprises:
in response to a request to update the keyword hierarchy, updating the keyword hierarchy to add, remove, rename, or move one or more keywords.

29. A folder-based data organization system, the system comprising:
a memory having stored thereon executable instructions;
a processor circuitry in communication with the memory, the processor circuitry when executing the instructions configured to:
obtain a keyword hierarchy for a plurality of documents, the keyword hierarchy configured for organizing the plurality of documents and comprising a plurality of levels for the keyword hierarchy, wherein each of the plurality of levels comprises at least one keyword, with each of the plurality of documents associated with a keyword hierarchy path that routes to the document in the keyword hierarchy;
generate a folder directory in a data storage system based on the keyword hierarchy, the folder directory being displayed for navigating the plurality of documents, wherein a folder hierarchy of the folder directory reflects at least a portion of the keyword hierarchy and folders in the folder hierarchy are named based on corresponding keywords in the at least a portion of the keyword hierarchy;
determine a target folder for storing one of the documents in the folder directory based on the keyword hierarchy path associated with the document;
store the document to the target folder in the folder directory;
in response to a filtering operation on a folder, traverse lower-level folders under the folder to identify folders and documents under the folder and generate a filtering hierarchy for filtering the folders and documents associated with the folder, the filtering hierarchy reflecting a folder hierarchy associated with the folder; and
in response to a selection of one or more filtering tags at a level of the filtering hierarchy, filter filtering tags at a lower level of the level to filter out lower-level filtering tags under non-selected filtering tags at the level of the filtering hierarchy and only display names of lower-level filtering tags under the one or more selected filtering tags in the filtering hierarchy.

30. A folder-based data organization product, the product comprising:

non-transitory machine-readable media; and instructions stored on the machine-readable media, the instructions configured to, when executed, cause a processor circuitry to:

obtain a keyword hierarchy for a plurality of documents, the keyword hierarchy configured for organizing the plurality of documents and comprising a plurality of levels for the keyword hierarchy, wherein each of the plurality of levels comprises at least one keyword, with each of the plurality of documents associated with a keyword hierarchy path that routes to the document in the keyword hierarchy;

generate a folder directory in a data storage system based on the keyword hierarchy, the folder directory being displayed for navigating the plurality of documents, wherein a folder hierarchy of the folder directory reflects at least a portion of the keyword hierarchy and folders in the folder hierarchy are named based on corresponding keywords in the at least a portion of the keyword hierarchy;

determine a target folder for storing one of the documents in the folder directory based on the keyword hierarchy path associated with the document;

store the document to the target folder in the folder directory;

in response to a filtering operation on a folder, traverse lower-level folders under the folder to identify folders and documents under the folder and generate a filtering hierarchy for filtering the folders and documents associated with the folder, the filtering hierarchy reflecting a folder hierarchy associated with the folder; and in response to a selection of one or more filtering tags at a level of the filtering hierarchy, filter filtering tags at a lower level of the level to filter out lower-level filtering tags under non-selected filtering tags at the level of the filtering hierarchy and only display names of lower-level filtering tags under the one or more selected filtering tags in the filtering hierarchy.

* * * * *